United States Patent
Kanekiyo et al.

(10) Patent No.: US 6,790,296 B2
(45) Date of Patent: Sep. 14, 2004

(54) NANOCOMPOSITE MAGNET AND METHOD FOR PRODUCING SAME

(75) Inventors: Hirokazu Kanekiyo, Kyoto (JP); Toshio Miyoshi, Ibaraki (JP); Satoshi Hirosawa, Otsu (JP)

(73) Assignee: Neomax Co., Ltd., Osaka (JP)

( * ) Notice: Subject to any disclaimer, the term of this patent is extended or adjusted under 35 U.S.C. 154(b) by 0 days.

(21) Appl. No.: 09/986,390

(22) Filed: Nov. 8, 2001

(65) Prior Publication Data

US 2002/0117235 A1 Aug. 29, 2002

(30) Foreign Application Priority Data

| Nov. 13, 2000 | (JP) | 2000-344567 |
| Nov. 20, 2000 | (JP) | 2000-352306 |
| Feb. 28, 2001 | (JP) | 2001-054252 |
| Sep. 7, 2001 | (JP) | 2001-271414 |
| Oct. 3, 2001 | (JP) | 2001-307819 |

(51) Int. Cl.$^7$ ............................................. H01F 1/057
(52) U.S. Cl. ........................ 148/302; 420/83; 420/121; 420/301
(58) Field of Search ............................... 148/302, 301; 420/83, 12

(56) References Cited

U.S. PATENT DOCUMENTS

| 4,770,723 A | 9/1988 | Sagawa et al. |
| 4,836,868 A | 6/1989 | Yajima et al. |
| 4,935,074 A | 6/1990 | De Mooij et al. |
| 5,022,939 A | 6/1991 | Yajima et al. |
| 5,049,208 A | 9/1991 | Yajima et al. |
| 5,209,789 A | 5/1993 | Yoneyama et al. |
| 5,666,635 A | 9/1997 | Kaneko et al. |
| 5,725,792 A | 3/1998 | Panchanathan |
| 5,905,424 A | 5/1999 | Panchanathan |
| 6,022,424 A | 2/2000 | Sellers et al. |
| 6,172,589 B1 | 1/2001 | Fujita et al. |
| 6,183,571 B1 | 2/2001 | Inoue et al. |
| 6,183,572 B1 | 2/2001 | Panchanathan et al. |
| 6,280,536 B1 | 8/2001 | Inoue et al. |
| 6,302,972 B1 | 10/2001 | Hirosawa et al. |
| 6,332,933 B1 | 12/2001 | Ma et al. |
| 6,352,599 B1 | 3/2002 | Chang et al. |

FOREIGN PATENT DOCUMENTS

| EP | 0 632 471 | 1/1995 |
| EP | 1 018 751 A1 | 7/2000 |

(List continued on next page.)

OTHER PUBLICATIONS

US 4,756,775, 7/1988, Croat (withdrawn)
R. Coehoorn, et al., "Novel Permanent Magnetic Materials Made by Rapid Quenching", Journal de Physique, C8, Dec. 1988, pp. 669–670.

(List continued on next page.)

*Primary Examiner*—John P Sheehan
(74) *Attorney, Agent, or Firm*—Keating & Bennett, LLP

(57) ABSTRACT

A method of making a material alloy for an iron-based rare earth magnet includes the step of forming a melt of an alloy with a composition of $(Fe_{1-m}T_m)_{100-x-y-z-n}(B_{1-p}C_p)_x R_y Ti_z M_n$. T is Co and/or Ni; R is at least one element selected from Y (yttrium) and the rare earth elements; and M is at least one element selected from Al, Si, V, Cr, Mn, Ni, Cu, Zn, Ga, Zr, Nb, Mo, Ag, Hf, Ta, W, Pt, Au and Pb, wherein the following inequalities are satisfied: $10<x\leq25$ at %, $*6\leq y<10$ at %, $0.5\leq z\leq12$ at %, $0\leq m\leq0.5$, $0\leq n\leq10$ at % and $0\leq p\leq0.25$. Next, the melt is fed onto a shoot with a guide surface tilted at about 1 degree to about 80 degrees with respect to a horizontal plane, thereby moving the melt onto a melt/roller contact region. The melt is then rapidly cooled using a chill roller to make a rapidly solidified alloy including an $R_2Fe_{14}B$ phase.

6 Claims, 18 Drawing Sheets

FOREIGN PATENT DOCUMENTS

| | | |
|---|---|---|
| EP | 1 061 532 A1 | 12/2000 |
| JP | 59-046008 | 3/1984 |
| JP | 60-009852 | 1/1985 |
| JP | 61-140350 | 6/1986 |
| JP | 64-703 | 1/1989 |
| JP | 64-7501 | 1/1989 |
| JP | 64-7502 | 1/1989 |
| JP | 1-100242 | 4/1989 |
| JP | 2-298003 | 12/1990 |
| JP | 3-260018 | 11/1991 |
| JP | 3-261104 | 11/1991 |
| JP | 7-122412 | 5/1995 |
| JP | 8-167515 | 6/1996 |
| JP | 11-071646 | 6/1996 |
| JP | 9-155507 | 6/1997 |
| JP | 09-155513 | 6/1997 |
| JP | 8-162312 | 3/1999 |
| JP | 11-323509 | 11/1999 |
| JP | 2000-079449 | 3/2000 |
| JP | 2000-079451 | 3/2000 |
| WO | WO 99/21196 | 4/1999 |
| WO | WO 00/03403 | 1/2000 |
| WO | WO 00/45397 | 8/2000 |
| WO | WO 00/52713 | 9/2000 |

OTHER PUBLICATIONS

W.C. Chang, et al., "The Effects of Refractory Metals on the Magnetic Properties Of $\alpha$–Fe/$R_2Fe_{14}B$–Type Nanocomposites", IEEE, Transactions on Magnetics, vol. 35,No. 5, Sep. 1999, pp. 3265–3267.

W.C. Chang, et al., Magnetic and Microstructure Sudies of boron–enriched $(Nd_{0.95}La_{0.05})_{11}Fe_{76.5-x}Co_xTi_2B_{10.5}$ (x=0–15) Melt–Spun Ribbons, IEEE, Transactions on Magnetics, vol. 36, No. 5, Sep. 2000, pp. 312–3314.

W.C. Chang, et al., "High performance $\alpha$–Fe/$Nd_2Fe_{14}B$–type nancomposites", Applied Physics Letters, vol., 72 No. 1, Jan. 1998, pp. 121–123.

W.C. Chang, et al., "The effect of boron and rare earth contents on the magnetic properties of La and Cr substituted $\alpha$–Fe/$R_2Fe_{14}B$–Type Nanocomposites", Journal of Applied Physics, vol. 83, No. 11, Jun. 1998pp. 6271–6273.

G. Ya. Merkulova, et al., "The temperature dependence of coercivity in nanocrystalline Nd–Fe–B–(TiC)magnets", Journal of Applied Physics, Vo.87 No. 9, May 2000, pp. 4738–4740.

H. Chiriac, et al., "$Nd_gFe_{73}Co_5Hf_2B_{12}$ strip cast alloy", Journal of Applied Physics, vol. 87 No. 9, May 2000, pp. 5338–5340.

J. Bernardi, et al., "Microstructural analysis of strip cast Nd–Fe–B alloys for high (BH) $_{max}$ magnets", Journal of Applied Physics, vol. 83 No. 11, Jun. 1998, pp. 6396–6398.

W.C. Chang, et al., "The effects of La–substitution on the microstructure and magnetic properties of nanocomposite NdFeB melt spun ribbons", Journal of Magnetism and Magnetic Materials, Vo.167 Nos. 1–2, Mar. 1997, pp. 65–70.

W.C. Chang, et al., "High performance $\alpha$–Fe/$R_2Fe_{14}$ B–type nanocomposites with nominal compositions of $(Nd,La)_{9.5}$, $Fe_{78-x}Co_xCr_2B_{10.5\,(x=0-10)}$) Journal of Magnetism and Magnetic Materials", Vo. 189 No. 1, Oct. 1998, pp. 51–61.

R. Hermann, et al., "Growth kinetics in undercooled Nd–Fe–B alloys with carbon and Ti or Mo additions, Journal of Magnetism and Magnetic Materials", Vo.213 Nos. 1–2, Apr. 2000, pp. 82–86.

Q. Chen, et al., "A Study on the Phase Transformation and Exchange–coupling of $(Nd_{0.95}La_{0.05})_{9.5}$ $Fe_{bal}C_{05}Nb2B_{10.5}$ Nanaocomposites, Materials Research Society Symposium Proceedings", Vo.577, Apr. 1999,pp. 209–219.

U.S. patent application Ser. No. 09/863,902, H.Kanekiyo, et al., "Permanent Magnet Including Multiple Ferromagnetic Phases and Method for Producing the Magnet", filing Date May 24, 2001.

U.S. application No. 10/381,412 filed on Mar. 25, 2003, currently pending; for: "Process for Producing, Through Strip Casting, Raw Alloy for Nanocomposite Type Permanent Magnet"; Applicants: Ryo Murakami et al.

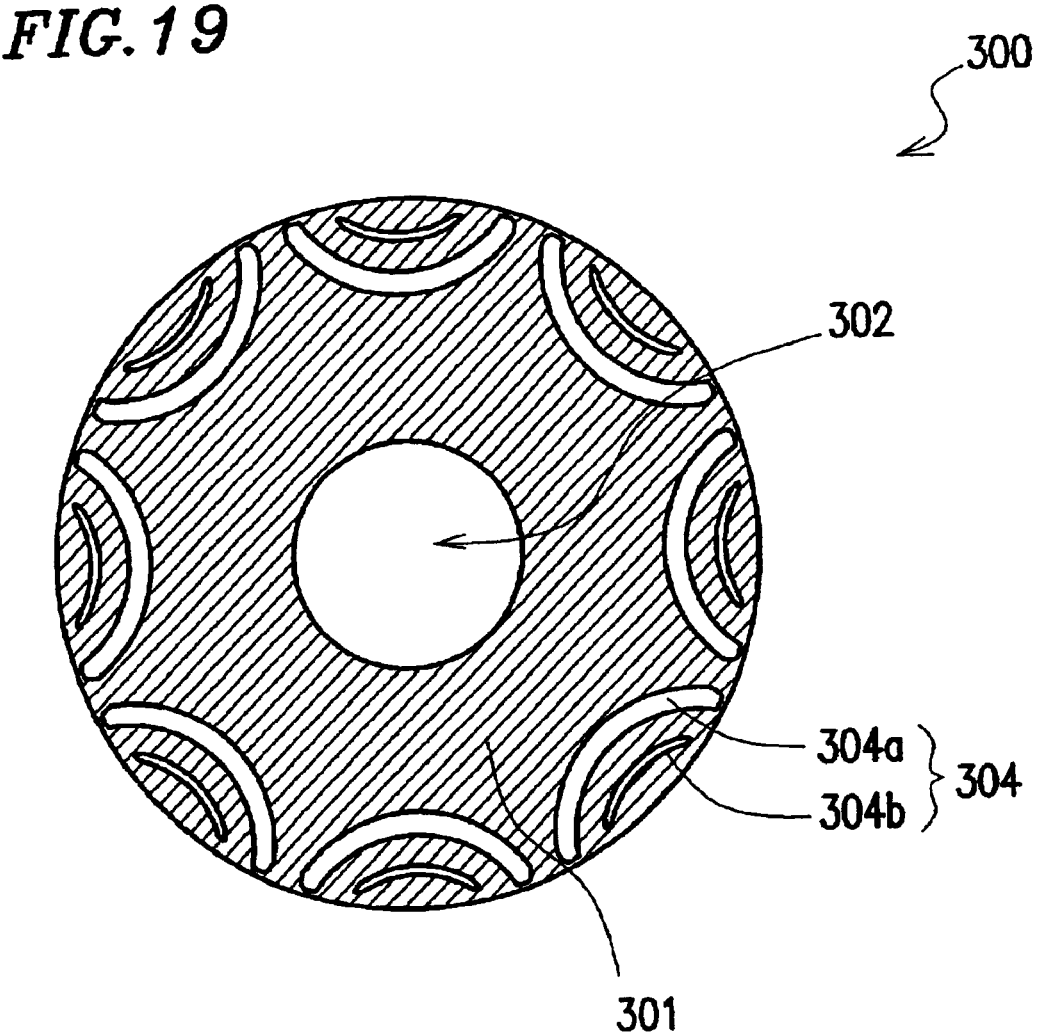

NANOCOMPOSITE MAGNET AND METHOD FOR PRODUCING SAME

BACKGROUND OF THE INVENTION

1. Field of the Invention

The present invention generally relates to a method for producing a permanent magnet that is applicable for use in motors and actuators of various types, and more particularly, the present invention relates to an iron-based rare earth magnet including multiple ferromagnetic phases and a method for producing such a novel magnet.

2. Description of the Related Art

Recently, it has become more and more necessary to further improve the performance of, and further reduce the size and weight of, consumer electronic appliances, office automation appliances and various other types of electric equipment. For these purposes, a permanent magnet for use in each of these appliances is required to maximize its performance to weight ratio when operated as a magnetic circuit. For example, a permanent magnet with a remanence $B_r$ of 0.5 T or more is now in high demand. Hard ferrite magnets have been used widely because magnets of this type are relatively inexpensive. However, the hard ferrite magnets cannot achieve the high remanence $B_r$ of 0.5 T or more.

An Sm—Co type magnet, produced by a powder metallurgical process, is currently known as a typical permanent magnet that achieves the high remanence $B_r$ of 0.5 T or more. However, the Sm—Co type magnet is expensive, because Sm and Co are both expensive materials.

As for the Nd—Fe—B type magnet on the other hand, the magnet is mainly composed of relatively inexpensive Fe (typically at about 60 wt % to 70 wt % of the total weight), and is much less expensive than the Sm—Co type magnet. Examples of other high-remanence magnets include an Nd—Fe—B type sintered magnet produced by a powder metallurgical process and an Nd—Fe—B type rapidly solidified magnet produced by a melt quenching process. An Nd—Fe—B type sintered magnet is disclosed in Japanese Laid-Open Publication No. 59-46008, for example, and an Nd—Fe—B type rapidly solidified magnet is disclosed in Japanese Laid-Open Publication No. 60-9852, for instance. Nevertheless, it is still expensive to produce the Nd—Fe—B type magnet. This is partly because huge equipment and a great number of manufacturing and processing steps are required to separate and purify, or to obtain by reduction reaction, Nd, which usually accounts for 10 at % to 15 at % of the magnet. Also, a powder metallurgical process normally requires a relatively large number of manufacturing and processing steps by its nature.

Compared to an Nd—Fe—B type sintered magnet formed by a powder metallurgical process, an Nd—Fe—B type rapidly solidified magnet can be produced at a lower cost by a melt quenching process. This is because an Nd—Fe—B type rapidly solidified magnet can be produced through relatively simple process steps of melting, melt quenching and heat treating. However, to obtain a permanent magnet in bulk by a melt quenching process, a bonded magnet should be formed by compounding a magnet powder, made from a rapidly solidified alloy, with a resin binder. Accordingly, the magnet powder normally accounts for at most about 80 volume % of the molded bonded magnet. Also, a rapidly solidified alloy, formed by a melt quenching process, is magnetically isotropic.

For these reasons, an Nd—Fe—B type rapidly solidified magnet produced by a melt quenching process has a remanence Br lower than that of a magnetically anisotropic Nd—Fe—B type sintered magnet produced by a powder metallurgical process.

As disclosed in Japanese Laid-Open Publication No. 1-7502, a technique of adding, in combination, at least one element selected from the group consisting of Zr, Nb, Mo, Hf, Ta and W and at least one more element selected from the group consisting of Ti, V and Cr to the material alloy effectively improves the magnetic properties of an Nd—Fe—B type rapidly solidified magnet. When these elements are added to the material alloy, the magnet has increased coercivity $H_{cJ}$ and anticorrosiveness. However, the only known effective method of improving the remanence Br is increasing the density of the bonded magnet. Also, where an Nd—Fe—B type rapidly solidified magnet includes a rare earth alloy at 6 at % or more, a melt spinning process, in which a melt of its material alloy is ejected against a chill roller, has often been used in the prior art to rapidly cool and solidify the material alloy at an increased rate.

As for an Nd—Fe—B type rapidly solidified magnet, an alternative magnet material was proposed by R. Coehoom et al., in J. de Phys, C8, 1998, pp. 669–670. The Coehoom material has a composition including a rare earth element at a relatively low mole fraction (i.e., around $Nd_{3.8}Fe_{77.2}B_{19}$, where the subscripts are indicated in atomic percentages); and an $Fe_3B$ phase as its main phase. This permanent magnet material is obtained by heating and crystallizing an amorphous alloy that has been prepared by a melt quenching process. Also, the crystallized material has a metastable structure in which soft magnetic $Fe_3B$ and hard magnetic $Nd_2Fe_{14}B$ phases coexist and in which crystal grains of very small sizes (i.e., on the order of several nanometers) are distributed finely and uniformly as a composite of these two crystalline phases. For that reason, a magnet made from such a material is called a "nanocomposite magnet". It was reported that such a nanocomposite magnet has a remanence $B_r$ as high as 1 T or more. But the coercivity $H_{cJ}$ thereof is relatively low, i.e., in the range from 160 kA/m to 240 kA/m. Accordingly, this permanent magnet material is applicable only when the operating point of the magnet is 1 or more.

It has been proposed that various metal elements be added to the material alloy of a nanocomposite magnet to improve the magnetic properties thereof. See, for example, Japanese Laid-Open Publication No. 3-261104, Japanese Patent Publication No. 2727505, Japanese Patent Publication No. 2727506, PCT International Publication No. WO 003/03403 and W. C. Chan et. al., "The Effects of Refractory Metals on the Magnetic Properties of $\alpha$-$Fe/R_2Fe_{14}B$-type Nanocomposites", IEEE Trans. Magn. No.5, INTERMAG. 99, Kyongiu, Korea, pp. 3265–3267, 1999. However, none of these proposed techniques are reliable enough to always obtain a sufficient "characteristic value per cost". More specifically, none of the nanocomposite magnets produced by these techniques realizes a coercivity high enough to actually use it in various applications. Thus, none of these magnets can exhibit commercially viable magnetic properties.

SUMMARY OF THE INVENTION

In order to overcome the problems described above, preferred embodiments of the present invention provide a method for producing an iron-based alloy permanent magnet with excellent magnetic properties at a low cost, and provide a permanent magnet that achieves a coercivity $H_{cJ}$ that is high enough to actually use the magnet in various applications (e.g., $H_{cJ} \geq 600$ kA/m) while maintaining a remanence $B_r$ of about 0.8 T or more.

According to a preferred embodiment of the present invention, a method of making a material alloy for an iron-based rare earth magnet includes the step of preparing a melt of an iron-based rare earth material alloy having a composition represented by the general formula $(Fe_{1-m}T_m)_{100-x-y-z-n}(B_{1-p}C_p)_xR_yTi_zM_n$. In this formula, T is at least one element selected from the group consisting of Co and Ni; R is at least one element selected from the group consisting of Y (yttrium) and the rare earth elements; and M is at least one element selected from the group consisting of Al, Si, V, Cr, Mn, Ni, Cu, Zn, Ga, Zr, Nb, Mo, Ag, Hf, Ta, W, Pt, Au and P. The mole fractions x, y, z, m, n and p preferably satisfy the inequalities of: 10 at %<x≦25 at %; 6 at %≦y<10 at %; 0.5 at %≦z≦12 at %; 0≦m≦0.5; 0 at %≦n≦10 at %; and 0≦p≦0.25, respectively. The method further includes the step of feeding the melt of the material alloy onto a guide, which includes a guide surface that defines an angle of about 1 to about 80 degrees with respect to a horizontal plane, thereby moving the melt onto a region where the melt comes into contact with a chill roller. The method further includes the step of rapidly cooling the melt using the chill roller to make a rapidly solidified alloy including an $R_2Fe_{14}B$ phase.

In one preferred embodiment of the present invention, the cooling step may include the step of adjusting a flow width of the melt to a predetermined size in an axial direction of the chill roller using the guide.

In another preferred embodiment of the present invention, the rapidly solidified alloy may be made within a reduced-pressure atmosphere.

Then, the atmospheric gas preferably has its pressure controlled at between about 0.13 kPa and about 100 kPa.

In still another preferred embodiment, the rapidly solidified alloy produced in the cooling step may include the $R_2Fe_{14}B$ phase at about 60 volume percent or more.

In yet another preferred embodiment, in the cooling step, a surface velocity of the chill roller may be controlled at between about 5 m/sec and about 26 m/sec, and a feeding rate per unit width of the melt may be controlled at about 3 kg/min/cm or less.

In yet another preferred embodiment, the method may include the step of forming a structure in which three or more crystalline phases, including at least the $R_2Fe_{14}B$ phase and α-Fe and ferromagnetic iron-based boride phases, exist; an average crystal grain size of the $R_2Fe_{14}B$ phase is between about 20 nm and about 200 nm; and an average crystal grain size of the α-Fe and boride phases is between about 1 nm and about 50 nm.

In yet another preferred embodiment, an iron-based boride phase with ferromagnetic properties may exist around a grain boundary or sub-boundary of the $R_2Fe_{14}B$ phase.

Preferably, the structure is formed by subjecting the rapidly solidified alloy to a heat treatment for crystallization. After the heat treatment, the $R_2Fe_{14}B$ phase constitutes about 65 vol % to about 85 vol % of the alloy.

In that case, the heat treatment preferably includes a step of keeping the rapidly solidified alloy heated to a temperature between about 550° C. and about 850° C. for approximately 30 seconds or more.

More preferably, the method further includes the step of pulverizing the rapidly solidified alloy before subjecting the rapidly solidified alloy to the heat treatment.

In yet another preferred embodiment, the iron-based boride phase may include $Fe_3B$ and/or $Fe_{23}B_6$.

In yet another preferred embodiment, the element M always includes Nb. In this particular preferred embodiment, the melt of the material alloy including Nb has a liquidus temperature lower by about 10° C. or more than that of another iron-based rare earth magnet material alloy that has substantially the same composition as the material alloy including Nb but that includes substantially no Nb.

More specifically, the material alloy preferably includes Nb in an amount between about 0.1 at % and about 3 at %.

In yet another preferred embodiment, an atomic ratio p of C in the general formula preferably satisfies the inequality of 0.01≦p<0.25.

In yet another preferred embodiment, before the melt is fed onto the guide, the melt preferably has its kinematic viscosity controlled at approximately $5 \times 10^{-6}$ m$^2$/sec or less.

Where 0.01≦p<0.25, a compound phase, which precipitates first while the melt is being rapidly cooled and solidified, preferably has its solidification temperature decreased by about 5° C. or more compared to a melt of another material alloy with an atomic ratio p of about 0.

In that case, the compound phase that precipitates first while the melt is being rapidly cooled and solidified in the cooling step may be a titanium boride compound.

In yet another preferred embodiment, the cooling step may be performed by rotating the chill roller, which preferably has a centerline roughness Ra of about 20 μm or less on its surface, at a surface velocity of approximately 10 m/sec or more.

In yet another preferred embodiment, a melt flow quenching rate, at which each flow of the melt is rapidly cooled and solidified by the chill roller in the cooling step, may be controlled at about 0.7 kg/min or more but less than about 4 kg/min.

In yet another preferred embodiment, each flow of the melt may have its width controlled in the cooling step by the guide at about 5 mm or more but less than about 20 mm.

In yet another preferred embodiment, the melt may have its kinematic viscosity controlled at approximately $5 \times 10^{-6}$ m$^2$/sec or less.

In yet another preferred embodiment, the guide may have its surface temperature kept at approximately 300° C. or more so that the melt has a kinematic viscosity of no greater than about $5 \times 10^{-6}$ m$^2$/sec.

In yet another preferred embodiment, the rapidly solidified alloy may have a thickness of between about 50 μm and about 200 μm.

In yet another preferred embodiment, the guide may be made of a material that includes $Al_2O_3$ at about 80 volume percent or more.

In yet another preferred embodiment, the chill roller may include a base made of a material with a thermal conductivity of approximately 50 W/m/K or more.

In that case, the base of the chill roller is preferably made of carbon steel, tungsten, iron, copper, molybdenum, beryllium or a copper alloy, or other suitable material.

Optionally, the base of the chill roller may have its surface plated with chromium, nickel or a mixture thereof, or other suitable material.

Another preferred embodiment of the present invention provides a method for producing an iron-based permanent magnet that includes the steps of preparing the material alloy for the iron-based rare earth magnet by the inventive method of making a material alloy according to the preferred embodiments of the present invention described above, and subjecting the material alloy for the iron-based rare earth magnet to a heat treatment.

In another preferred embodiment of the present invention, an inventive method for producing a bonded magnet includes the steps of preparing a powder of the material alloy for the iron-based rare earth magnet by the inventive method of making a material alloy or a powder of the iron-based permanent magnet by the inventive method for producing an iron-based permanent magnet according to the preferred embodiments described above, and processing the powder into the bonded magnet.

A rapidly solidified alloy according to various preferred embodiments of the present invention preferably has a composition represented by the general formula $(Fe_{1-m}T_m)_{100-x-y-z-n}Q_xR_yTi_zM_n$. In this formula, T is at least one element selected from the group consisting of Co and Ni; Q is at least one element selected from the group consisting of B and C; R is a rare earth element; and M is at least one element selected from the group consisting of Al, Si, V, Cr, Mn, Ni, Cu, Zn, Ga, Zr, Nb, Mo, Hf, Ta, W, Pt, Pb, Au and Ag. The mole fractions x, y, z, m and n preferably satisfy the inequalities of: 10 at %<x≦20 at %; 6 at %≦y<10 at %; 0.5 at %≦z≦6 at %; 0≦m≦0.5; and 0 at %≦n≦5 at %, respectively. The alloy preferably has a thickness of between about 50 μm and about 200 μm. In this alloy, a crystal structure has been formed on each of two surfaces thereof that cross a thickness direction at right angles.

In one preferred embodiment of the present invention, the crystal structure may include a ferromagnetic boride phase with an average crystal grain size of between about 1 nm and about 50 nm, and an $R_2Fe_{14}B$ phase with an average crystal grain size of between about 20 nm and about 200 nm.

In another preferred embodiment of the present invention, an amorphous portion is interposed between the crystal structures on the two surfaces.

In this particular preferred embodiment, the alloy preferably has a thickness of about 80 μm or more.

Another rapidly solidified alloy according to a preferred embodiment of the present invention has a composition represented by the general formula $(Fe_{1-m}T_m)_{100-x-y-z-n}Q_xR_yTi_zM_n$. In this formula, T is at least one element selected from the group consisting of Co and Ni; Q is at least one element selected from the group consisting of B and C; R is a rare earth element; and M is at least one element selected from the group consisting of Al, Si, V, Cr, Mn, Cu, Zn, Ga, Zr, Nb, Mo, Hf, Ta, W, Pt, Pb, Au and Ag. The mole fractions x, y, z, m and n preferably satisfy the inequalities of: 10 at %<x≦20 at %; 6 at %≦y<10 at %; 0.5 at %≦z≦6 at %; 0≦m≦0.5; and 0 at %≦n≦5 at %, respectively. The alloy preferably has a thickness of between about 60 μm and about 150 μm and a recoil permeability of between about 1.1 and about 2.

A magnet powder according to a preferred embodiment of the present invention has a composition represented by the general formula $(Fe_{1-m}T_m)_{100-x-y-z-n}Q_xR_yTi_zM_n$. In this formula, T is at least one element selected from the group consisting of Co and Ni; Q is at least one element selected from the group consisting of B and C; R is a rare earth element; and M is at least one element selected from the group consisting of Al, Si, V, Cr, Mn, Cu, Zn, Ga, Zr, Nb, Mo, Hf, Ta, W, Pt, Pb, Au and Ag. The mole fractions x, y, z, m and n preferably satisfy the inequalities of: 10 at %<x≦20 at %; 6 at %≦y<10 at %; 0.5 at %, z≦6 at %; 0≦m≦0.5; and 0 at %≦n≦5 at %, respectively. The powder preferably has a mean particle size of between about 60 μm and about 110 μm. A ratio of a major-axis size of the powder to a minor-axis size thereof is between about 0.3 and about 1. The powder preferably has a coercivity $H_{cJ}$ of approximately 600 kA/m or more.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 19 is a schematic representation illustrating the configuration of a magnet-embedded rotor 300 as another preferred embodiment of the present invention.

DETAILED DESCRIPTION OF PREFERRED EMBODIMENTS

Figure 1:
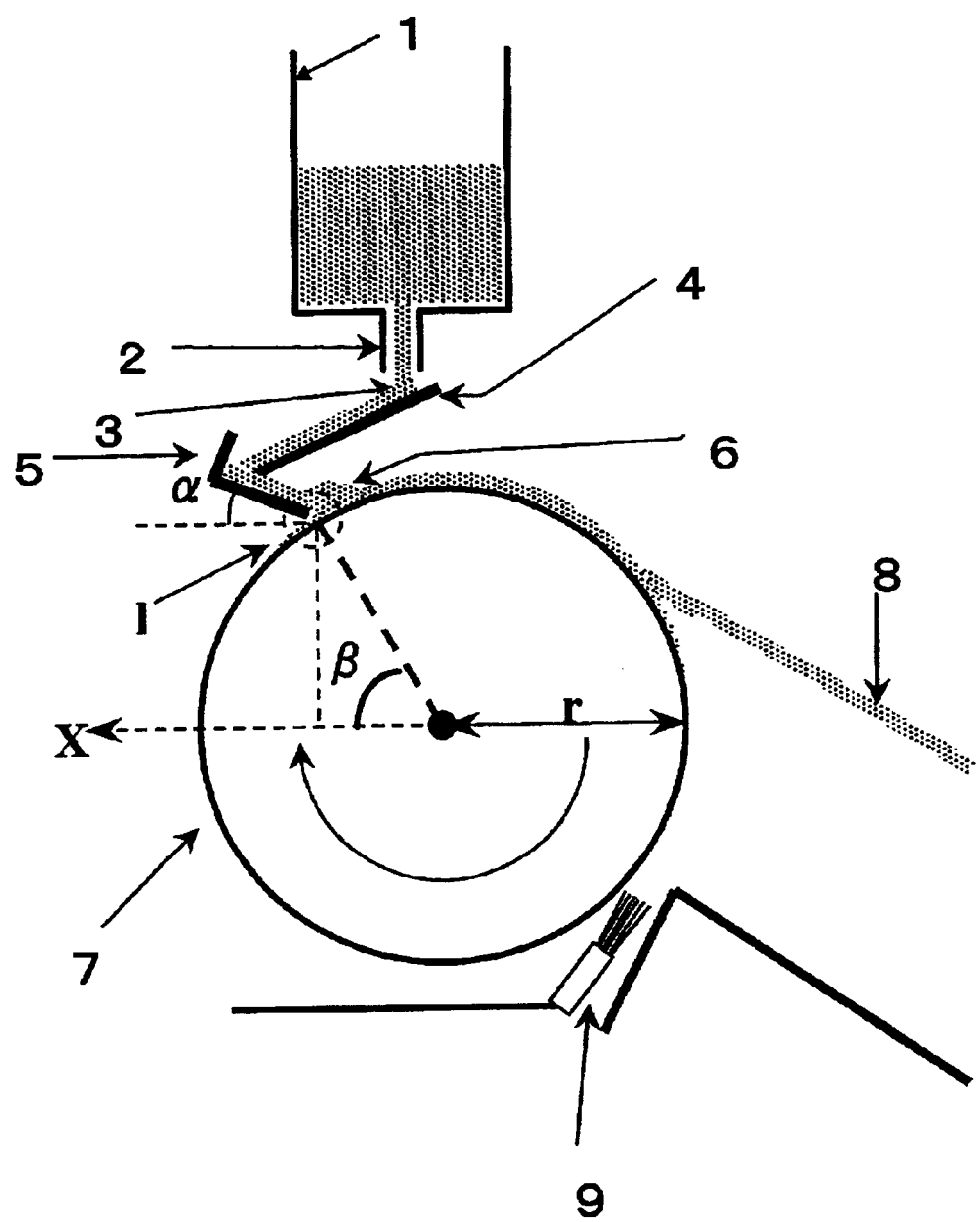
FIG. 1 illustrates the arrangement of an exemplary strip caster preferably used in various preferred embodiments of the present invention.

In an inventive method for producing a permanent magnet, a melt of an iron-based alloy, including Fe, B, R (which is at least one of the rare earth elements including Y) and Ti, is rapidly cooled by a strip casting process within a low-pressure atmosphere, thereby making a rapidly solidified alloy including a micro-crystalline $R_2Fe_{14}B$ phase. The rapidly solidified alloy may then be heat-treated to crystallize amorphous portions remaining in the rapidly solidified alloy.

A strip casting process is a technique of making a thin strip of rapidly solidified alloy by bringing a melt of an alloy into contact with the surface of a chill roller and rapidly cooling and solidifying the melt. According to preferred embodiments of the present invention, the melt is rapidly cooled and solidified using a chill roller that rotates faster than that used for a known strip casting process. Compared to a melt spinning process in which a melt of an alloy is ejected through a nozzle orifice onto the surface of a chill roller, the strip casting process results in a lower cooling rate. However, the strip casting process excels in mass productivity because this process provides a thin-strip of rapidly solidified alloy with relatively large width and thickness.

According to preferred embodiments of the present invention, either a crystal structure including a microcrystalline $R_2Fe_{14}B$ phase or a structure in which a microcrystalline $R_2Fe_{14}B$ phase and amorphous phases coexist can be formed in the rapidly solidified alloy almost without precipitating a soft magnetic α-Fe phase therein. Thus, the excessive grain growth of the $R_2Fe_{14}B$ phase is prevented and the average crystal grain size thereof can be between about 20 nm and about 150 nm even after the rapidly solidified alloy has been heat-treated. As a result, a high-performance composite permanent magnet, in which fine crystal grains of the soft magnetic phases such as the α-Fe phase are distributed, can be obtained. In addition, the fine crystal grains of the soft magnetic phases exist around the grain boundaries or sub-boundaries of the $R_2Fe_{14}B$ phase, thus greatly improved exchange interactions among the respective constituent phases.

In the prior art, even when one tries to obtain a rapidly solidified alloy comprised of a lot of $R_2Fe_{14}B$ phase by rapidly cooling a molten alloy with a composition similar to that of preferred embodiments of the present invention (i.e., a composition including all the elements included in the inventive composition but Ti), the resultant alloy will have a structure in which a lot of α-Fe phase has grown coarsely. Thus, when the alloy is heated and crystallized after that, the α-Fe phase will increase its grain size excessively. Once soft magnetic phases, including the α-Fe phase, have grown too much, the magnetic properties of the alloy deteriorate significantly, thus making it virtually impossible to produce a quality permanent magnet from such an alloy.

Particularly with a material alloy containing boron at a relatively high percentage and rare earth element R at a relatively low percentage (less than 10 at %) like the alloy of preferred embodiments of the present invention, even if a melt of such an alloy is cooled at a low rate, crystalline phases like the $R_2Fe_{14}B$ phase cannot be produced so easily according to conventional methods. In the prior art, even if one tries to make a rapidly solidified alloy including the $R_2Fe_{14}B$ phase at 60 volume % or more by decreasing the cooling rate of the melt sufficiently, not only the $R_2Fe_{14}B$ phase but also the α-Fe phase or its precursor will precipitate excessively. Thus, when that alloy is heated and crystallized after that, the α-Fe phase will further grow to greatly deteriorate the magnet properties of the alloy.

Thus, it is widely believed in the art that the best way of obtaining a nanocomposite magnet with a high coercivity is to cool a melt of an alloy at an increased rate by a melt spinning process to amorphize most of the alloy first and then forming a highly fine and uniform structure by heating and crystallizing the amorphous phases. This is because they took it for granted that to obtain a nanocomposite structure in which fine crystal grains are distributed uniformly, there should be no other alternative but crystallizing the amorphous phases through an easily controllable heat treatment process.

Based on this popular belief, W. C. Chan et al., reported a technique of obtaining $Nd_2Fe_{14}B$ and α-Fe phases with grain sizes on the order of several tens nm. According to Chan's technique, the amorphous former La is added to a material alloy. Next, the material alloy is melt-spun to obtain a rapidly solidified alloy mainly composed of amorphous phases. And then the alloy is heated and crystallized to nucleate and grow both the $Nd_2Fe_{14}B$ and α-Fe phases simultaneously. See W. C. Chan et al., "The Effects of Refractory Metals on the Magnetic Properties of α-Fe/$R_2Fe_{14}B$-type Nanocomposites", IEEE Trans. Magn. No.5, INTERMAG. 99, Kyongiu, Korea, pp. 3265–3267, 1999. This article also teaches that adding a refractory metal element such as Ti in a very small amount (e.g., 2 at %) improves the magnetic properties and that the mole fraction of Nd, rare earth element, is preferably increased from about 9.5 at % to about 11.0 at % to reduce the grain sizes of the $Nd_2Fe_{14}B$ and α-Fe phases. The refractory metal is added to suppress borides like $R_2Fe_{23}B_3$ and $Fe_3B$ from being produced and to make a magnet consisting essentially of $Nd_2Fe_{14}B$ and α-Fe phases.

According to the Chan's technique, the rapidly solidified alloy for a nanocomposite magnet is prepared by a melt spinning process in which a molten alloy is ejected through a nozzle onto the surface of a chill roller that is rotating at a high velocity. The melt spinning process is suitably effective to make an amorphous rapidly solidified alloy because a process of this type ensures an extremely high cooling rate.

In contrast, according to preferred embodiments of the present invention, a molten alloy is cooled by a strip casting process at a cooling rate lower than that achieved by the known melt spinning process. However, the additive Ti can suppress not only the nucleation of the γ-Fe phase (which transforms into α-Fe on cooling) during the rapid solidification process but also the grain growth of soft magnetic phases like the α-Fe phase during the heating/crystallizing process. As a result, a rapidly solidified alloy, in which fine crystal grains of the $R_2Fe_{14}B$ phase are distributed uniformly, can be obtained.

According to preferred embodiments of the present invention, even though the material alloy used preferably includes a rare earth element at a relatively low percentage (e.g., less than about 10 at %), a permanent magnet, exhibiting high magnetization (or remanence) and coercivity and showing excellent loop squareness in its demagnetization curve, can be mass produced.

According to preferred embodiments of the present invention, the coercivity can be increased by making the $Nd_2Fe_{14}B$ phase nucleate and grow faster and earlier in the cooling process so that the $Nd_2Fe_{14}B$ phase increases its volume percentage and yet by suppressing the grain coarsening of the soft magnetic phases. Also, the magnetization can be increased probably because the additive Ti can produce a boride phase (e.g., ferromagnetic iron-based borides) from a B-rich non-magnetic amorphous phase existing in the rapidly solidified alloy and can reduce the volume percentage of the non-magnetic amorphous phase remaining in the heated and crystallized alloy.

Hereinafter, the iron-based rare earth alloy magnet of preferred embodiments of the present invention will be described in further detail.

First, a melt of an iron-based rare earth material alloy, having a composition represented by the general formula $(Fe_{1-m}T_m)_{100-x-y-z-n}(B_{1-p}C_p)_xR_yTi_zM_n$, is prepared. In this formula, T is at least one element selected from the group consisting of Co and Ni; R is at least one element selected from the group consisting of Y (yttrium) and the rare earth elements; and M is at least one element selected from the group consisting of Al, Si, V, Cr, Mn, Ni, Cu, Zn, Ga, Zr, Nb, Mo, Ag, Hf, Ta, W, Pt, Au and Pb. The mole fractions x, y, z, m, n and p preferably satisfy the inequalities of:

10 at %≦x≦25 at %;

6 at %<y≦10 at %;

0.5 at %≦z≦12 at %;

0≦m≦0.5;

0 at %≦n≦10 at %; and

0≦p≦0.25, respectively.

Next, a cooling step is carried out. Specifically, the melt of the material alloy is rapidly cooled by a strip casting process within a reduced pressure atmosphere, thereby making a rapidly solidified alloy including an $R_2Fe_{14}B$ phase with a small average crystal grain size (e.g., about 150 nm or less) at approximately 60 volume percent or more.

The rapidly solidified alloy obtained this way is then heated and crystallized if necessary to form a nanocomposite structure including $R_2Fe_{14}B$ and ferromagnetic iron-based boride phases. As the soft magnetic phases, a microcrystalline α-Fe phase may also be included in addition to the iron-based boride phase. The melt is rapidly cooled and the rapidly solidified alloy is heated and crystallized under such conditions that the $R_2Fe_{14}B$ phase will have an average crystal grain size of about 20 nm to about 200 nm and the boride and α-Fe phases will have an average crystal grain size of about 1 nm to about 50 nm in the nanocomposite structure.

According to preferred embodiments of the present invention, the additive Ti can contribute to producing a lot of $R_2Fe_{14}B$ phase preferentially while the molten alloy is being rapidly cooled and solidified.

In the resultant magnet, the $R_2Fe_{14}B$ phase has an average crystal grain size that is greater than that of the iron-based boride or α-Fe phase. Even though the hard magnetic $R_2Fe_{14}B$ phase has a relatively large average grain size, the soft magnetic phases like the α-Fe phase have a sufficiently small average grain size. Accordingly, these constituent phases are magnetically coupled together through exchange interactions and the magnetization direction of the soft magnetic phases is constrained by the hard magnetic phase. Consequently, the alloy as a whole exhibits excellent loop squareness in its demagnetization curve.

In preferred embodiments of the present invention, if various process conditions, including alloy composition, alloy cooling rate and heat treatment temperature, are controlled appropriately, iron-based boride and α-Fe phases with a saturation magnetization equal to, or even higher than, that of the $R_2Fe_{14}B$ phase can be produced. Examples of the iron-based borides produced include $Fe_3B$ (with a saturation magnetization of about 1.5 T) and $Fe_{23}B_6$ (with a saturation magnetization of about 1.6 T). In this case, the $R_2Fe_{14}B$ phase has a saturation magnetization of about 1.6 T where R is Nd, and the α-Fe phase has a saturation magnetization of about 2.1 T.

In preferred embodiments of the inventive process, those ferromagnetic iron-based borides are easily produced. The reason is that when a rapidly solidified alloy, mostly composed of the $R_2Fe_{14}B$ phase, is made, the amorphous phases existing in the solidified alloy should contain excessive amounts of boron. Accordingly, when the alloy is heated and crystallized, that excessive boron will bond to other elements easily, thus nucleating and growing those borides profusely. However, if that boron, contained in the amorphous phases, bonds to other elements and produces compounds with a low magnetization before the heat treatment, then the magnet as a whole will have significantly decreased magnetization. As used herein, the term "amorphous phase" means not only a phase in which the atomic arrangement is sufficiently disordered, but also a phase containing embryos for crystallization, extremely small crystalline regions (size: several nanometers or less), and/or atomic clusters. More specifically, the term "amorphous phase" refers to any phase having a crystal structure that cannot be defined by X-ray diffraction analysis or TEM observation. Stated otherwise, any phase having a crystal structure clearly identifiable by X-ray diffraction analysis or TEM observation will be herein referred to as a "crystalline phase".

The present inventors discovered and confirmed via experiments that only when Ti is added, the magnetization does not decrease but rather is increased as opposed to any other metal element additive such as V, Cr, Mn, Nb or Mo. Also, when Ti is added, the loop squareness of the demagnetization curve was much better than that of any of the elements described above. Accordingly, w the present inventors believe that Ti plays a key role in suppressing and minimizing the production of borides with low magnetizations. Particularly when relatively small percentages of B and Ti are included in a material alloy with a composition defined by preferred embodiments of the present invention, iron-based borides with ferromagnetic properties will easily grow while the alloy is being heat-treated. In such a case, boron included in the non-magnetic amorphous phases would be absorbed into the iron-based borides. For that reason, the non-magnetic amorphous phases, remaining in the heated and crystallized alloy, decrease their volume percentage but the ferromagnetic crystalline phase increases its volume percentage instead, thus increasing the remanence Br.

Also, where Ti is added, the grain growth of the α-Fe phase is suppressed and minimized, and excellent hard magnetic properties are achieved. In addition, ferromagnetic phases, other than the $R_2Fe_{14}B$ and α-Fe phases, can be produced and therefore a structure including three or more ferromagnetic phases can be formed in the alloy. In contrast, where any of the other metal elements (e.g., Nb, V, Cr, etc.), excluding Ti, is added, the grain growth of the α-Fe phase advances remarkably in a relatively high temperature range in which the α-Fe phase grows rapidly and the magnetization direction of the α-Fe phase cannot be effectively constrained by the exchange coupling between the α-Fe and hard magnetic phases. As a result, the demagnetization curve will have a greatly decreased loop squareness.

It should be noted that even where Nb, Mo or W is added instead of Ti, good hard magnetic properties, including superior loop squareness of the de-magnetization curve, are attainable by thermally treating the alloy in a relatively low temperature range where no α-Fe phase precipitates. In an alloy that has been heat-treated at such a low temperature, however, $R_2Fe_{14}B$ crystalline particles would be dispersed in non-magnetic amorphous phases and the alloy does not have the nanocomposite magnet structure. Also, if the alloy is heat-treated at an even higher temperature, then the α-Fe phase nucleates and grows out of the amorphous phases. Unlike the situation where Ti is added, the α-Fe phase rapidly grows and increases its grain size excessively after its nucleation. As a result, the magnetization direction of the α-Fe phase cannot be effectively constrained anymore by the exchange coupling between the α-Fe and hard magnetic phases, and the loop squareness of the demagnetization curve deteriorates considerably.

On the other hand, where V or Cr is added instead of Ti, either of these additive metal elements is coupled antiferromagnetically with Fe to form a solid solution, thus decreasing the magnetization considerably.

In contrast, where Ti is added to the material alloy, the crystallization kinetics of the α-Fe phase is slowed down, i.e., it would take a longer time for the α-Fe phase to nucleate and grow. Thus, the present inventors believe that the $Nd_2Fe_{14}B$ phase starts to nucleate and grow before the α-Fe phase has grown coarsely. For that reason, where Ti is added, crystal grains of the $Nd_2Fe_{14}B$ phase can be grown sufficiently and distributed uniformly before the α-Fe phase has grown too much.

Accordingly, only when Ti is added, the crystal grain coarsening of the α-Fe phase is suppressed sufficiently and minimized and therefore, iron-based borides with ferromagnetic properties can be obtained. Furthermore, Ti, as well as B and C, plays an important role as an element that delays the crystallization of Fe initial crystals (i.e., γ-Fe that will be transformed into α-Fe) during the melt quenching process and thereby facilitates the production of a supercooled liquid. Accordingly, even if a melt of the alloy including Ti is rapidly cooled and solidified at a relatively low cooling rate between about 102° C./sec and about 104° C./sec, a rapidly solidified alloy, in which the α-Fe phase with an excessively large grain size has not precipitated but which includes the microcrystalline $R_2Fe_{14}B$ phase at about 60 volume percent or more (and sometimes iron-based borides as well), can be obtained.

In preferred embodiments of the present invention, a strip casting process, in which a melt is directly poured through a shoot (i.e., an exemplary guide, described above) onto a chill roller without controlling the flow rate of the melt using a nozzle orifice, is preferably adopted. Accordingly, compared to a melt spinning process requiring that flow rate control using a nozzle orifice, the inventive process is much more productive and cost-effective. To amorphize the melt of an R—Fe—B type rare earth alloy in a cooling rate range realizable even with the strip casting process, normally B (boron) is preferably added at about 10 at % or more. However, if too much B is added, then non-magnetic amorphous phases with high B concentrations will remain in the metallic alloy structure even after the rapidly solidified alloy has been heated and crystallized. That is to say, no uniform, microcrystalline structure can be obtained. As a result, the volume percentage of the ferromagnetic phases decreases and the magnetization drops. However, if Ti is added as in preferred embodiments of the present invention, then the above phenomena are observed. Consequently, iron-based borides with a high saturation magnetization are produced and the magnetization increases unexpectedly.

Preferred Composition

If the total mole fraction x of B and C is about 10 at % or less, then it is difficult to make the desired rapidly solidified alloy, in which the microcrystalline $R_2Fe_{14}B$ and amorphous phases coexist, at a low cooling rate of about $10^{2°}$ C./sec to about $10^{5°}$ C./sec. Also, even if the alloy is heat-treated after that, the resultant coercivity will not be so high. Also, where the mole fraction x is about 10 at % or less, no iron-based borides with high saturation magnetizations are produced anymore. Boron included in the iron-based borides bonds to Ti to form a chemically stable compound. Accordingly, the higher the percentage of the iron-based borides, the higher the erosion resistance of the resultant magnet. For these reasons, x should preferably be greater than about 10 at %. On the other hand, if the total mole fraction x of B and C exceeds approximately 25 at %, then the volume percentage of the amorphous phases, remaining in the alloy even after the alloy has been heated and crystallized, increases. In addition, the percentage of the α-Fe phase, which has a higher saturation magnetization than any other constituent phase, decreases disadvantageously, and the remanence $B_r$ is reduced as a result. In view of these considerations, the total mole fraction x of B and C is preferably greater than about 10 at % and equal to or less than about 25 at %, more preferably greater than about 10 at % and equal to or less than about 17 at %.

The (atomic) ratio p of C to B and C is preferably between about 0 and about 0.25. To achieve the effects expected from the additive C, the C ratio p should preferably be equal to or greater than about 0.01. The reason is as follows. If p is much smaller than about 0.01, then almost no expected effects are attainable even if C is added. On the other hand, if p is far greater than about 0.25, then the volume percentage of the α-Fe phase produced increases too much thereby causing deterioration of the resultant magnetic properties. The lower limit of the ratio p is preferably about 0.02, while the upper limit thereof is preferably about 0.20. More preferably, the ratio p is between about 0.08 and about 0.15.

R is at least one element selected from the rare earth elements (including Y). Preferably, R preferably includes substantially no La or Ce. This is because if La or Ce is included, R (typically Nd) included in the $R_2Fe_{14}B$ phase should be replaced with La or Ce, thus decreasing the coercivity and the loop squareness of the demagnetization curve. However, the magnetic properties will not be affected so seriously if a very small percentage (i.e., about 0.5 at % or less) of La or Ce exists as an inevitably contained impurity. Therefore, the phrase "substantially no La (Ce)" or "substantially excluding La (Ce)" herein means that the content of La (Ce) is about 0.5 at % or less.

More specifically, R preferably includes Pr or Nd as an indispensable element, a portion of which may be replaced with Dy and/or Tb. If the mole fraction y of R is less than about 6 at %, then fine grains with the microcrystalline $R_2Fe_{14}B$ structure, which is needed for realizing the coercivity, do not crystallize sufficiently and the desired high coercivity $H_{cJ}$ cannot be obtained. On the other hand, if the mole fraction y of R is equal to or greater than about 10 at %, then the percentage of the iron-based borides with ferromagnetic properties decreases but that of the B-rich non-magnetic phases increases instead. As a result, the intended nanocomposite structure cannot be formed and the magnetization drops. For these reasons, the mole fraction y of the rare earth element R is preferably equal to or greater than about 6 at % but less than about 10 at % (e.g., from about 6 at % to about 9.5 at %), more preferably from about 8 at % to about 9.3 at %, and most preferably from about 8.3 at % to about 9.0 at %.

The additive Ti effectively contributes to nucleating and growing the hard magnet phases earlier than the soft magnet phases while the molten alloy is being rapidly cooled and solidified. In addition, the additive Ti increases the coercivity $H_{cJ}$, remanence $B_r$ and maximum energy product $(BH)_{max}$ and improves the loop squareness of the demagnetization curve.

If the mole fraction z of Ti is less than about 0.5 at %, then the above effects cannot be attained fully even though Ti is added. Nevertheless, if the mole fraction z of Ti exceeds about 12 at %, then the volume percentage of the amorphous phases, remaining in the alloy even after the alloy has been heated and crystallized, increases and the remanence $B_r$ is decreased. In view of these considerations, the mole fraction z of Ti is preferably in a range from about 0.5 at % to about 12 at %. The lower limit of a more preferable z range is about 1.0 at % and the upper limit thereof is about 6 at %. The upper limit of an even more preferable z range is about 5 at %.

Also, the higher the total mole fraction x of B and C, the more likely the amorphous phases, including an excessive percentage of boron, for example, are formed. Accordingly, the mole fraction z of Ti should preferably be set higher because of this reason also. Ti has a strong affinity for B and is condensed around the grain boundaries of the hard magnetic phases. However, if the ratio of the mole fraction z of Ti to the mole fraction x of B is too high, then Ti will not be present around the grain boundaries anymore but will be incorporated into the $R_2Fe_{14}B$ compound, thus possibly decreasing the magnetization. Nevertheless, if the z/x ratio is too low, then non-magnetic B-rich amorphous phases will be produced profusely. The present inventors confirmed via experiments that the mole fractions x and z are preferably controlled to satisfy the inequality of $0.05 \leq z/x \leq 0.4$, more preferably to satisfy the inequality of $0.1 \leq z/x \leq 0.35$ and even more preferably to satisfy the inequality of $0.13 \leq z/x \leq 0.3$.

To achieve various desired advantages and effects, metal element(s) M may be added. M is at least one element selected from the group consisting of Al, Si, V, Cr, Mn, Cu, Zn, Ga, Zr, Nb, Mo, Hf, Ta, W, Pt, Pb, Au and Ag.

The balance of the material alloy, other than the elements B, C, R, Ti and M, may be Fe alone. Alternatively, at least one transition metal element T selected from the group consisting of Co and Ni may be substituted for a portion of Fe, because the desired hard magnetic properties are attainable in that case also. However, if more than about 50% of Fe is replaced with T, then a high remanence $B_r$ of about 0.7 T or more cannot be obtained. For that reason, the percentage of Fe replaced is preferably from about 0% to about 50%. Also, by substituting Co for a portion of Fe, the loop squareness of the demagnetization curve improves and the Curie temperature of the $R_2Fe_{14}B$ phase increases, thus increasing the thermal resistance of the alloy. The percentage of Fe replaceable with Co is preferably within a range from about 0.5% to about 40%.

Hereinafter, specific examples of preferred embodiments of the present invention will be described in detail with reference to the accompanying drawings.

A first specific preferred embodiment of the present invention will be described.

In this preferred embodiment, a rapidly solidified alloy is prepared preferably using the strip caster shown in FIG. 1. The alloy preparation process is performed within an inert gas atmosphere to prevent the material alloy, which includes rare earth element R and Fe that are easily oxidizable, from being oxidized. The inert gas may be either a rare gas of helium or argon, for example, or nitrogen, or other suitable gas. The rare gas of helium or argon is preferred to nitrogen, because nitrogen reacts with the rare earth element R relatively easily.

The strip caster shown in FIG. 1 is disposed in a chamber (not shown) in which a reduced-pressure inert atmosphere can be created. As shown in FIG. 1, the strip caster preferably includes a melting crucible 1 with a teeming port 2 at the bottom, a chill roller 7, a guide including a downspout 4 and a shoot 5, and scraper gas spray 9. First, a material alloy is melted in the melting crucible 1. Next, the melt 3 is drained through the teeming port 2 and then guided by way of the downspout 4 and shoot 5 onto the chill roller 7 so as to be rapidly cooled and solidified thereon. The melt 3, which has been rapidly solidified on the chill roller 7, then leaves the roller 7 as a thin strip 8 as the roller 7 rotates. The scraper gas spray 9 is provided to make the thin-strip alloy 8 easily peelable from the chill roller 7.

The melting crucible 1 is constructed to feed the melt 3, prepared by melting the material alloy, onto the shoot 5 at a substantially constant feeding rate. This feeding rate is arbitrarily controllable by tilting the melting crucible 1 at a desired angle, for example. The downspout 4 is not an indispensable member but may be omitted. In that case, the melt 3 may be directly poured from the melting crucible 1 onto the shoot 5.

The outer circumference of the chill roller 7 is preferably made of a material having relatively good thermal conductivity (e.g., copper). The roller 7 may preferably have a diameter of about 30 cm to about 100 cm and a width of about 15 cm to about 100 cm. The roller 7 can be rotated at a predetermined velocity by a motor (not shown). By controlling this rotational velocity, the surface velocity of the chill roller 7 is arbitrarily adjustable. The cooling rate achieved by this strip caster is controllable within a range of from about $1 \times 10^{2\circ}$ C./sec to about $1 \times 10^{5\circ}$ C./sec by selecting an appropriate rotational velocity for the chill roller 7, for example.

The surface of the shoot 5 on which the melt 3 is guided forms a tilt angle α with respect to the horizontal plane X. The distance between the far end of the shoot 5 and the surface of the chill roller 7 is preferably within about several millimeters or less. Also, the shoot 5 is arranged such that the line connecting the far end of the shoot 5 to the center of the chill roller 7 forms an angle β (where 0≦β≦90 degrees) with respect to the horizontal plane X. The tilt angle α of the shoot 5 is preferably between about 1 and about 80 degrees, more preferably between about 5 and about 60 degrees. The angle β is preferably between about and about 55 degrees.

After having poured onto the shoot 5, the melt 3 will be teemed from the far end of the shoot 5 onto the surface of the chill roller 7, thereby forming a melt puddle 6 thereon.

The shoot 5 can rectify the flow of the melt 3 by delaying the flow velocity of the melt 3 to such a degree as to temporarily reserve the flow of the melt 3 that is being continuously fed from the melting crucible 1 at a predetermined flow rate. This rectification effect can be further increased with a dam plate for selectively damming back the surface flow of the melt 3 poured onto the shoot 5. By using this shoot 5, the melt 3 can be teemed so as to have a substantially constant width in the longitudinal direction of the chill roller 7. As used herein, the "longitudinal direction" of the chill roller 7 is equivalent to the axial direction of the roller 7 (i.e., the direction coming out of the paper). Also, the melt 3 being teemed can be spread so as to have a substantially uniform thickness. If the melt guide surface of the shoot 5 has its tilt angle α adjusted, the melt feeding rate is finely controllable. Due to its own weight, the melt 3 flows down the tilted guide surface of the shoot 5. Accordingly, the melt 3 has a kinetic momentum that is substantially parallel to the horizontal (i.e., X-axis) direction. That is to say, the larger the tilt angle α of the shoot 5, the higher the flow velocity of the melt 3 and the greater the momentum thereof.

In addition, the shoot 5 can also adjust the temperature of the melt 3 that is going to reach the chill roller 7. The temperature of the melt 3 on the shoot is preferably higher than the liquidus temperature thereof by about 100° C. or more. This is because if the temperature of the melt 3 is too low, then initial crystals of $TiB_2$, for example, which will affect the properties of the resultant rapidly solidified alloy, might locally nucleate and remain in the rapidly solidified alloy. Also, if the temperature of the melt 3 is too low, then the melt 3 should have its viscosity increased and much more likely splashes. The melt temperature on the shoot 5 is controllable by adjusting the temperature of the melt 3 that is being teemed from the melting crucible 1 toward the shoot 5 or the heat capacity of the shoot 5 itself, for example. If necessary, a shoot heater (not shown) may be provided specially for this purpose.

The shoot 5 of this preferred embodiment preferably includes a plurality of drains, which are spaced apart from each other at regular intervals in the axial direction of the chill roller 7, at the far end thereof that faces the outer circumference of the chill roller 7. The width of each of these drains (corresponding to the width of each melt flow) preferably falls within a range from about 0.5 cm to about 10.0 cm, more preferably from about 0.7 cm to about 4.0 cm. In the present preferred embodiment, each melt flow has a width of about 1 cm at its corresponding drain. It should be noted that each melt flow tends to increase its width laterally as the melt flow travels farther away from its associated drain. Where a number of drains are provided on the shoot 5 to form multiple melt flows as is done in this preferred embodiment, each adjacent pair of melt flows should not come into contact with each other.

After the melt 3 has been poured onto the shoot 5, the melt 3 is separated into a plurality of melt flows so that each melt flow has substantially the same width as that of its associated drain in the axial direction of the chill roller 7. Then, each of those melt flows comes into contact with the chill roller 7. Thereafter, each melt flow 3, which has been teemed onto the chill roller 7 at a predetermined width, moves upward on the circumference surface of the roller 7 as the roller 7 rotates. In this manner, the melt flow 3 is rapidly cooled while moving along with the roller 7. It should be noted that to prevent the melt from leaking, the distance between the far end of the shoot 5 and the chill roller 7 should preferably be about 3 mm or less, and more preferably from about 0.4 mm to about 0.7 mm.

The interval between each adjacent pair of drains is preferably between about 1 cm and about 10 cm. In this manner, the melt 3 can be brought into contact with the outer circumference of the chill roller 7 at mutually separate positions. Then, each melt flow that has been teemed through its associated drain can be cooled effectively. Consequently, even if the melt 3 is poured onto the shoot 5 at an increased rate, the desired cooling rate is realizable.

It should be noted that the shoot 5 does not have to have the configuration described above. Alternatively, the shoot 5 may have just one drain or each melt flow may be teemed at an increased width. Other modifications to the shoot 5 may also be made as desirable.

After the melt 3 has been rapidly solidified on the outer circumference of the rotating chill roller 7, the rapidly solidified alloy leaves the chill roller 7 as a thin-strip solidified alloy 8. In the present preferred embodiment, each melt flow, which has been teemed through associated one of the drains, is solidified as a strip of a predetermined width. Then, the solidified alloy 8 is crushed and collected by a collector (not shown).

As described above, the strip casting process does not use any nozzle unlike the melt spinning process. That is to say, the strip casting process does not experience any of the various problems associated with the melt spinning process. Specifically, in the strip casting process, the melt spray speed is not limited by the diameter of the nozzle or the melt is not solidified at the nozzle, either, to clog the nozzle up with the unintentionally solidified alloy. Thus, the strip casting process is very effective for mass production. Furthermore, no nozzle heating equipment or no melt head pressure control mechanism is needed. As a result, the initial equipment and equipment operation costs are greatly reduced advantageously.

Also, in the melt spinning process, the nozzle is not recyclable and therefore should be disposed of once used even though it usually needs a high processing cost to form the nozzle. In contrast, the strip casting process allows a repeated use of the shoot, thus requiring a much lower equipment operation cost.

Furthermore, in the strip casting process, the chill roller can be rotated at a lower velocity and the weight of the melt teemed can be increased as compared to the melt spinning process. Thus, the resultant thin-strip rapidly solidified alloy can be thicker.

In the strip casting process, however, the molten alloy is not ejected against the surface of the chill roller strongly. Accordingly, where the chill roller 7 rotates at a relatively high surface velocity of about 10 m/sec or more, it is difficult to form the melt puddle 6 on the surface of the chill roller 7 stably enough. Also, since no nozzle is used, the pressure applied by the melt onto the surface of the roller 7 is low. For that reason, very small gaps are likely created between the melt and the roller surface in the area where the melt should be in close contact with the roller surface. Consequently, the melt/roller surface contact ensured by the strip casting process is inferior to that ensured by the melt spinning process. This poor contact problem and ways of solving it will be described in further detail later.

In the present preferred embodiment, the upper limit of the melt feeding rate (i.e., the weight of the melt processed per unit time) is defined as a feeding rate per unit width of the melt/roller surface contact area. In the strip casting process, the melt comes into contact with the chill roller so as to have a predetermined contact width in the axial direction of the chill roller. Accordingly, the melt quenching condition greatly depends on the melt feeding rate per unit contact width.

If the melt feeding rate is too high, then the melt is quenched by the chill roller at a decreased rate. As a result, a rapidly solidified alloy, which has not been amorphized or nano-crystallized sufficiently but includes a crystallized structure at an excessive volume percentage and of an excessive particle size, is made unintentionally. That is to say, a material alloy suitably applicable to producing a nano-composite magnet cannot be obtained. Thus, according to the present preferred embodiment of the present invention, the feeding rate (kg/min) per unit contact width (cm) is preferably about 3 kg/min/cm or less.

Also, where three melt flows are brought into contact with the chill roller so that each melt flow has a contact width of about 2 cm, the feeding rate should preferably be about 0.5 kg/min/cm or more. Then, a processing rate of about 3 kg/min or more is realized.

In the present preferred embodiment, the melt is teemed at a feeding rate falling within the prescribed range onto the chill roller that rotates at a surface velocity falling within the particular range. In this manner, a desired rapidly solidified alloy can be manufacturing with high productivity even by the strip casting process. The strip casting process does not use any nozzle, which considerably increases the process cost as in a jet casting process, for example. Accordingly, no nozzle cost is required and the problems caused by stoppage of the production process due to the nozzle clogging are eliminated.

In the present preferred embodiment, the surface velocity of the chill roller may be about 5 m/sec or more but preferably less than about 20 m/sec. The reason is as follows. If the roller surface velocity is less than about 5 m/sec, then the cooling ability of the roller is too low to obtain the desired rapidly solidified alloy. On the other hand, if the roller surface velocity is about 20 m/sec or more, then it is difficult for the roller to bring the melt upward. Instead, the cooled and solidified alloy will scatter as thin flakes, thus possibly making it hard to collect the alloy as intended. The best surface velocity of the roller is changeable with the structure or material of the chill roller and the melt feeding rate. However, if the surface velocity is too high, then the resultant thin-strip alloy will be extremely thin. When the strip is too thin, it piles up with a low density and occupies a large volume in the chamber. What is worse, if the surface velocity is too high, the particles of the magnet powder, obtained by pulverizing the thin-strip alloy, will be flattened. Thus, when such a magnet powder is molded, the magnet powder will show a decreased flowability. Also, the die cavities can be filled with such a magnet powder at a decreased percentage. As a result, the resultant magnet has a decreased magnet powder percentage and exhibits deteriorated properties. On the other hand, if the surface velocity is too low, it is difficult to attain a sufficiently high cooling rate. In view of these respects, the surface velocity of the chill roller is preferably between about 5 m/sec and about 20 m/sec, and more preferably between about 6 m/sec and about 15 m/sec and even more preferably between about 10 m/sec and about 13 m/sec.

It should be noted that if the melt feeding rate per unit contact width exceeds approximately 3 kg/min/cm, then the predetermined cooling rate cannot be attained and it is hard to make the desired rapidly solidified alloy. An appropriate range of the feeding rate per unit contact width is changeable with the surface velocity and structure of the roller. Preferably, the feeding rate per unit contact width is about 2 kg/min/cm or less, more preferably about 1.5 kg/min/cm or less.

Also, the melt feeding rate (or processing rate) of the overall machine should preferably be about 3 kg/min or more. This is because a melt feeding rate of less than about 3 kg/min results in poor productivity and prevents the material from being produced at a reasonable cost. To achieve this overall melt feeding rate, the feeding rate per unit contact width should preferably be about 0.4 kg/min/cm or more where the shoot and the chill roller have their appropriate shapes.

For example, where the roller is made of Cu and has a diameter of about 35 cm and a width of about 15 cm, the feeding rate per unit contact width should preferably be between about 0.5 kg/min/cm and about 2 kg/min/cm for a roller surface velocity of about 5 m/sec. to about 10 m/sec. In that case, the rapid cooling process can be carried out at an overall feeding rate of about 0.5 kg/min. to about 6 kg/min.

By appropriately determining the shape and configuration of the shoot 5, the width and the number of melt drains and the melt feeding rate, for example, the resultant thin-strip rapidly solidified alloy can have an average thickness and width that are within preferred ranges. The thin-strip rapidly solidified alloy preferably has a width of about 15 mm to about 80 mm. Also, the thin-strip alloy may not be too thin or too thick. If the solidified alloy is too thin, then the tap density thereof will be low and it is hard to collect the alloy as intended. Nevertheless, if the solidified alloy is too thick, then the alloy may have been cooled on the melt/roller contact surface and on the free surface (i.e., melt surface) at mutually different cooling rates. That is to say, a portion of the alloy around the free surface may have been cooled at an insufficient rate. In view of these considerations, the thin-strip alloy preferably has a thickness between about 50 $\mu$m and about 250 $\mu$m, more preferably between about 60 $\mu$m and about 200 $\mu$m and even more preferably between about 70 $\mu$m and about 90 $\mu$m. Also, considering the fill density of a bonded magnet, the thin-strip alloy preferably has a thickness of greater than 80 $\mu$m.

Heat Treatment

In the present preferred embodiment, the heat treatment is conducted within an argon atmosphere. Preferably, the alloy is heated at a temperature increase rate of about 5° C./sec to about 20° C./sec, kept heated at a temperature between about 550° C. and about 850° C. for a period of time from approximately 30 seconds to approximately 20 minutes and then cooled to room temperature. This heat treatment results in nucleation and/or crystal growth of metastable phases in a remaining amorphous phase, thus forming a nanocomposite microcrystalline structure. According to the present preferred embodiment of the present invention, the microcrystalline $R_2Fe_{14}B$ ($Nd_2Fe_{14}B$) phase already accounts for about 60 volume % or more of the total volume of the alloy yet to be heat-treated (i.e., as-cast alloy). Thus, when the heat treatment is conducted under these conditions, α-Fe and other crystalline phases will not increase their sizes too much and the respective constituent phases other than the microcrystalline $Nd_2Fe_{14}B$ phase (i.e., the soft magnetic phases) will be distributed finely and uniformly in a grain boundary between the microcrystalline $Nd_2Fe_{14}B$ grains. After the heat treatment, the $R_2Fe_{14}B$ ($Nd_2Fe_{14}B$) phase constitutes about 65 vol % to about 85 vol % of the alloy.

If the heat treatment temperature is lower than about 550° C., then a lot of amorphous phases may remain even after the heat treatment and the resultant coercivity may not reach the desired level depending on the conditions of the rapid cooling process. On the other hand, if the heat treatment temperature exceeds about 850° C., the grain growth of the respective constituent phases will advance too much, thus decreasing the remanence $B_r$ and deteriorating the loop squareness of the demagnetization curve. For these reasons, the heat treatment temperature is preferably from about 550° C. to about 850° C., more preferably from about 570° C. to about 820° C.

In preferred embodiments of the present invention, a sufficient amount of crystal grains of the $Nd_2Fe_{14}B$ phase is distributed uniformly and finely in the rapidly solidified alloy. Accordingly, even if the rapidly solidified alloy is not heat-treated, the solidified alloy itself can exhibit sufficient magnet properties. That is to say, the heat treatment for crystallization is not indispensable for the present invention. However, to further improve the magnet properties, the heat treatment is preferably conducted. In addition, even though the heat treatment is carried out at lower temperatures than the known process, the magnet properties still can be improved significantly.

To prevent the alloy from being oxidized, the heat treatment is preferably conducted within an inert gas (e.g., Ar or $N_2$ gas) atmosphere at about 50 kPa or less. The heat treatment may also be carried out within a vacuum of about 0.1 kPa or less.

Before the heat treatment, the rapidly solidified alloy may include metastable phases such as $Fe_3B$, $Fe_{23}B_6$, $R_2Fe_{14}B$ and $R_2Fe_{23}B_3$ phases in addition to the $R_2Fe_{14}B$ ($Nd_2Fe_{14}B$) and amorphous phases. In that case, when the heat treatment is over, the $R_2Fe_{23}B_3$ phase will have disappeared. Instead, crystal grains of an iron-based boride (e.g., $Fe_{23}B_6$), showing a saturation magnetization equal to or even higher than that of $R_2Fe_{14}B$ phase, or α-Fe phase can be grown. It should be noted that the "$Fe_3B$ phase" herein includes an "$Fe_{3.5}B$ phase".

In preferred embodiments of the present invention, even if the soft magnet phases like the α-Fe phase that have crystal grain sizes smaller than that of the $R_2Fe_{14}B$ phase exist in the resultant magnet, excellent magnetic properties still can be achieved because the soft and hard magnetic phases are magnetically coupled together through exchange interactions.

After the heat treatment, the $Nd_2Fe_{14}B$ phase should preferably have an average crystal grain size of about 300 nm or less, which is a single magnetic domain size. The average crystal grain size of the $Nd_2Fe_{14}B$ phase is preferably from about 20 nm to about 200 nm, more preferably from about 20 nm to about 150 nm. On the other hand, if the ferromagnetic iron-based boride and α-Fe phases have an average crystal grain size of more than about 50 nm, then the exchange interactions among the respective constituent phases weakens, thus deteriorating the loop squareness of the demagnetization curve and decreasing $(BH)_{max}$.

Normally, these phases do not precipitate as very small crystallites (of a size smaller than 1 nm in diameter) but are formed as crystallites of a size as large as a few nm in diameter. For these reasons, the soft magnet phases, such as the boride and α-Fe phases, should preferably have an average crystal grain size of about 1 nm to about 50 nm, more preferably from about 5 nm to about 30 nm. To further improve the magnetic properties, the $Nd_2Fe_{14}B$ phase more preferably has an average crystal grain size of about 20 nm to about 100 nm and the soft magnetic phases more preferably have an average crystal grain size of about 1 nm to about 30 nm. Also, the average crystal grain size of the $Nd_2Fe_{14}B$ phase is preferably greater than that of the soft magnetic phases.

Figure 2:
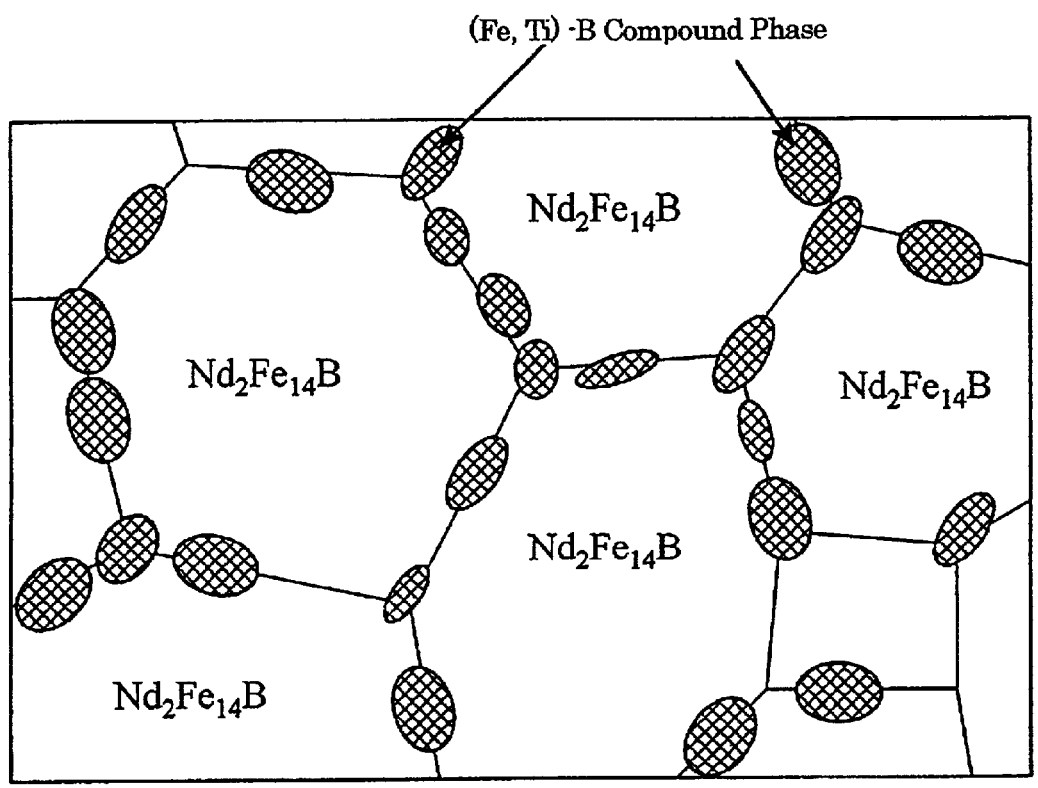
FIG. 2 illustrates the structure of a nanocomposite magnet produced by methods of preferred embodiments of the present invention.

Furthermore, according to this preferred embodiment, a microcrystalline structure such as that shown in FIG. 2, in which fine crystal grains of a boride phase (i.e., (Fe, Ti)—B compound phase) are distributed around the grain boundaries or sub-boundaries of the $Nd_2Fe_{14}B$ phase, can be obtained. A structure like this suitably maximizes the exchange interactions among the respective constituent phases. Ti exists in the iron-based boride. This is probably because Ti shows a close affinity to B and is easily concentrated in the iron-based boride. In other words, Ti and B strongly bond to each other in the iron-based boride. Thus, the additive Ti chemically stabilizes the iron-based boride.

It should be noted that the thin strip of the rapidly solidified alloy may be coarsely cut or pulverized before subjected to the heat treatment. After heat-treated, the resultant magnetic alloy may be finely pulverized to obtain a magnet powder. Then, various types of bonded magnets can be made from this powder by performing known process steps on the powder. In making a bonded magnet, the magnet powder of the iron-based rare earth alloy is compounded with an epoxy or nylon resin binder and then molded into a desired shape. In this case, a magnet w powder of any other type (e.g., an Sm—Fe—N type magnet powder or hard ferrite magnet powder) may be mixed with the nanocomposite magnet powder.

Using the resultant bonded magnet of preferred embodiments of the present invention, motors, actuators and various other rotating machines can be produced.

Where the magnet powder of various preferred embodiments of the present invention is used for an injection-molded bonded magnet, the powder is preferably pulverized to have a mean particle size of approximately 200 μm or less, more preferably from about 30 μm to about 150 μm. On the other hand, where the inventive magnet powder is used for a compression-molded bonded magnet, the powder is preferably pulverized to have a mean particle size of about 300 μm or less, more preferably from about 30 μm to about 250 μm and even more preferably from about 50 μm to about 200 μm with a bimodal size distribution.

A second specific preferred embodiment of the present invention will be described.

Where a melt of a material alloy having the above-described composition including Ti as an indispensable element is rapidly cooled and solidified by a strip casting process, a compound of Ti and B (e.g., $TiB_2$) is likely formed in the melt. As a result, the liquidus temperature of the melt becomes higher than that of a melt of a material alloy for an iron-based rare earth magnet with the known composition. Once the liquidus temperature of the melt has risen, the temperature of the melt should be raised (e.g., to about 100° C. higher than the liquidus temperature) to keep the viscosity of the melt sufficiently low. Otherwise, the melt cannot be teemed constantly enough.

However, if the melt to be teemed and rapidly cooled and solidified on the surface of the chill roller has its temperature increased, then the surface temperature of the roller will also increase. In that case, it will be harder for the resultant thin-strip rapidly solidified alloy to leave the chill roller. As a result, the solidified alloy easily winds around the roller. Once the thin-strip alloy has wound around the roller, the melt flows are fed onto the wound alloy one after another to considerably increase the average grain size of the crystalline phases produced in the rapidly solidified alloy. Consequently, the resultant magnet properties are significantly deteriorated.

A problem like this is rarely observed in a melt spinning process, in which a relatively light weight of melt is ejected through a nozzle. In the melt spinning process, the amount of the melt that comes into contact with the surface of the chill roller is small, and the strongly ejected melt can keep good contact with the roller surface. As a result, the melt cooling ability of the roller much less likely decreases and the melt can be cooled uniformly at a sufficiently high rate.

According to the strip casting process on the other hand, it is difficult to cool a large amount of melt uniformly at a sufficiently high rate because no nozzle is used. Also, where the material alloy has the inventive composition, the microcrystalline structure of the rapidly solidified alloy and the resultant magnet properties greatly depend on the rate or uniformity at which the melt is rapidly cooled. For these reasons, to mass produce high-performance nanocomposite magnets by the strip casting process, it is necessary to prevent the thin-strip alloy from being wound around the chill roller.

The present inventors discovered that when an appropriate amount of Nb was added to the material alloy with the above-described composition, the liquidus temperature of the alloy is decreased by as much as approximately 10° C. or more (e.g., about 40° C. to about 80° C.). Once the liquidus temperature of the melt has decreased, the viscosity of the melt hardly increases even if the temperature of the melt is lowered. Thus, the melt can be teemed continuously and constantly at a decreased temperature. Also, if the temperature of the melt being teemed has been decreased, the melt can be cooled sufficiently on the surface of the chill roller. Consequently, it is possible to prevent the rapidly solidified alloy from being wound around the roller. In addition, the rapidly solidified alloy can achieve a uniform microcrystalline structure and greatly reduced average grain size.

Thus, in the present preferred embodiment of the present invention, a melt of a material alloy, having a composition represented by the general formula $(Fe_{1-m}T_m)_{100-x-y-z-n}(B_{1-p}C_p)_x R_y Ti_z Nb_n$, is rapidly cooled and solidified by a strip casting process. In this formula, T is at least one element selected from the group consisting of Co and Ni; and R is at least one element selected from the group consisting of Y (yttrium) and the rare earth elements. The mole fractions x, y, z, m, n and p preferably satisfy the inequalities of:

10 at %$<x \leq$25 at %;
6 at %$\leq y<$10 at %;
0.5 at %$\leq z \leq$12 at %;
0$\leq m \leq$0.5;
at %$\leq n \leq$5 at %; and
0$\leq p \leq$0.25, respectively.

It should be noted that to prevent the solidified alloy from being wound around the chill roller, not just the addition of Nb but also control of the atmospheric gas pressure to the appropriate range are preferably carried out.

Figure 3:
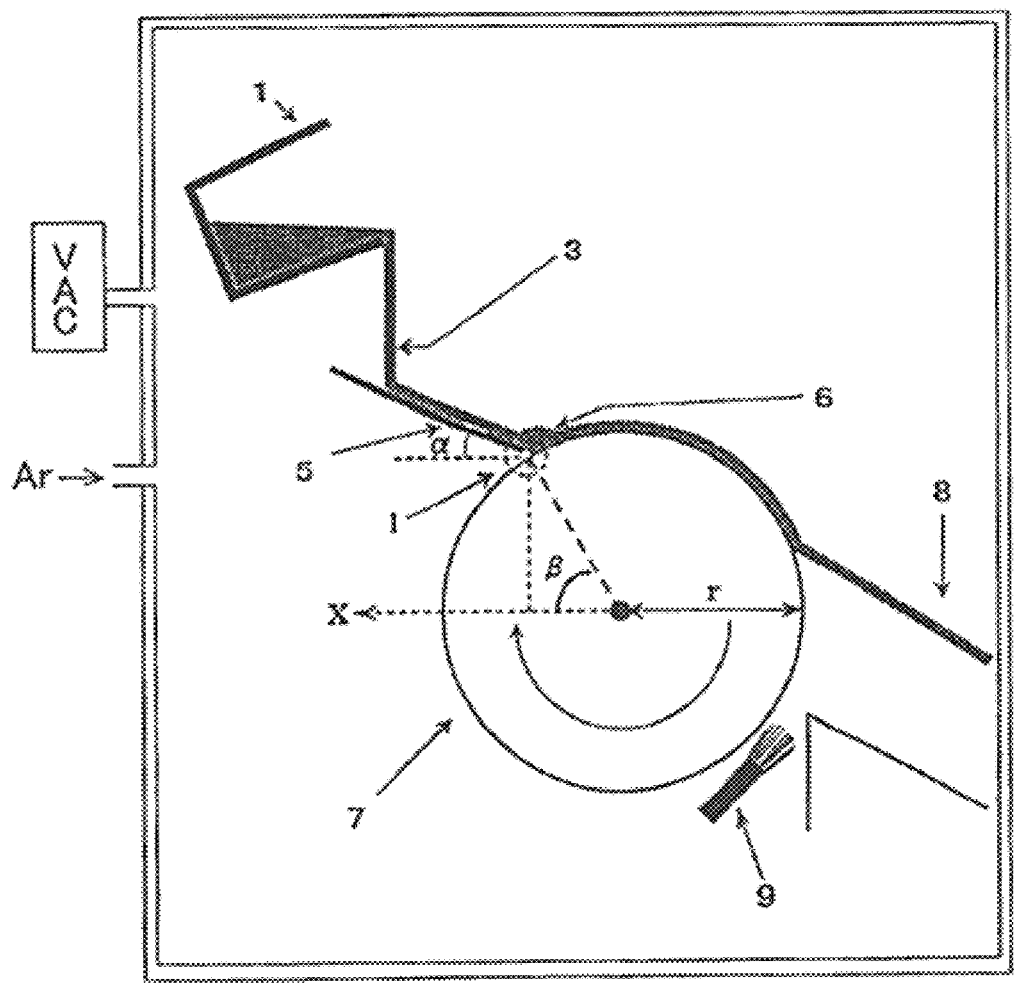
FIG. 3 illustrates the arrangement of another exemplary strip caster preferably used in various preferred embodiments of the present invention.

In the present preferred embodiment, a rapidly solidified alloy is produced using the strip caster shown in FIG. 3. The alloy preparation process is preferably performed within an inert gas atmosphere to prevent the material alloy, which includes rare earth element R and Fe that are easily oxidizable, from being oxidized. The inert gas may be either a rare gas of helium or argon, for example, or nitrogen.

The strip caster shown in FIG. 3 is placed in a chamber in which a low-pressure inert atmosphere can be created. Like the caster shown in FIG. 1, the caster shown in FIG. 3 also preferably includes a melting crucible 1, a chill roller 7, a shoot (tundish) 5, and a scraper gas spray 9. First, a material alloy is melted in the melting crucible 1. Next, the melt 3 is poured from the melting crucible 1 onto the chill roller 7 by way of the shoot 5 so as to be rapidly cooled and solidified on the roller 7. The melt 3, which has been rapidly solidified on the chill roller 7, then leaves the roller 7 as a thin strip 8 as the roller 7 rotates. The scraper gas spray 9 is provided to make the thin-strip alloy 8 easily peelable from the chill roller 7.

The melting crucible 1 is constructed to feed the melt 3, prepared by melting the material alloy, onto the shoot 5 at a substantially constant rate. This feeding rate is arbitrarily controllable by tilting the melting crucible 1 at a desired angle, for example.

The outer circumference of the chill roller 7 is preferably made of a material with a good thermal conductivity (e.g., copper). The roller 7 may have a diameter (=2r) of about 30 cm to about 100 cm and a width of about 15 cm to about 100 cm. The roller 7 can be rotated at a predetermined velocity by a motor (not shown). By controlling this rotational velocity, the surface velocity of the chill roller 7 is arbitrarily adjustable. The cooling rate achieved by this strip caster is controllable within a range from about $10^{2°}$ C./sec to about $2 \times 10^{4°}$ C./sec by selecting an appropriate rotational velocity for the chill roller 7, for example.

The melt 3, which has just been poured onto the shoot 5, can be teemed from the far end of the shoot 5 onto the surface of the chill roller 7 without being pressurized, thereby forming a melt puddle 6 on the surface of the chill roller 7.

The shoot 5 may be made of a ceramic, for example. The shoot 5 can rectify the flow of the melt 3 by delaying the flow velocity of the melt 3 to such a degree as to temporarily reserve the flow of the melt 3 that is being continuously supplied from the melting crucible 1 at a predetermined flow rate. This rectification effect can be further increased with a dam plate for selectively damming back the surface flow of the melt 3 that has been poured onto the shoot 5.

The same conditions as those specified for the first specific preferred embodiment are also applied to the strip casting process of the second specific preferred embodiment of the present invention. Also, once the rapidly solidified alloy has been prepared, the same process steps as those described for the first specific preferred embodiment will be performed on the rapidly solidified alloy.

In the second specific preferred embodiment of the present invention, Nb, as well as Ti, is preferably added to the iron-based rare earth alloy, thereby lowering the liquidus temperature of the molten alloy. Consequently, the rapidly solidified alloy can be mass produced constantly enough.

It should be noted that the mole fraction of Nb is preferably between about 0.1 at % and about 5 at %, more preferably between about 0.5 at % and about 3 at %.

Next, a third specific preferred embodiment of the present invention will be described.

As already described for the second specific preferred embodiment, a compound of Ti and B (e.g., $TiB_2$) is easily formed in the melt of the alloy with the inventive composition. As a result, the liquidus temperature of the melt becomes higher than that of the melt of a material alloy for an iron-based rare earth magnet with the known composition.

The present inventors discovered that when an appropriate amount of C (carbon) was added to the iron-based material alloy including Ti and B, the liquidus temperature of the melt of the alloy decreased by as much as about 5° C. or more (e.g., about 10 to 40 degrees). Once the liquidus temperature of the melt has been decreased due to the addition of carbon, the viscosity of the melt hardly increases even if the temperature of the melt is lowered. This is because the crystallization of the Ti—B compounds such as $TiB_2$ is suppressed. Thus, a constant melt flow can be formed continuously. Also, if the temperature of the melt being teemed has been decreased, the melt can be cooled sufficiently on the surface of the chill roller. Consequently, it is possible to prevent the rapidly solidified alloy from being wound around the roller. In addition, the rapidly solidified alloy achieves a uniform structure and greatly reduced average grain size.

Thus, in the present preferred embodiment, a melt of a material alloy, having a composition represented by the general formula $(Fe_{1-m}T_m)_{100-x-y-z-n}(B_{1-p}C_p)_xR_yTi_zM_n$, is rapidly cooled and solidified by a strip casting process to prepare an iron-based rare earth solidified alloy. In this formula, T is at least one element selected from the group consisting of Co and Ni; R is at least one element selected from the group consisting of Y (yttrium) and the rare earth elements; and M is at least one element selected from the group consisting of Al, Si, V, Cr, Mn, Cu, Zn, Ga, Zr, Nb, Mo, Ag, Hf, Ta, W, Pt, Au and Pb.

The mole fractions x, y, z, m, n and p preferably satisfy the inequalities of:

10 at %<x≦25 at %;
6 at %≦y<10 at %;
0.5 at %≦z≦12 at %;
0≦m≦0.5;
0 at %≦n≦10 at %; and
0.01≦p≦0.25, respectively.

To rapidly cool and solidify the melt of the alloy with this composition, the strip caster shown in FIG. 3 is also used for this third specific preferred embodiment. In this specific preferred embodiment of the present invention, a material alloy with an oxygen concentration of about 1,000 ppm or less (in mass percentage) is melted and the oxygen concentration of the molten alloy is controlled at about 3,000 ppm or less (in mass percentage). The oxygen concentration of the melt is changeable with the partial pressure of oxygen in the atmosphere and/or the time it takes to melt the material alloy and rapidly cool and solidify the molten alloy. Accordingly, in this specific preferred embodiment, these conditions are controlled in such a manner that the oxygen concentration does not exceed about 3,000 ppm.

The melt 3, which has just been poured onto the shoot 5, is teemed from the far end of the shoot 5 onto the surface of the chill roller 7 without being pressurized, thereby forming a melt puddle 6 on the surface of the chill roller 7. In this specific preferred embodiment, carbon is added to the material alloy to keep the liquidus temperature of the melt low enough. Accordingly, where the temperature of the melt is about 1200° C. or more, the kinematic viscosity of the melt can be maintained at approximately $5 \times 10^{-6}$ m²/sec or less. As a result, the melt can flow smoothly enough.

The temperature of the melt 3 on the shoot 5 is preferably higher than the liquidus temperature thereof by about 100° C. or more. This is because if the temperature of the melt 3 is too low, initial crystals, which will affect the properties of the rapidly solidified alloy, may nucleate locally and remain in the rapidly solidified alloy.

The same conditions as those specified for the first specific preferred embodiment are also applied to the strip casting process of the third specific preferred embodiment. Also, once the rapidly solidified alloy has been prepared, the same process steps as those described for the first specific preferred embodiment will be performed on the rapidly solidified alloy.

It should be noted that the resultant thin-strip rapidly solidified alloy often has a tap density of about 0.5 g/cc or less. Accordingly, after the melt has been rapidly cooled and solidified, the rapidly solidified alloy is preferably pulverized by an appropriate pulverizer so as to have a tap density of approximately 1 g/cc or more before the alloy is collected.

After this strip casting process is over, the same process steps as those described for the first specific preferred embodiment may be performed.

In the third specific preferred embodiment, C, as well as Ti, is preferably added to the iron-based rare earth material alloy, thereby lowering the liquidus temperature of the melt of the alloy. Consequently, the rapidly solidified alloy can be mass produced constantly enough.

A fourth specific preferred embodiment of the present invention will be described.

In the known strip casting process, the chill roller rotates at a very low surface velocity of about 1 m/sec. to about 2 m/sec. When the material alloy has an inventive composition including the additive Ti, a rapidly solidified alloy structure of quality can be made from the material alloy even at a relatively low velocity. To improve the resultant magnet properties as much as possible, however, the melt is preferably cooled at a surface velocity much higher than that normally adopted in the known strip casting process.

Nevertheless, in the strip casting process, the higher the velocity of the chill roller, the more difficult it is to move the molten alloy upward just as intended. Compared to the melt spinning process, the strip casting process cannot ensure sufficiently close contact between the melt and the surface of the rotating chill roller. This is partly because a thin gas film layer, developed around the roller surface, is likely caught in the gap between the melt and the roller surface. Thus, if the chill roller is rotated at an excessively high velocity in the strip casting process, then the melt will slip off the surface of the roller, thereby making it difficult to move the melt upward. In the melt spinning process on the other hand, a fine-line jet of the melt with a great kinetic momentum is propelled through a nozzle orifice against the surface of the chill roller in order to break in the gas film layer on the surface of the roller. Accordingly, even if the chill roller is rotating at a high velocity, the desired rapidly solidified alloy can be obtained.

In view of these considerations, when the cooling rate should be increased, the melt spinning process has often been adopted in the prior art with the chill roller rotated at a relatively high velocity (e.g., about 20 m/sec or more). Conversely, where the cooling rate may be low, the strip casting process has normally been adopted with the chill roller rotated at a relatively low velocity (e.g., about 1 m/sec. to about 2 m/sec).

In making an iron-based rare earth alloy magnet by a melt quenching process, unless the cooling rate is increased sufficiently, the desired microcrystalline structure cannot be obtained. Particularly when a nanocomposite magnet, in which hard magnetic Nd—Fe—B phase and soft magnet phases such as α-Fe are magnetically coupled together via exchange interactions, should be produced, the melt spinning process has always been adopted in the prior art. This is because the resultant cooling rate should be too low otherwise to obtain the desired rapidly solidified alloy structure. That is to say, it has been impossible so far to mass produce nanocomposite magnets of that type by a strip casting process.

To realize a high cooling rate, which has been regarded as unachievable by any known strip casting process, the present inventors researched and developed a strip casting process that allows the chill roller to rotate at a high surface velocity of about 10 m/sec or more. In the strip casting process invented by the present inventors, a melt of a material alloy is poured onto a tilted shoot (i.e., an exemplary guide) and a lateral melt flow is formed on the shoot by utilizing the weight of the melt. In this manner, a relatively large kinetic momentum can be applied to the melt, thereby propelling the melt onto the surface of the chill roller strongly enough and keeping close enough contact between the melt and the surface of the chill roller that rotates at a high velocity.

However, the present inventors also discovered that in the inventive strip casting process described with respect to preferred embodiments herein, even if C or Nb was added and if the melt was rapidly cooled within a reduced pressure atmosphere, the resultant rapidly solidified alloy still wound around the chill roller sometimes. Once the rapidly solidified alloy has wound around the chill roller, the rapid solidification process must be stopped and cannot be continued anymore. This unwanted stoppage might constitute a serious obstacle to realizing the mass production.

Thus, the fourth specific preferred embodiment of the present invention relates to shoot configuration and shoot/roller arrangement specially designed for forming a melt puddle constantly on the chill roller that rotates at a high velocity while preventing the rapidly solidified alloy from being wound around the roller.

In the illustrated specific preferred embodiment of the present invention, the strip casting process is preferably performed using the strip caster shown in FIG. 3. As described above, the melt guide surface of the shoot 5 forms a tilt angle α with respect to the horizontal plane and provides a channel that leads the melt to the chill roller 7. The (tilt) angle α formed between the guide surface of the shoot 5 and the horizontal plane is an important parameter for finely controlling the melt feeding rate.

The melt 3, which has been poured onto the shoot 5, is then teemed from the far end of the shoot 5 onto the surface of the chill roller 7 while being given a horizontal kinetic momentum, thereby forming a melt puddle 6 on the surface of the chill roller 7.

Figure 4:
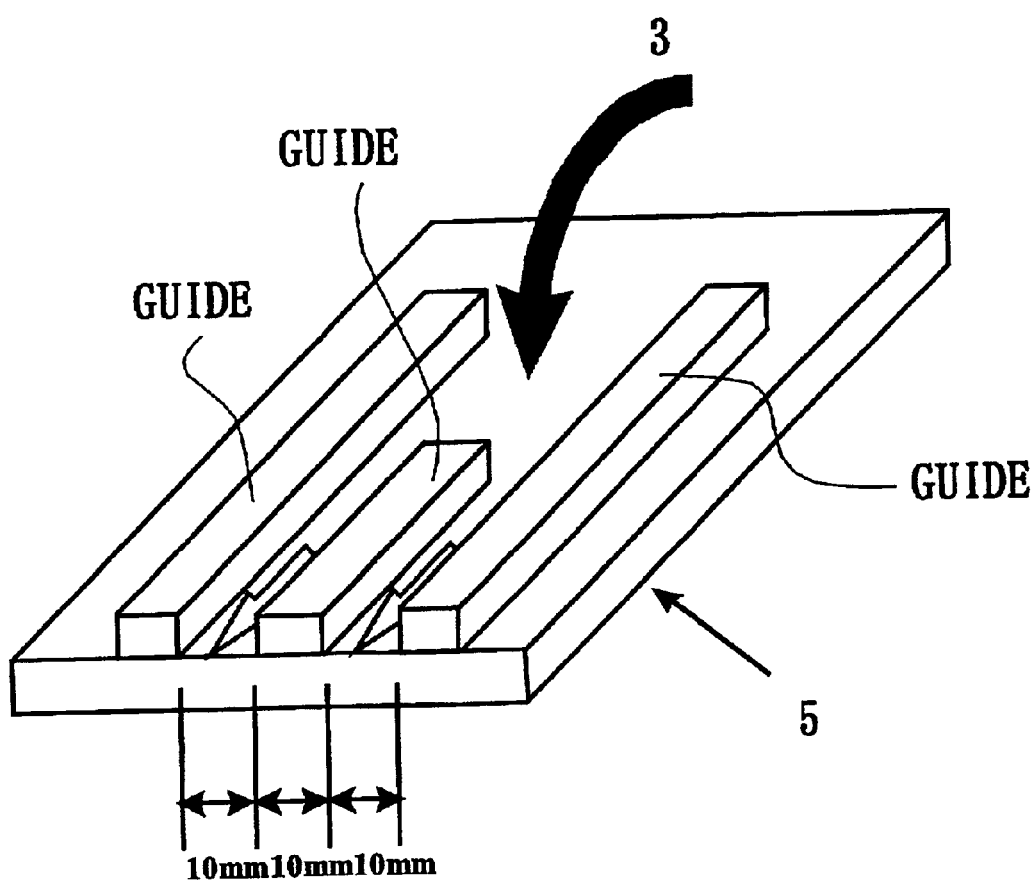
FIG. 4 is a perspective view illustrating a shoot (or exemplary guiding means) for use to guide a molten alloy in the strip caster of preferred embodiments of the present invention.

FIG. 4 is a perspective view illustrating the upper surface of the shoot 5. As shown in FIG. 4, this shoot 5 preferably includes a plurality of guides for guiding the melt, which has been received at one position, to the far end thereof. Two of these guides are preferably located on the right-hand side and left-hand side of the channel, while the other guide is preferably located on the approximate centerline of the channel to divide the melt into two separate melt flows. In the example illustrated in FIG. 4, each of the two melt flows has a width of about 10 mm and these two melt flows are teemed onto the surface of the chill roller while being laterally spaced apart from each other by about 10 mm. By using the shoot 5 including these guides, each melt flow 3 can be teemed so as to have a substantially constant width in the longitudinal direction of the chill roller 7. As used herein, the "longitudinal direction" of the chill roller 7 is equivalent to the axial direction of the roller 7 (i.e., the direction coming out of the paper (FIG. 3)). Also, the melt 3 being teemed can be spread so as to have a substantially uniform thickness. It should be noted that each of the resultant rapidly solidified alloy ribbons should preferably have a width of about 5 mm to about 20 mm in the illustrated specific preferred embodiment. The reason is as follows. If the ribbon width is smaller than about 5 mm, then the mass productivity will decrease. On the other hand, if the ribbon width exceeds about 20 mm, then it will be difficult to perform the casting process constantly enough.

Normally, very small unevenness exists on the surface of the chill roller 7 for use in the strip caster. If the chill roller 7 has a great surface roughness, then the effective area of contact between the melt and the chill roller 7 is decreased by the very small recesses existing on the surface of the roller.

Figure 5:
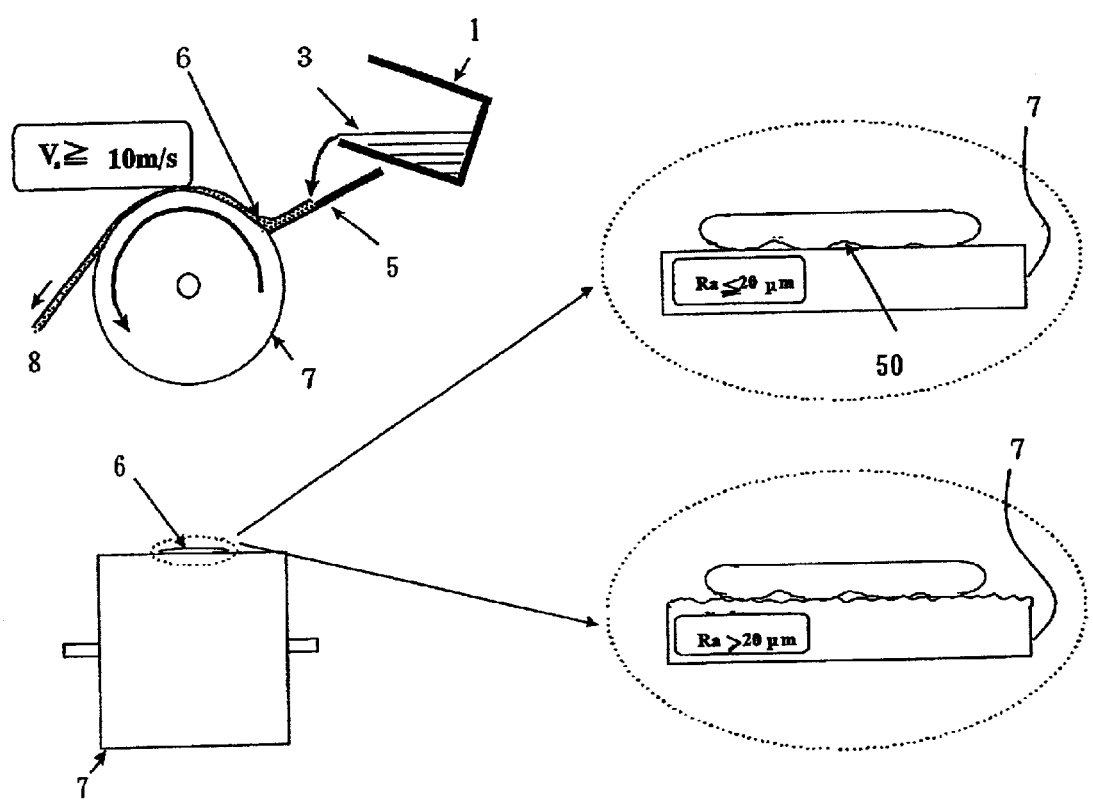
FIG. 5 illustrates how the centerline roughness Ra at the surface of a chill roller for use in a strip casting process affects a molten alloy being rapidly cooled and solidified.

FIG. 5 schematically illustrates the cross-sectional shapes of the melt that comes into contact with the surface of the chill roller 7 that is rotating at a surface velocity of about 10 m/sec. An atmospheric gas unintentionally gets trapped in the gaps between the surface of the chill roller 7 and the lower surface of the melt 3 to form a great number of air pockets 50. The greater the surface roughness of the chill roller 7, the smaller the effective area of contact between the roller surface and the melt. As a result, the quantity of heat removed by the chill roller 7 from the melt 3 decreases and the cooling rate of the melt 3 decreases substantially. Once the cooling ability of the chill roller 7 has decreased in this manner, the temperature of the alloy 8, which is being in contact with, and solidified by, the chill roller 7, does not decrease sufficiently.

The alloy 8 shrinks while being solidified. However, the lower the degree of shrinkage and solidification, the harder it is for the rapidly solidified alloy 8 to leave the rotating chill roller 7 and the more easily the alloy 8 winds around the chill w roller 7. Once the ribbon-shaped rapidly solidified alloy 8 has wound around the chill roller 7, the cooling process cannot be continued anymore. In the strip casting process, in particular, the size of the melt/roller surface contact area as measured in the roller circumference direction is relatively long compared to the melt spinning process. Thus, in the strip casting process, the rapidly solidified alloy 8 winds around the chill roller 7 more easily.

Figure 6:
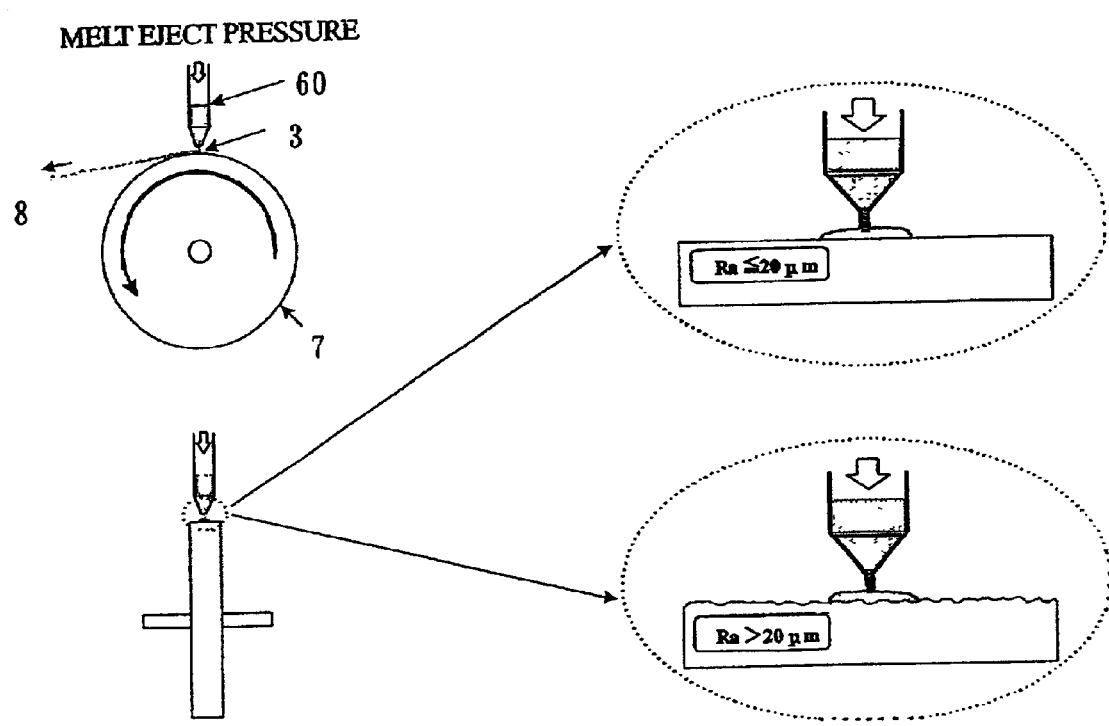
FIG. 6 illustrates how the centerline roughness Ra at the surface of a chill roller for use in a melt spinning process affects a molten alloy being rapidly cooled and solidified.

In the melt spinning process on the other hand, a relatively small amount of melt is ejected through a nozzle onto the surface of the chill roller 7, thereby propelling the melt against the roller surface as shown in FIG. 6. Accordingly, even if the chill roller 7 has a great surface roughness, the melt still can keep good contact with the roller surface, thus ensuring a high cooling ability for the chill roller 7. Therefore, in the melt spinning process, it is easy to cool the molten alloy uniformly at a sufficiently high rate.

As described above, in the strip casting process of the type adopted in various preferred embodiments of the present invention, if the chill roller 7 is rotated at a high surface velocity of about 10 m/sec or more, then the centerline roughness Ra at the surface of the chill roller 7 has critical effects on the winding of the rapidly solidified alloy 8 around the chill roller 7. The present inventors discovered and confirmed via experiments that if the centerline roughness Ra at the surface of the chill roller 7 was about 20 μm or less, sufficient cooling effects could be attained, i.e., it was possible to prevent the rapidly solidified alloy 8 from being wound around the chill roller 7.

In view of these considerations, according to preferred embodiments of the present invention, the centerline roughness Ra at the surface of the chill roller is preferably about 20 µm or less. To mass produce the rapidly solidified alloy constantly and continuously, the centerline roughness Ra at the surface of the chill roller is preferably about 13 µm or less, more preferably about 7 µm or less.

In the inventive strip casting process, the melt 3 slowly flows over the tilted shoot 5 as shown in FIGS. 3 and 4. Accordingly, to form the melt puddle 6 just as intended on the surface of the chill roller 7 that is rotating at a high velocity, the kinematic viscosity of the melt 3 plays an important role. The results of experiments conducted by the present inventors revealed that if the melt 3 had a kinematic viscosity of more than approximately $5 \times 10^{-6}$ m$^2$/sec, no puddle 6 was formed on the chill roller 7, but the melt 3 splashed and was not rapidly cooled or solidified. Thus, the kinematic viscosity of the melt 3 should preferably be controlled to be about $5 \times 10^{-6}$ m$^2$/sec or less, and more preferably about $1 \times 10^{-7}$ m$^2$/sec or less.

Where the surface temperature of the shoot 5 is too low, the kinematic viscosity of the melt 3 might be increased too much before reaching the chill roller 7. Specifically, if the surface temperature of the shoot 5 is about 300° C. or less, then the melt is cooled on the shoot 5 and has its kinematic viscosity increased to more than about $5 \times 10^{-6}$ m$^2$/sec. Accordingly, the surface temperature of the shoot 5 should preferably be kept at more than about 300° C., more preferably at about 450° C. or more, and even more preferably at about 550° C. or more.

Examples of materials for the shoot 5 include ceramics such as alumina, silica, zirconia, magnesia and mullite and boron nitride (BN), or other suitable materials. Among other things, the material used preferably includes alumina ($Al_2O_3$), which shows an excellent wettability with the melt of an iron-based rare earth alloy and less likely reacts with a rare earth element, at about 80 volume percent or more. Also, to avoid the cracking of the shoot 5 due to thermal shock, the ceramic is preferably porous rather than dense. However, the surface of the shoot 5 on which the melt flows should be as smooth as possible.

To rapidly cool the melt constantly using the chill roller 7, the chill roller 7 should preferably include a base with a thermal conductivity of about 50 W/m/K or more. Examples of materials for the base of the chill roller 7 include copper, copper alloy, iron, carbon steel, tungsten, molybdenum, beryllium and tantalum, or other suitable materials. Among other things, copper, an alloy thereof, tungsten, molybdenum or beryllium with a thermal conductivity of about 100 W/m/K or more is preferred to cool the melt constantly enough.

The base of the chill roller 7 preferably has its surface plated with chromium, nickel or a mixture thereof, or other suitable material, to a thickness of about 1 µm to about 100 µm. Then, the drawbacks of a low-melting, soft material (e.g., copper) for the chill roller base can be compensated for. In addition, the surface of face of the roller base can be protected with the coating and will not be melted or damaged while the melt is being cooled. As a result, the centerline roughness Ra at the roller surface can be kept at about 20 µm or less for a long time. To ensure sufficient film strength and thermal conductivity, the plating film should preferably have a thickness of between about 1 µm to about 100 µm, more preferably between about 5 µm and about 70 µm and most preferably between about 10 µm and about 40 µm.

It should be noted that if the melt quenching rate (or cooling processing rate) per melt flow 3 is less than about 1 kg/min, then no puddle 6 will be formed on the chill roller and the melt cannot be quenched constantly. On the other hand, if the melt quenching rate per melt flow 3 is about 4 kg/min or more, then the volume of the melt 3 teemed exceeds that of the puddle 6 that can be formed on the roller surface. Accordingly, the excessive melt 3 splashes and is not rapidly cooled. Thus, the melt quenching rate per melt flow 3 should preferably be about 0.7 kg/min or more but less than about 4 kg/min, more preferably about 1 kg/min or more but less than about 3 kg/min and most preferably about 1 kg/min or more but less than about 2 kg/min. To mass produce the rapidly solidified alloy, multiple melt flows should preferably be teemed onto the chill roller by using the guides shown in FIG. 4. In teeming a number of melt flows at a time, the melt flows are preferably spaced apart from each other laterally so as not to mix with each other.

In the illustrated specific preferred embodiment, the surface velocity of the chill roller 7 is controlled to preferably be within a range from about 10 m/sec to about 26 m/sec. By setting the roller surface velocity at about 10 m/sec or more, the precipitation of the α-Fe phase can be suppressed even more effectively. However, if the roller surface velocity exceeds about 26 m/sec, the melt puddle 6 to be formed on the roller cannot be stabilized and the melt is likely to be scattered or splashed. Thus, the desired rapidly solidified alloy cannot be obtained. The upper limit of a more preferable roller surface velocity range is about 23 m/sec, and the upper limit of an even more preferable range is about 20 m/sec.

The state of the puddle 6 being formed is not affected only by the roller surface velocity but also by the rate at which the melt is fed onto the chill roller 7. To continuously form the puddle 6 stably enough, the rate at which each melt flow is fed onto the chill roller 7 (i.e., the melt feeding rate) is preferably controlled to the above-specified range.

In this specific preferred embodiment, the pressure of the rapid-cooling atmosphere is preferably controlled at about 0.13 kPa or more but less than about 100 kPa. The reason is as follows. If the pressure of the rapid-cooling atmosphere is less than about 0.13 kPa, then the melt might adhere to the surface of the chill roller too strongly to peel the rapidly solidified alloy off the roller. On the other hand, if the pressure of the rapid-cooling atmosphere is greater than about 100 kPa, then the atmospheric gas will get trapped in the gaps between the roller surface and the melt, thus producing gas pockets more easily. Once those gas pockets have been created, the melt cannot be quenched uniformly anymore and the resultant rapidly solidified alloy will have a non-uniform structure. Thus, a supercooled state cannot be established stably. Accordingly, the rapid-cooling atmosphere preferably has a pressure of about 1.3 kPa to about 90 kPa, more preferably from about 10 kPa to about 70 kPa, even more preferably from about 10 kPa to about 60 kPa and most preferably from about 30 kPa to about 50 kPa.

If the molten alloy is rapidly cooled in this manner, then the melt can keep closer contact with the surface of the chill roller and can be quenched highly uniformly and efficiently. As a result, the desired rapidly solidified alloy can be obtained without being wound around the chill roller unintentionally.

Microcrystalline Structure of Rapidly Solidified Alloy

Figure 7A:
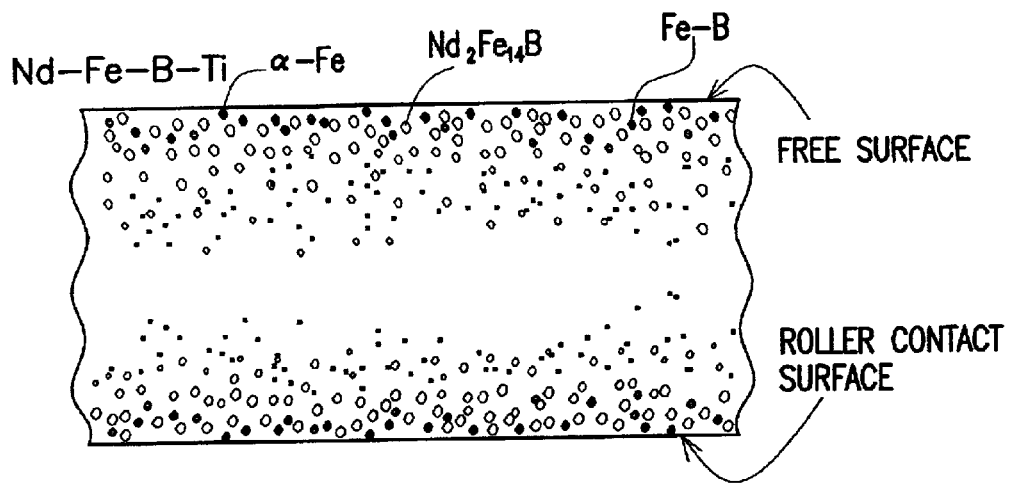
FIG. 7A is a cross-sectional view illustrating the structure of a rapidly solidified R—T—B type alloy that has been formed by a strip casting process with Ti added thereto.
Figure 7B:
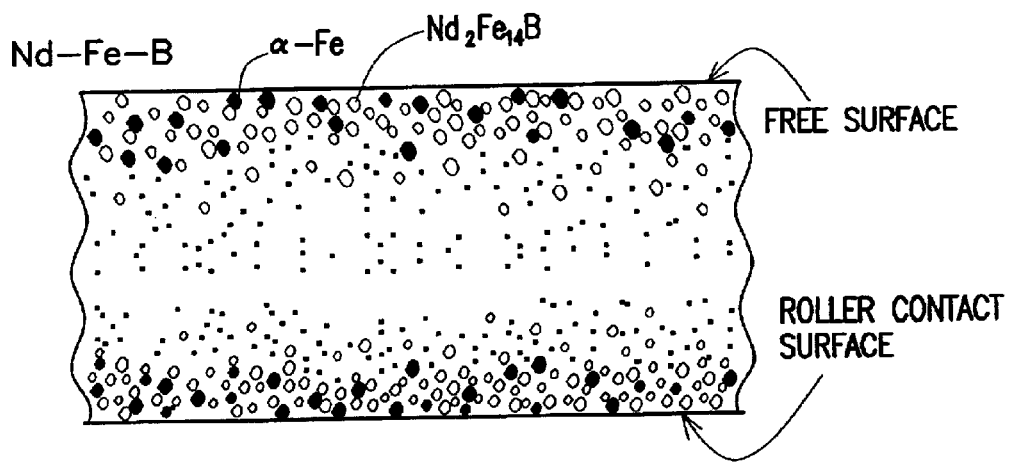
FIG. 7B is a cross-sectional view illustrating the structure of a known rapidly solidified R—T—B type alloy that has been formed by a strip casting process with no Ti added thereto.

FIGS. 7A and 7B schematically illustrate how the addition of Ti changes the microcrystalline cross-sectional structure of a rapidly solidified alloy.

First, as can be seen from FIGS. 7A and 7B, a rapidly solidified alloy made (in the shape of a ribbon) by a strip casting process is thicker than a rapidly solidified alloy made by a melt spinning process. Accordingly, crystal grains are formed near the free surface of the rapidly solidified alloy (i.e., the upper surface thereof that is not in contact with the chill roller). In addition, crystal grains are also formed near the roller contact surface of the alloy (i.e., the lower surface thereof that is in contact with the chill roller). This is because non-uniform crystal nuclei are likely to be formed on the roller contact surface and crystals easily grow around those non-uniform nuclei. Also, as shown in FIGS. 7A and 7B, the more distant from these two surfaces (or the closer to the center of the solidified alloy), the smaller the crystal grain size and the smaller the volume density of the crystal grains.

Where Ti has been added, the crystal grains formed are generally small as shown in FIG. 7A. Among other things, α-Fe crystals are particularly small in both size and number. Also, an amorphous portion is easily formed around the center of the solidified alloy, and the crystalline layer formed near the roller contact surface is thinner than the crystalline layer formed near the free surface. Furthermore, where Ti has been added, an iron-based boride (i.e., Fe—B) precipitates. On the other hand, where no Ti has been added, the crystal grains formed have relatively large sizes as shown in FIG. 7B. This is particularly true of α-Fe crystals. Generally speaking, the thicker the rapidly solidified alloy, the lower the cooling rate at the free surface. Accordingly, the thicker the rapidly solidified alloy, the more likely crystal grains of excessively large sizes are formed near the free surface. For that reason, as the rapidly solidified alloy thickens, the resulting magnetic properties deteriorate more and more easily. However, the addition of Ti effectively prevents excessive growth of crystal grains, thus increasing the allowable thickness of the rapidly solidified alloy. In this preferred embodiment, the rapidly solidified alloy may have a thickness of about 50 μm to about 200 μm. To obtain powder particles in a desired shape by pulverizing the rapidly solidified alloy and thereby realize good magnetic properties, the rapidly solidified alloy preferably has a thickness of about 60 μm to about 150 μm, more preferably from about 70 μm to about 120 μm. In this manner, according to preferred embodiments of the present invention, a rapidly solidified alloy with a thickness of about 80 μm or more can be made and a nanocomposite magnet with excellent magnet properties can be obtained from the alloy, although it has been hard to realize this in the prior art. It should be noted that the sizes of the crystal grains illustrated in FIGS. 7A and 7B are not to scale but have been enlarged for the illustrative purposes. That is to say, the crystal grains are actually so much smaller than the thickness of the rapidly solidified alloy that they cannot be illustrated in FIGS. 7A and 7B.

According to the high-velocity strip casting process of this preferred embodiment, even though an amorphous portion exists around the center of the rapidly solidified alloy in its vertical cross section, crystalline portions still exist near its free and roller contact surfaces (i.e., the upper and lower surfaces thereof that cross the thickness direction at right angles). Also, where Ti has been added, the excessive grain coarsening of α-Fe is prevented, thus realizing excellent magnet properties. In addition, in the strip casting process of this preferred embodiment, the chill roller may rotate at a surface velocity much higher than that adopted for the known strip casting process. Accordingly, the crystal grains do not grow excessively and a rapidly solidified alloy having a microcrystalline structure suitably applicable to a nanocomposite magnet can be obtained. Furthermore, the rapidly solidified alloy (in the shape of a ribbon) has a microcrystalline structure in which crystalline phases exist near the free and roller contact surfaces thereof. Thus, the rapidly solidified alloy can be easily pulverized even before being subjected to a heat treatment, thus improving the efficiency of pulverization.

It should be noted that when a nanocomposite magnet finally obtained by the process of this preferred embodiment is used for a motor, the magnet should have a coercivity $H_{cJ}$ of as high as about 600 kA/m or more to retain a sufficiently high magnetization even if an intense demagnetization field has been applied to the magnet. To realize that high coercivity, the $R_2Fe_{14}B$ phase should be included in the metal structure of the rapidly solidified alloy at about 60 vol % or more.

Compared to the stoichiometric composition of an $R_2Fe_{14}B$ compound, the iron-based rare earth alloy of this preferred embodiment has a composition in which the mole fraction of R is relatively low and that of B is relatively high. If Ti is added to such a composition, the excessive B bonds to Fe, thus forming an iron-based boride easily. The iron-based boride formed by the addition of Ti has a size on the order of several nanometers and exhibits ferromagnetic properties. That is to say, the addition of Ti not only prevents the excessive grain growth of α-Fe but also produces the ferromagnetic iron-based boride having a very small size. Accordingly, the iron-based boride and the $R_2Fe_{14}B$ phase strongly bond to each other magnetically via exchange interactions. As a result, hard magnetic properties, comparable to those of an iron-based rare earth alloy magnet with the same stoichiometric composition as that of $R_2Fe_{14}B$, are realized without decreasing the magnetization.

The iron-based rare earth alloy magnet of this preferred embodiment includes not only the hard magnetic $R_2Fe_{14}B$ phase but also a soft magnetic iron-based boride with a saturation magnetization equal to or greater than that of the $R_2Fe_{14}B$ phase in the same structure. Accordingly, as compared to an alloy with almost the same level of coercivity $H_{cJ}$, the alloy realizes a magnet that has a recoil permeability $\mu_r$ higher than that of an iron-based rare earth alloy magnet including no iron-based borides. More specifically, the iron-based rare earth alloy magnet of this preferred embodiment has a recoil permeability $\mu_r$ of about 1.1 to about 1.4 when the mole fraction y of the rare earth element R is from 8.5 at % to 10 at %, and has a recoil permeability $\mu_r$ of about 1.2 to about 2.0 when the mole fraction y is from 7 at % to less than 8.5 at %. Where the mole fraction y is from 8.5 at % to 10 at %, the magnet of this preferred embodiment has a remanence $B_r$ of about 0.7 T to about 0.9 T and a coercivity $H_{cJ}$ of about 600 kA/m to about 1200 kA/m. On the other hand, where the mole fraction y is from 7 at % to less than 8.5 at %, the magnet of this preferred embodiment has a remanence $B_r$ of about 0.75 T to about 0.95 T and a coercivity $H_{cJ}$ of about 500 kA/m to about 950 kA/m. The recoil permeability was measured by the method defined by JIS standard No. C2501-1989. The recoil permeability is a parameter that is unique to alloy in which a nanocomposite structure is formed, that is, alloy in which soft and hard magnetic phases are crystallized and magnetically coupled by exchange interactions.

This recoil permeability $\mu_r$ can be used as an important parameter for evaluating the performance of a magnet for use in a motor. Hereinafter, this point will be described. Specifically, if the rotational velocity of a motor is increased, then the counterelectromotive force increases. And when the magnitude of the counterelectromotive force becomes equal to the input voltage, the increase in the rpm of the motor stops. To further increase the rpm of the motor, the counterelectromotive force should be decreased by electrically lowering the operating point (—B/H) of the magnet to a low permeance region. This is so-called "weakening field control". The higher the recoil permeability $\mu_r$ of the magnet, the more effectively and remarkably the upper limit of the motor rotational velocity can be increased through such a control. As described above, the magnet of preferred embodiments of the present invention has a high recoil permeability $\mu_r$ and is effectively applicable to a motor.

In the strip casting process of various preferred embodiments of the present invention, the chill roller can rotate at a surface velocity that is much higher than that normally adopted for the known strip casting process. However, the surface velocity realized by the inventive strip casting process is still lower than that realized by a melt spinning process (e.g., about 20 m/sec or more). Accordingly, unless Ti is added, the α-Fe will precipitate earlier than the $R_2Fe_{14}B$ compound and increase its grain size excessively.

The rapidly solidified alloy obtained by the above-described rapid cooling process is pulverized into powder particles, which are then subjected to a heat treatment.

After the heat treatment, the $R_2Fe_{14}B$ phase included in the alloy should have a size (i.e., mean particle size or average major-axis length) of about 300 nm or less, which is a single magnetic domain size. The size is preferably between about 20 nm and about 200 nm, more preferably between about 20 nm and about 100 nm. On the other hand, if the average crystal grain size of the iron-based boride and α-Fe phases exceeds about 50 nm, then the exchange interactions among the respective constituent phases weakens, thus deteriorating the loop squareness of the demagnetization curve and decreasing $(BH)_{max}$. However, If the average crystal grain size of these hard and soft magnetic phases is less than about 1 nm, then a high coercivity cannot be achieved. In view of these considerations, the soft magnetic phases such as the boride and α-Fe phases should preferably have an average crystal grain size of about 1 nm to about 50 nm, more preferably about 30 nm or less.

The powder particles, which are finally obtained by pulverizing the alloy prepared by the inventive process, preferably have a particle size of about 10 μm to about 300 μm, more preferably from about 50 μm to about 115 μm and even more preferably from about 80 μm to about 110 μm.

In the powder particle thus obtained, the average ratio of the minor-axis size thereof to the major-axis size thereof (i.e., the aspect ratio) is preferably about 0.3 to about 1.0. The thickness of the rapidly solidified alloy prepared by the process of this preferred embodiment is much greater than the particle size of the powder. Accordingly, powder particles having a substantially isometric shape can be obtained easily. In contrast, a rapidly solidified alloy prepared by the normal melt spinning process has a thickness as small as about 20 μm to 40 μm. Thus, if that thin alloy is pulverized under the conditions of this preferred embodiment, then flake-like powder particles with a small aspect ratio are obtained in the known melt spinning process. In contrast, the powder particles obtained by this preferred embodiment have an aspect ratio of almost one and can exhibit excellent moldability and flowability. Accordingly, the magnet powder of this preferred embodiment is best suited to forming a bonded magnet.

The magnet powder obtained in this manner can exhibit a coercivity $H_{cJ}$ as high as about 600 kA/m or more.

Oxidation Resistance of Magnet Powder and Dependence of Magnetic Properties Thereof on Particle Size Distribution Hereinafter, it will be described how a magnet powder finally obtained from an alloy by the inventive manufacturing process (which will be herein referred to as a "nanocomposite magnet powder") exhibits excellent oxidation resistance and how little the magnetic properties thereof depend on the particle size distributions as compared with conventional rapidly solidified magnet powders.

In the following description, the nanocomposite magnet powder of the present invention will be compared with conventional rapidly solidified magnet powders MQP-B and MQP-Q (each of which is available from Magnequench Inc. (MQI) and has a maximum particle size of 300 μm or less). A sample of the inventive nanocomposite magnet powder was prepared in the following manner.

First, a rapidly solidified alloy (including 9 at % of Nd, 11 at % of B, 3 at % of Ti, 2 at % of Co and Fe as the balance and having an average thickness of 70 μm and a standard deviation a of 13 μm) that had been made as in Example 1 to be described later was pulverized to 850 μm or less. Then, the resultant powder was fed at a rate of 20 g/min into a hoop belt furnace having a soaking zone with a length of about 500 mm and running at a speed of 100 mm/min within an argon atmosphere that had a temperature maintained at 680° C. In this manner, the powder was thermally treated to obtain a magnet powder. Then, the magnet powder was pulverized using a pin disk mill so as to have a particle size distribution in which powder particles with aspect ratios of 0.4 to 1.0 were included at about 30 volume percent. A nanocomposite magnet powder sample NCP-0 was obtained in this manner.

Table 1 shows the contents of oxygen and the magnetic properties of the respective magnet powders that were left in the air for an hour at various temperatures (i.e., 23° C., 300° C. and 350° C.). The magnetic properties were measured using a vibrating sample magnetometer. The results shown in Table 1 were obtained not only at 23° C. but also after the powders had been left in the air for an hour at 300° C. and 350° C., respectively.

As shown in Table 1, when MQP-B was left in the air for an hour at 300° C., the oxygen contained therein increased to 0.67 mass %. If the powder MQP-B was left in the air for an hour at 350° C., the oxygen content reached 1.93 mass %. On the other hand, when MQP-O was left in the air for an hour at 300° C., the oxygen contained therein increased to 0.24 mass %. And if the powder MQP-O was left in the air for an hour at 350° C., the oxygen content reached 0.59 mass %.

In contrast, even if the nanocomposite magnet powder NCP-0 was left in the air for an hour at 300° C., the oxygen contained therein was as low as 0.10 mass %. Also, even if the powder NCP-0 was left in the air for an hour at 350° C., the oxygen content barely reached 0.20 mass %. Thus, it can be seen that the nanocomposite magnet powder is superior in oxidation resistance to the conventional rapidly solidified magnet powders.

Figure 15:
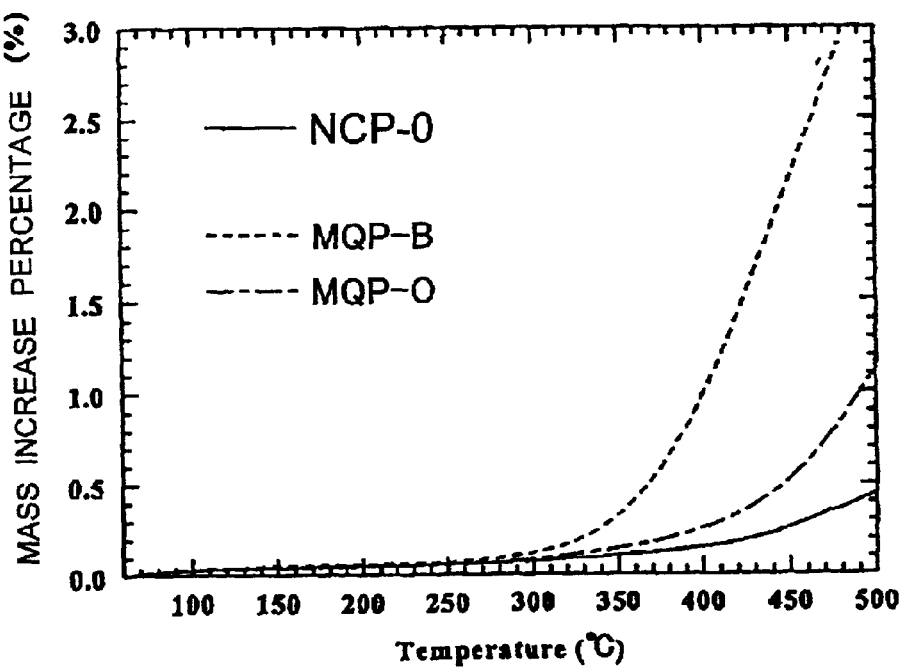
FIG. 15 is a graph illustrating the mass increase percentages of the inventive nanocomposite magnet powder and conventional rapidly solidified magnet powders when these powders are heated.

FIG. 15 shows the mass increase percentages of the respective magnet powders that were measured with a thermobalance. These powders were heated in the air at a heating rate of 10° C./min. As can be seen from FIG. 15, even when heated in the air and oxidized, the nanocomposite magnet powder NCP-0 increased its mass far less than MQP-B or MQP-O did. Thus, the nanocomposite magnet powder NCP-0 has excellent oxidation resistance.

Next, looking at the magnetic properties shown in Table 1, it can be seen that MQP-B exhibited greatly deteriorated magnetic properties when oxidized. For example, when the magnet powder MQP-B was left in the air for an hour at 300° C., $(BH)_{max}$ thereof decreased to about 65% of that of the powder that had been left in the air for an hour at 23° C. And after the magnet powder MQP-B had been left in the air for an hour at 350° C., $(BH)_{max}$ thereof decreased to about 30%. As for the magnet powder MQP-O, when it was left in the air for an hour at 350° C., $(BH)_{max}$ thereof decreased to less than about 80% of that of the powder that had been left in the air for an hour at 23° C. In contrast, even if the nanocomposite magnet powder NCP-0 was left in the air for an hour at 350° C., $(BH)_{max}$ thereof decreased to about 90% of that of the powder that had been left in the air for an hour at 23° C.

As can be seen, the nanocomposite magnet powder exhibits excellent oxidation resistance. Thus, even while a bonded magnet is produced from this magnet powder (e.g., while a compound is being prepared and/or thermally cured), the magnet powder is not oxidized easily. Accordingly, the anticorrosion treatment, which is necessary for conventional rapidly solidified magnet powder (e.g., MQP-B, in particular) to prevent the magnet powder from being oxidized, can be simplified or even omitted for the nanocomposite magnet powder. Also, a compact formed by compacting the compound should have its resin binder cured (for example, by heat-treatment) to increase its strength. When the conventional rapidly solidified magnet powder is used, the magnet powder should be heated and cured within a vacuum or an inert gas atmosphere (e.g., Ar gas) so as not to be oxidized. However, this nanocomposite magnet powder may be heated and cured even in the air. That is to say, by using the nanocomposite magnet powder, the manufacturing process of a bonded magnet can be simplified and the manufacturing cost thereof can be cut down. Furthermore, the conventional rapidly solidified magnet powder has too low oxidation resistance to be applied to making an injection-molded bonded magnet by performing the process step of compounding the powder with a resin binder or molding the mixture at a temperature of about 250° C. to about 300° C. In contrast, by using this nanocomposite magnet powder, a bonded magnet can be formed by performing an injection molding process on a compound including the magnet powder. To fully achieve the beneficial effects brought about by the excellent oxidation resistance of this nanocomposite magnet powder, the magnet powder should preferably be prepared in such a manner as to have an oxygen content of 0.24 mass % or less even after the powder has been left in the air for an hour at a temperature of 300° C. to 350° C. More preferably, the magnet powder should be prepared to have an oxygen content of 0.2 mass % or less in such a situation. Considering the magnetic properties required for bonded magnets for various types of rotating machines or actuators, for example, the magnet properties of a magnet powder suitably applicable to these bonded magnets preferably include $B_r$ of 0.7 T or more, $(BH)_{max}$ of 80 kJ/m³ or more and $H_{cJ}$ of 600 kA/m or more in the end. If the magnet powder with this oxidation resistance is used, these magnetic properties are realizable even though the magnet powder is slightly oxidized while a bonded magnet is being produced.

TABLE 1

| Powder | Temperature (° C.) | $(BH)_{max}$ (kJ/m³) | $B_r$ (T) | $H_{cJ}$ (kA/m) | $O_2$ (%) |
|---|---|---|---|---|---|
| NCP-0 | 23 | 107.0 | 0.802 | 1009.7 | 0.02 |
|  | 300 | 103.1 | 0.790 | 989.3 | 0.10 |
|  | 350 | 96.1 | 0.774 | 1006.8 | 0.20 |

TABLE 1-continued

| Powder | Temperature (° C.) | $(BH)_{max}$ (kJ/m³) | $B_r$ (T) | $H_{cJ}$ (kA/m) | $O_2$ (%) |
|---|---|---|---|---|---|
| MQP-B | 23 | 122.0 | 0.899 | 732.6 | 0.04 |
|  | 300 | 79.3 | 0.762 | 686.8 | 0.67 |
|  | 350 | 38.2 | 0.546 | 635.8 | 1.93 |
| MQP-O | 23 | 113.0 | 0.818 | 1007.6 | 0.04 |
|  | 300 | 105.7 | 0.802 | 999.0 | 0.24 |
|  | 350 | 88.5 | 0.744 | 977.4 | 0.59 |

The nanocomposite magnet powder of the present invention is characterized in that the magnetic properties thereof lightly depend on the particle size due to its composition and structural features. The nanocomposite magnet powder includes a rare earth element R at a relatively low mole fraction and has no R-rich grain boundary phases. In addition, fine crystal grains of a boride phase are dispersed around an $R_2Fe_{14}B$ phase. Furthermore, since Ti has a high affinity for boron, the boride phase includes a greater amount of Ti than any other phase. Consequently, the nanocomposite magnet powder is superior in oxidation resistance to conventional rapidly solidified magnet powders and can maintain excellent magnetic properties even in the form of powder The conventional rapidly solidified magnet powder includes a relatively large amount of rare earth element R and is easily oxidizable. Thus, the smaller the size of powder particles, the more significantly the magnetic properties thereof deteriorate due to the oxidation of the powder particles at the surface. In the magnet powder MQP-B (with a maximum particle size of 300 μm or less), for example, powder particles with sizes of 75 μm or less (or 53 μm or less, in particular) exhibited deteriorated magnetic properties as shown in Table 2. For example, the remanence $B_r$ (0.79 T) of powder particles with sizes of 53 μm or less was less than 90% of the highest remanence $B_r$ (0.90 T) of powder particles with sizes of greater than 125 μm and equal to or less than 150 μm. As for $(BH)_{max}$, the average $(BH)_{max}$ of powder particles with sizes of 53 μm or less (i.e., a simple average between $(BH)_{max}$ of powder particles with sizes of 38 μm or less and that of powder particles with sizes of greater than 38 μm and equal to or less than 53 μm) was 85.5 kJ/m³. This values was less than 75% of the average $(BH)_{max}$ (114.6 kJ/m³) of powder particles with sizes of greater than 150 μm and equal to or less than 212 μm (i.e., a simple average between $(BH)_{max}$ of powder particles with sizes of greater than 150 μm and equal to or less than 180 μm and that of powder particles with sizes of greater than 180 μm and equal to or less than 212 μm).

In contrast, the magnetic properties of the nanocomposite magnet powder deteriorate to a lesser degree by oxidation and do not depend on the particle size so much. In the nanocomposite magnet powder NCP-0 (with a maximum particle size of 300 μm or less), for example, the magnetic properties hardly depend on the particle size and are generally excellent as shown in Table 3. For example, the remanence $B_r$ (about 0.829 T) of powder particles with sizes of 53 μm or less was 98% or more of the highest remanence $B_r$ (0.845 T) of powder particles with sizes of greater than 106 μm and equal to or less than 125 μm. As for $(BH)_{max}$, the average $(BH)_{max}$ of powder particles with sizes of 53 μm or less was 104.6 kJ/m³. This values was 98% or more of the average $(BH)_{max}$ (106.6 kJ/m³) of powder particles with sizes of greater than 150 μm and equal to or less than 212 μm. Nanocomposite magnet powders with various compositions had their magnetic properties evaluated in a similar manner. As a result, in most of the compositions, the average $(BH)_{max}$ of nanocomposite magnet powder particles with sizes of 53 μm or less was 90% or more of the average $(BH)_{max}$ of powder particles with sizes of greater than 150 μm and equal to or less than 212 μm. And in many of the compositions, the former $(BH)_{max}$ was 95% or more of the latter $(BH)_{max}$. It should be noted that the particle size distribution of the magnet powder was analyzed using a standard sieve complying with JIS8801.

TABLE 2

| Particle Size (μm) | $(BH)_{max}$ (kJ/m³) | $H_{cJ}$ (kA/m) | $B_r$ (T) |
|---|---|---|---|
| ≦38 | 83.7 | 744 | 0.79 |
| 38<, ≦53 | 87.2 | 752 | 0.79 |
| 53<, ≦75 | 94.2 | 739 | 0.82 |
| 75<, ≦106 | 108.3 | 748 | 0.84 |
| 106<, ≦125 | 111.5 | 754 | 0.86 |
| 125<, ≦150 | 116.8 | 741 | 0.90 |
| 150<, ≦180 | 115.7 | 750 | 0.88 |
| 180<, ≦212 | 113.4 | 763 | 0.85 |
| 212<, ≦250 | 110.1 | 755 | 0.87 |
| 250< | 112.9 | 752 | 0.88 |

TABLE 3

| | NCP-0 | | | |
|---|---|---|---|---|
| Particle Size (μm) | Mass % | $(BH)_{max}$ (kJ/m³) | $H_{cJ}$ (kA/m) | $B_r$ (T) |
| ≦38 | 9.36 | 104.5 | 854.66 | 0.830 |
| 38<, ≦53 | 6.83 | 104.77 | 844.00 | 0.829 |
| 53<, ≦75 | 12.34 | 107.16 | 853.39 | 0.831 |
| 75<, ≦106 | 19.76 | 110.67 | 859.75 | 0.837 |
| 106<, ≦125 | 12.23 | 112.64 | 866.12 | 0.845 |
| 125<, ≦150 | 15.24 | 111.63 | 864.21 | 0.843 |
| 150<, ≦180 | 9.42 | 105.64 | 896.30 | 0.820 |
| 180<, ≦212 | 8.89 | 107.61 | 849.41 | 0.831 |
| 212<, ≦250 | 4.27 | 99.67 | 851.16 | 0.814 |
| 250< | 1.65 | 88.44 | 844.64 | 0.800 |

As can be seen, the nanocomposite magnet powder exhibits magnetic properties at least comparable to, or even better than, those of the conventional rapidly solidified magnet powders. Thus, this nanocomposite magnet powder may be used as a magnet powder for a bonded magnet instead of the conventional rapidly solidified magnet powder (e.g., MQ powder). Naturally, a magnet powder for a bonded magnet may consist essentially of the nanocomposite magnet powder alone. However, not all of the MQ powder has to be the nanocomposite magnet powder but only powder particles with sizes of 53 μm or less may be replaced with the nanocomposite magnet powder particles.

Hereinafter, it will be described with reference to the experimental results how the fill density is improved by mixing fine powder particles with sizes of 53 μm or less or with sizes of 38 μm or less.

First, nanocomposite magnet powder samples NCP-1 through NCP-5 with various particle size distributions as shown in Table 4 were prepared. The magnet powder NCP-1 was obtained by getting the material alloy thereof pulverized by a power mill using a 0.5 ϕ screen, while the other magnet powders NCP-2 through NCP-5 were obtained by rotating the pin mill at 3,000 rpm, 4,000 rpm and 5,000 rpm, respectively. The tap densities of these magnet powder samples NCP-1 through NCP-5 as measured with a tap denser are shown in Table 5, in which the mass percentage of powder particles with sizes of 53 μm or less and the mass percentage of powder particles with sizes of greater than 250 μm are also shown for each of the magnet powder samples.

As can be seen from the results shown in Table 5, the samples NCP3, NCP4 and NCP5 including particles with sizes of 53 μm or less at about 10 mass % or more (more exactly 9.5 mass % or more) have tap densities of 4.25 g/cm³ or more. Thus, these magnet powder samples show excellent fill densities. Generally speaking, the fill density of a magnet powder as evaluated by the tap density thereof correlates to the fill density of a compound powder for a bonded magnet. That is to say, if a compound powder is prepared using a magnet powder with a high fill density, then the compound powder also has a high fill density. Accordingly, when a magnet powder, including 10 mass % or more of nanocomposite magnet powder particles with sizes of 53 μm or less, is used, a compound powder for a bonded magnet exhibits improved fill density and flowability. As a result, a compact of quality is obtained.

TABLE 4

| Particle Size | Mass % | | | | |
|---|---|---|---|---|---|
| (μm) | NCP-1 | NCP-2 | NCP-3 | NCP-4 | NCP-5 |
| ≦38 | 2.37 | 2.05 | 4.86 | 8.88 | 17.99 |
| 38<, ≦53 | 1.91 | 2.54 | 4.64 | 7.42 | 20.90 |
| 53<, ≦75 | 4.90 | 5.17 | 11.80 | 16.36 | 26.92 |
| 75<, ≦106 | 11.57 | 13.87 | 23.08 | 26.30 | 23.60 |
| 106<, ≦125 | 7.30 | 11.11 | 13.49 | 12.56 | 5.59 |
| 125<, ≦150 | 12.29 | 14.10 | 16.26 | 13.40 | 3.37 |
| 150<, ≦180 | 13.47 | 17.53 | 10.67 | 7.90 | 1.15 |
| 180<, ≦212 | 17.37 | 17.64 | 9.08 | 4.09 | 0.37 |
| 212<, ≦250 | 16.84 | 8.80 | 3.49 | 1.76 | 0.09 |
| 250<, ≦300 | 9.26 | 4.34 | 1.56 | 0.77 | 0.03 |
| 300< | 2.72 | 2.87 | 1.03 | 0.50 | 0.00 |

TABLE 5

| | (Mass %) ≦53 μm | (Mass %) 250 μm< | (g/cm³) Tap Density |
|---|---|---|---|
| NCP-1 | 4.30 | 12.00 | 4.01 |
| NCP-2 | 4.59 | 7.21 | 4.12 |
| NCP-3 | 9.50 | 2.59 | 4.28 |
| NCP-4 | 16.30 | 1.27 | 4.25 |
| NCP-5 | 38.90 | 0.00 | 4.33 |

Figure 16:
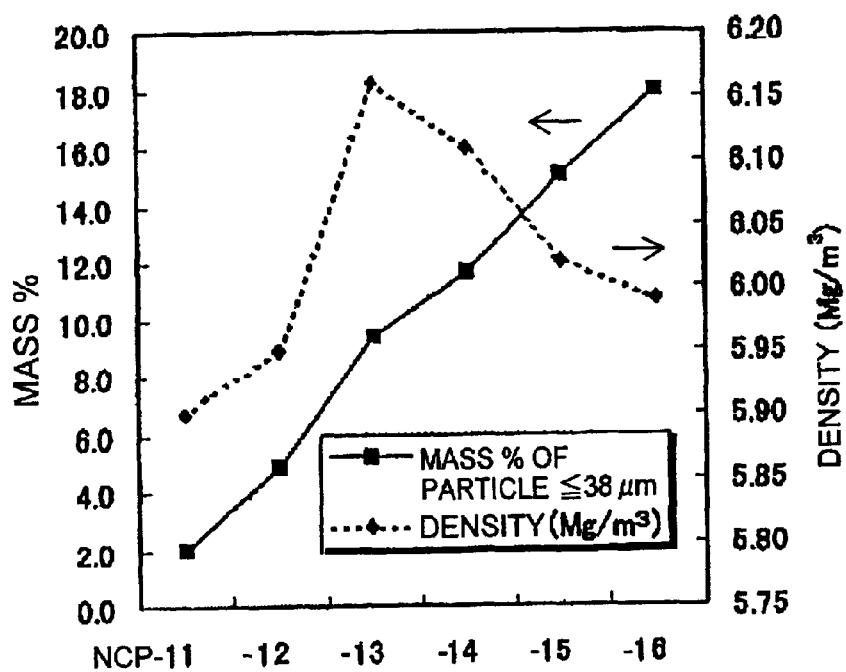
FIG. 16 is a graph illustrating the densities of compacts for a bonded magnet, which were formed using nanocomposite magnet powders with mutually different particle size distributions.

Furthermore, to increase the compact density, the magnet powder should preferably include powder particles with sizes of 38 μm or less. Nanocomposite magnet powders NCP-11 through NCP-16 having the particle size distributions shown in Table 6 were prepared and then mixed with 2 mass % of epoxy resin to obtain respective compounds. Then, the respective compounds were pressed and compacted at a compaction pressure of 980 MPa (=10 t/cm²), thereby forming compacts for a bonded magnet. The densities of the respective compacts for a bonded magnet and the mass percentages of powder particle with sizes of 38 μm or less in the magnet powders for the respective compounds are shown in FIG. 16.

TABLE 6

| Particle Size | NCP | | | | | |
|---|---|---|---|---|---|---|
| (μm) | -11 | -12 | -13 | -14 | -15 | -16 |
| ≦38 | 2.1 | 4.9 | 9.4 | 11.6 | 15.0 | 18.0 |
| 38<, ≦53 | 2.5 | 4.6 | 6.8 | 11.0 | 23.2 | 20.9 |

TABLE 6-continued

| Particle Size (μm) | NCP | | | | | |
|---|---|---|---|---|---|---|
| | -11 | -12 | -13 | -14 | -15 | -16 |
| 53<, ≦75 | 5.2 | 11.8 | 12.3 | 14.4 | 26.0 | 26.9 |
| 75<, ≦106 | 13.9 | 23.1 | 19.8 | 20.3 | 22.4 | 23.6 |
| 106<, ≦125 | 11.1 | 13.5 | 12.2 | 13.5 | 6.1 | 5.6 |
| 125<, ≦150 | 14.1 | 16.3 | 15.2 | 10.4 | 2.9 | 3.4 |
| 150<, ≦180 | 17.5 | 10.7 | 9.4 | 9.0 | 2.2 | 1.2 |
| 180<, ≦212 | 17.6 | 9.1 | 8.9 | 6.9 | 1.7 | 0.4 |
| 212<, ≦250 | 8.8 | 3.5 | 4.3 | 2.1 | 0.5 | 0.1 |
| 250<, ≦300 | 4.3 | 1.6 | 1.7 | 0.8 | 0.1 | 0.0 |
| 300< | 2.9 | 1.0 | 0.0 | 0.1 | 0.0 | 0.0 |

As can be seen from FIG. 16, the density of a compact decreases when the mass percentage of powder particles with sizes of 38 μm or less is too low or too high. The present inventors discovered and confirmed via experiments that a magnet powder, including powder particles with sizes of 38 μm or less at about 8 mass % or more, is preferably used to achieve a sufficiently high compact density. It should be noted, however, that if a magnet powder used includes powder particles with sizes of 38 μm or less at more than about 16 mass %, then the compactibility thereof decreases. That is to say, a quality compact of a high density cannot be obtained.

Methods for Producing Compound and Magnetic Body

A magnet powder for a bonded magnet, including the nanocomposite magnet powder described above, is compounded with a binder of a resin, for example, thereby producing a compound for a bonded magnet.

A compound to be injection molded is produced by compounding the magnet powder with a thermoplastic resin using a known kneading machine such as a kneader or an extruder. On the other hand, a compound to be compacted is produced by mixing the magnet powder with a thermosetting resin, which has been diluted with a solvent, and then removing the solvent from the mixture. If necessary, the resultant magnet powder-resin mixture is disintegrated to a predetermined particle size. By adjusting the disintegrating and other conditions, the mixture may be formed into granulated powder. Also, the powder material obtained by the pulverization process may be granulated, too.

To improve the anticorrosiveness of the magnet powder, the magnet powder may have its surface treated by a known process (e.g., conversion coating process) in advance. Also, to further improve the anticorrosiveness of the magnet powder, the wettability of the magnet powder with the resin and the compactibility of the compound, any of various coupling agents including silane, titanate, aluminate and zirconate agents, ceramic ultra-fine particles of colloidal silica or a lubricant such as zinc stearate or calcium stearate may be used. Furthermore, thermal stabilizer, fire retardant or plasticizer may also be used.

A compound for a magnet may be molded by any of various methods and may be used in any of numerous applications. Thus, depending on the intended application, the type of the resin binder and the compounding ratio of the magnet powder are determined appropriately. Examples of usable resins include thermosetting resins such as epoxy, phenol and melamine resins, thermoplastic resins such as polyamides (such as nylon 66, nylon 6 and nylon 12), polyethylene, polypropylene, polyvinyl chloride, polyester and polyphenylene sulfide, rubbers or elastomers and denatured, copolymers and mixtures thereof.

Furthermore, when the magnet powder of the present invention is used, the compound exhibits improved fill density and compactibility. Accordingly, high-viscosity resins, which have been difficult to use in the prior art, may also be used. Furthermore, the magnet powder is not oxidizable easily. Thus, high-temperature resins (e.g., polyimides, liquid crystal polymers and high-molecular-weight-grade polymers), which cannot be used in the prior art due to their high-melting or softening points, may also be used. As a result, the properties of the resultant bonded magnet (e.g., thermal resistance thereof) improve. Also, even a thermosetting resin that is cured at a higher temperature may be used.

Examples of applicable forming techniques include compacting, rolling, calendaring, extruding and injection molding. Among these molding techniques, the compound can be formed only in a relatively simple shape according to the compacting, rolling or extruding technique. In these techniques, however, the compound does not have to show so high a flowability during the forming process. Thus, the magnet powder can be included in the compound at a higher percentage. By using the magnet powder of the present invention, the magnet powder percentage can be increased to more than 80%, for example, which is much higher than that achieved by a known technique, and can also reach as high as 90% at the maximum. However, if the magnet powder percentage is increased excessively, then the resin binder for binding the magnet powder particles together tightly enough might be in an insufficient amount, thus possibly decreasing the mechanical strength of the resultant bonded magnet or dropping the magnet powder particles during the use of the magnet. For these reasons, the magnet powder percentage is preferably 85% or less. Also, where a compound including the inventive magnet powder is compacted, the total volume of voids formed on the surface of the resultant compact can be reduced. As a result, a resin coating to be formed on the surface of the compact is not affected by those voids so much. In these forming methods, a thermosetting or thermoplastic resin, a rubber or other suitable material may be used.

A compound including the magnet powder of the present invention exhibits an increased flowability. Accordingly, such a compound can be injection-molded effectively enough. Also, the compound can be molded into a complex shape, which has been difficult to realize when a compound including the conventional rapidly solidified magnet powder is used. Also, the magnet powder can be compounded at a higher percentage (e.g., greater than 65%) than the conventional compound, thus improving the magnetic properties of the resultant magnet body. Furthermore, the magnet powder of the present invention includes a rare earth element at a relatively low mole fraction and is oxidizable much less easily. For that reason, even if a compound including the inventive magnet powder and a thermoplastic resin or elastomer with a relatively high softening point is injection-molded at a relatively high temperature, the resultant magnetic properties will not deteriorate.

Applications of Bonded Magnet

As described above, the inventive compound for a bonded magnet has higher fill density (or compactibility) and thermal resistance as compared to a compound including a conventional rapidly solidified magnet powder (e.g., MQP-B produced by Magnequench Inc.). Thus, when the inventive compound is used, a bonded magnet, exhibiting excellent magnetic properties at least comparable to, or even better than, those of a bonded magnet made from the conventional rapidly solidified magnet powder, can be formed. Accordingly, the bonded magnet of the present invention can find various applications effectively.

Hereinafter, an application of the inventive bonded magnet to a stepping motor will be described with reference to FIG. 17.

Figure 17:
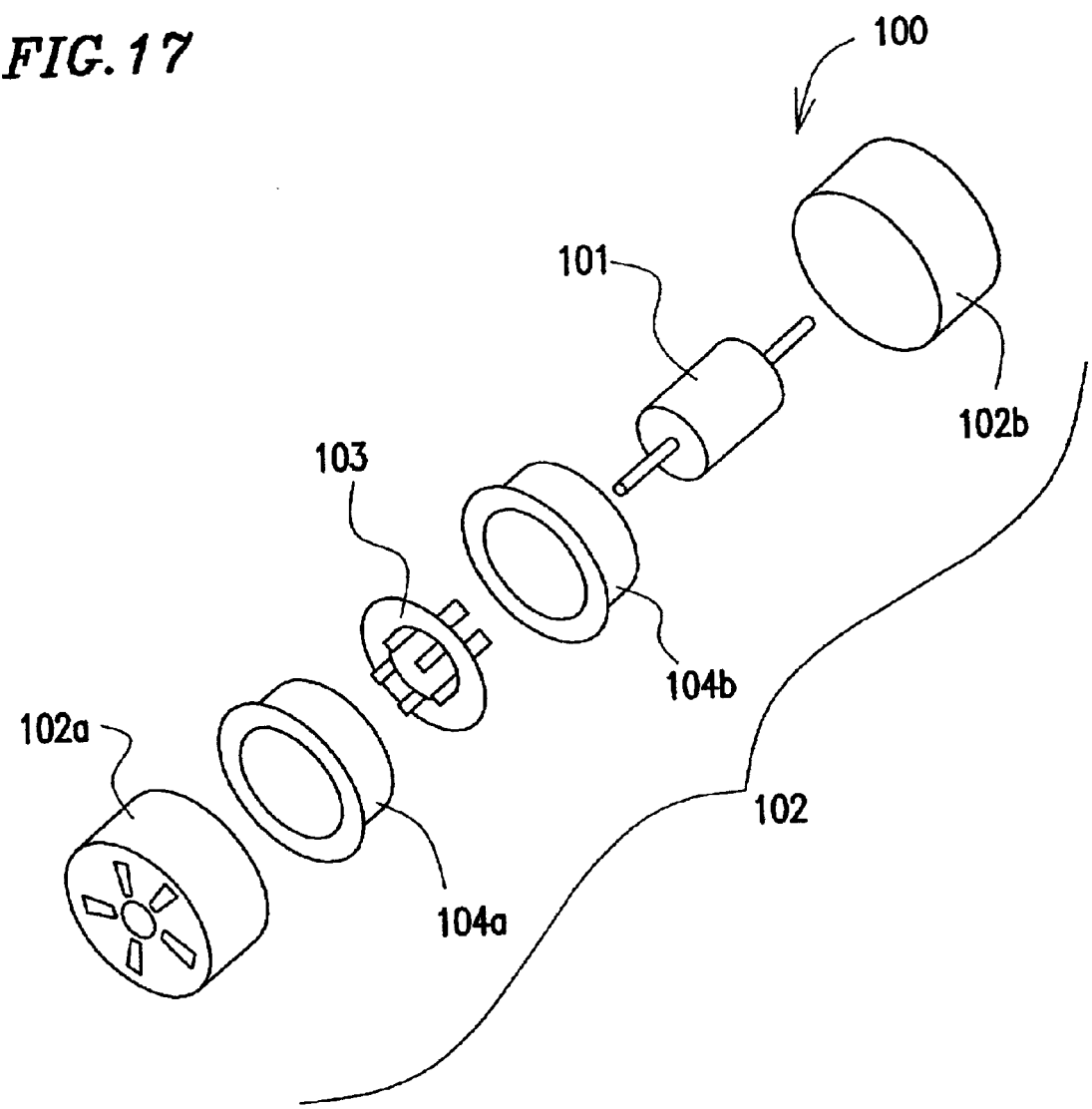
FIG. 17 is an exploded perspective view schematically illustrating a construction of a stepping motor 100 including a permanent magnet rotor as a preferred embodiment of the present invention.

FIG. 17 is an exploded perspective view schematically illustrating a construction of a stepping motor 100 including a permanent magnet rotor. As shown in FIG. 17, the stepping motor 100 includes a rotor 101 and a stator portion 102 that surrounds the rotor 101. The rotor 101 includes bonded magnets that have been uniformly magnetized at 10 poles around its outer circumference with an outer diameter of 8 mm. The stator portion 102 includes: outer yokes 102a and 102b; two inner yokes 103 that have been bonded to the backs of the outer yokes 102a and 102b, respectively; and magnetizing coils 104a and 104b interposed between the inner yokes 103. This stepping motor 100 is a so-called "PM-type pulse motor", in which the rotor 101 is displaced by one step angle by the magnetomotive force of the magnetizing coils 104a and 104b that corresponds to one pulse current.

The bonded magnets included in the rotor 101 have been formed by using the inventive compound with the excellent fill density (or compactibility). Thus, the bonded magnets exhibit excellent magnetic properties at least comparable to, or even better than, those of bonded magnets made from the conventional rapidly solidified magnet powder. In addition, these bonded magnets also excel in mechanical properties (e.g., much less likely chip), thus ensuring sufficient reliability. Furthermore, these bonded magnets also have good thermal resistance.

A stepping motor including such bonded magnets made from the inventive compound is a high-performance motor of a small size that can ensure great reliability. Thus, a stepping motor like this is effectively applicable to an office automation appliance such as printer or disk drive, a camera, or an audiovisual appliance including a camcorder.

The rotor 101 may be produced by any of various methods. For example, the rotor 101 may be formed by compacting a compound including a thermosetting resin or by injection-molding or extruding a compound including a thermoplastic resin. Hereinafter, an exemplary method for producing the rotor 101 will be described with reference to FIGS. 18A through 18D.

Figure 18A:
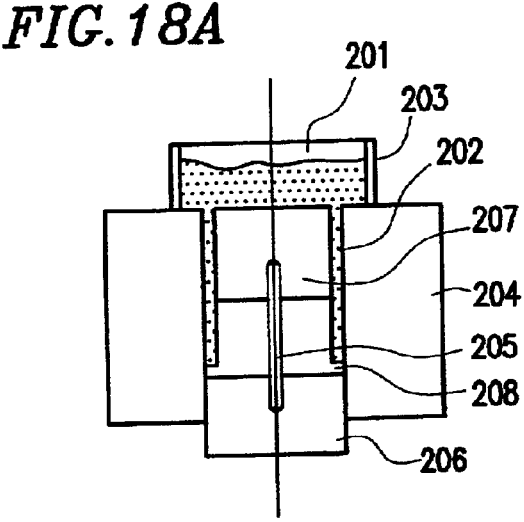
FIGS. 18A through 18D are cross-sectional views illustrating a bonded-magnet-integrated rotor 200 and a manufacturing process thereof in accordance with the preferred embodiment of the present invention.
Figure 18B:
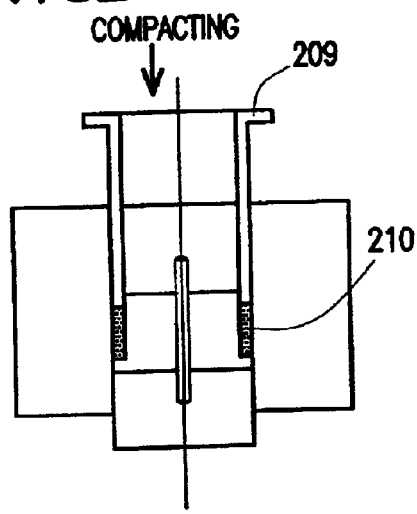
Figure 18C:
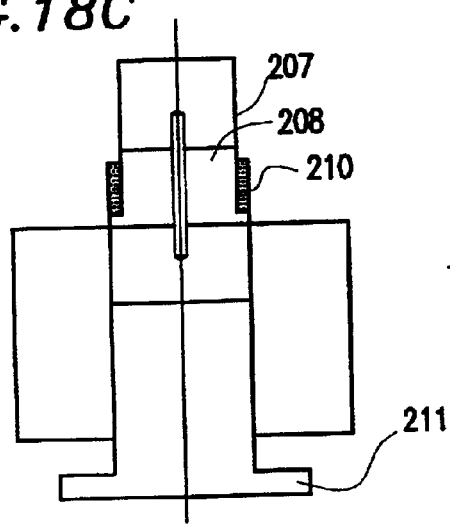
Figure 18D:
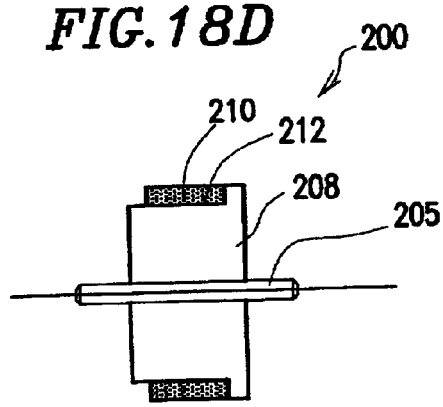

For example, where a compound including a thermosetting resin as a binder is used, the rotor 200 shown in FIG. 18D, which has been integrated with a bonded magnet, can be produced through the manufacturing process steps illustrated in FIGS. 18A through 18C.

The rotor 200 shown in FIG. 18D includes a rotor shaft 205, a yoke 208 surrounding the shaft 205 and a bonded magnet 210 that has been bonded to the surface of the yoke 208.

The rotor 200 may be produced by performing the manufacturing process steps illustrated in FIGS. 18A through 18C.

First, as shown in FIG. 18A, while a feeder box 203 containing a powder compound 201 is being slid over the upper surface of a die 204, a cavity 202 is filled with the compound 201. The yoke 208, including the rotor shaft 205 fitted in tightly at the center thereof, has been inserted into the die 204. An auxiliary member 207 has been placed on the yoke 208 so as to cover the rotor shaft 205. That is to say, the cavity 202 has been formed between the die 204 and these members 207 and 208.

Next, as shown in FIG. 18B, the compound 201 is pressed and compacted via an upper punch 209, for example, thereby physically binding the yoke 208 and the compound 201 together.

Thereafter, as shown in FIG. 18C, the rotor compact is taken out of the die 204. The auxiliary member 207 is easily removed from the rotor shaft 205 and yoke 208. As a result, the rotor shaft 205, yoke 208 and bonded magnet 210 have been integrated together. At this point in time, however, the bonded magnet 210 is still a powder compact of the compound 201 and the thermosetting resin included in the compound 201 has not cured yet.

Subsequently, to cure the bonded magnet 210 and to increase the bonding strength at the interface 212 between the yoke 208 and bonded magnet 210, the compound 201 is cured at a predetermined temperature. The curing temperature and time may be determined appropriately according to the type of the resin used.

The inventive compound includes the magnet powder with excellent thermal resistance, and can be cured at a higher temperature than the conventional compound. Accordingly, the bonded magnet 210 obtained in this tional compound. Accordingly, the bonded magnet 210 obtained in this manner exhibits much better thermal resistance, mechanical properties and adhesive strength. Furthermore, in the compound of the present invention, the magnet powder itself has excellent anticorrosiveness. Thus, even if the thermosetting process is carried out in the air, the resultant magnet properties deteriorate only slightly. That is to say, there is no need to carry out the thermosetting process in an inert atmosphere, thus cutting down the process cost advantageously.

According to this compacting method, while the ring-shaped bonded magnet 210 is being formed, the bonded magnet 210 can be integrated with the yoke 208 and rotor shaft 205 together. Thus, the rotor 200 can be formed at a high productivity.

In the foregoing example, the powder compact is cured after having been taken out of the die 204. Alternatively, the compact may be cured inside the die 204 by providing a heating mechanism for the die 204. That is to say, the compound 201 may be cured while being pressed. Furthermore, the bonded-magnet-integrated rotor does not have to be formed by the compacting process but may be formed by an injection-molding process.

Also, the inventive compound exhibits a higher fill density (i.e., compactibility and/or flowability) than a compound including the conventional rapidly solidified magnet powder. Thus, even a small gap (with a width of about 2 mm, for example) can also be filled with the compound just as intended. Consequently, the inventive compound is effective to produce a magnet-embedded rotor 300 (see FIG. 19) for use in an IPM (interior permanent magnet) type motor.

The magnet-embedded rotor 300 shown in FIG. 19 includes an iron core 301 (with a diameter of 80 mm and a thickness of 50 mm, for example), a rotating shaft slot 302 formed at the center of the iron core 301, and a plurality of arced magnet slots 304 formed along the outer circumference of the iron core 301. In the illustrated example, eight arced magnet slots 304 are provided. Each of these slots 304 has a two-layer structure consisting of a first slot 304a with a width of 3.5 mm, for example, and a second slot 304b with a width of 1.8 mm, for example. These slots 304a and 304b are filled with the compound of the present invention, thereby forming bonded magnets. By combining this rotor 300 with a stator (not shown) in which S and N poles are arranged alternately so as to face the magnet slots 304 of the rotor 300, an IPM type motor can be obtained.

The bonded magnets may be formed by any of various techniques. For example, where a compound including a thermosetting resin is used, an in-slot compaction technique (see Japanese Laid-Open Publication No. 63-98108, for example) may be adopted. Also, where a compound including a thermoplastic resin is used, an extrusion or injection molding technique may be adopted. According to any of these techniques, the slots 304a and 304b can be filled with the compound of the present invention just as intended because the inventive compound achieves a good fill density. Thus, bonded magnets, exhibiting excellent mechanical properties and thermal resistance and showing magnetic properties at least comparable to, or even better than, those of the conventional magnets, can be formed. As a result, a higher-performance, higher-reliability IPM type motor of a smaller size can be produced.

Figure 20A:
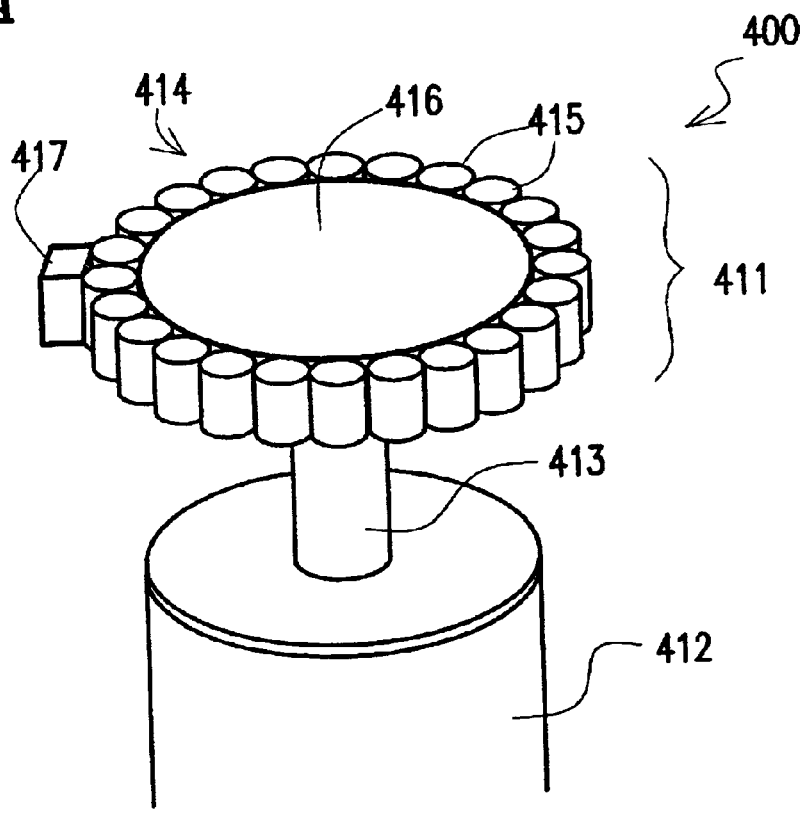
FIGS. 20A and 20B are perspective views schematically illustrating a structure of a rotary encoder 411 as still another preferred embodiment of the present invention.

The compound of the present invention is also effective to form bonded magnets for the angle sensor (or rotary encoder) 400 shown in FIG. 20A.

The rotary encoder 411 shown in FIG. 20A includes a rotating shaft 413, a rotating drum 416 coupled to the rotating shaft 413, a rotor 414 that has been bonded to the outer circumference of the rotating drum 416 and includes a plurality of bonded magnets 415, and a sensor 417 attached to the outer circumference of the rotor 414. The sensor 417 may be of any type so long as the sensor 417 can detect variation in magnetic fluxes produced from the rotor 414. For example, the sensor 417 may be Hall device, magnetoresistance device or magnetoimpedance effect device. The rotating shaft 413 is also coupled to a motor 412. The sensor 417 is connected to an instrument (not shown).

Figure 20B:
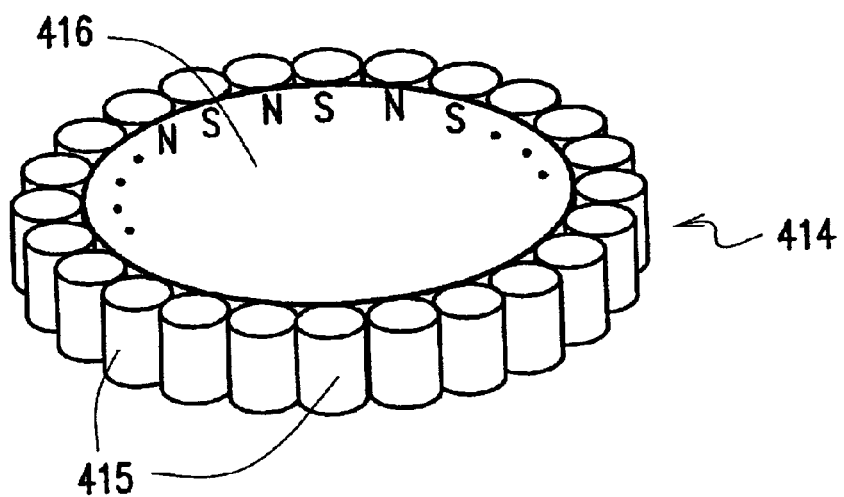

The bonded magnets 415, each of which has been made from the compound of the present invention, may be of a cylindrical shape as shown in FIG. 20B. Also, the bonded magnets 415 are arranged around the outer circumference of the rotating drum 416 so that the N and S poles thereof alternate with each other. The bonded magnets 415 may be bonded to the rotating drum 415 via an adhesive, for example. The rotating drum 416 may be made of a metal and does not have to be made of a magnetic material.

This rotary encoder 400 operates in the following manner. As the rotating shaft 413 of the motor 412 rotates, the rotor 414 also rotates. In this case, the magnetic flux, produced from the bonded magnets 415 arranged around the outer circumference of the rotor 414 and then sensed by the sensor 417, changes its direction as the rotor 414 rotates. In response, the sensor 417 generates a signal corresponding to this change in direction of the magnetic flux (e.g., a variation in voltage or current) and outputs the signal to the instrument (not shown). In this manner, the quantity (i.e., the angle) of rotation of the motor 412 is measured.

The compound of the present invention has a good fill density (i.e., compactibility or flowability) and exhibits excellent magnetic properties at least comparable to, or even better than, those of the conventional magnets. Thus, bonded magnets with much better mechanical properties and thermal resistance can be made from the inventive compound. Consequently, a high-performance, high-reliability angle sensor of a small size can be obtained.

Figure 21A:
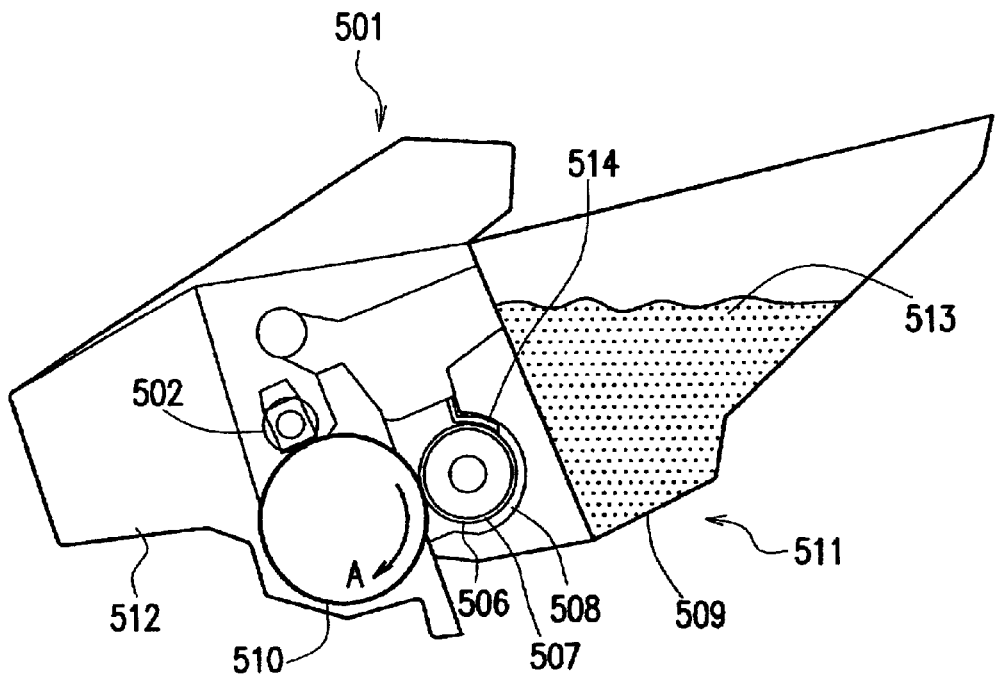
FIGS. 21A and 21B are cross-sectional views schematically illustrating a structure of an electrophotograph process cartridge 501, including a magnetic roller 507, as yet another preferred embodiment of the present invention.
Figure 21B:
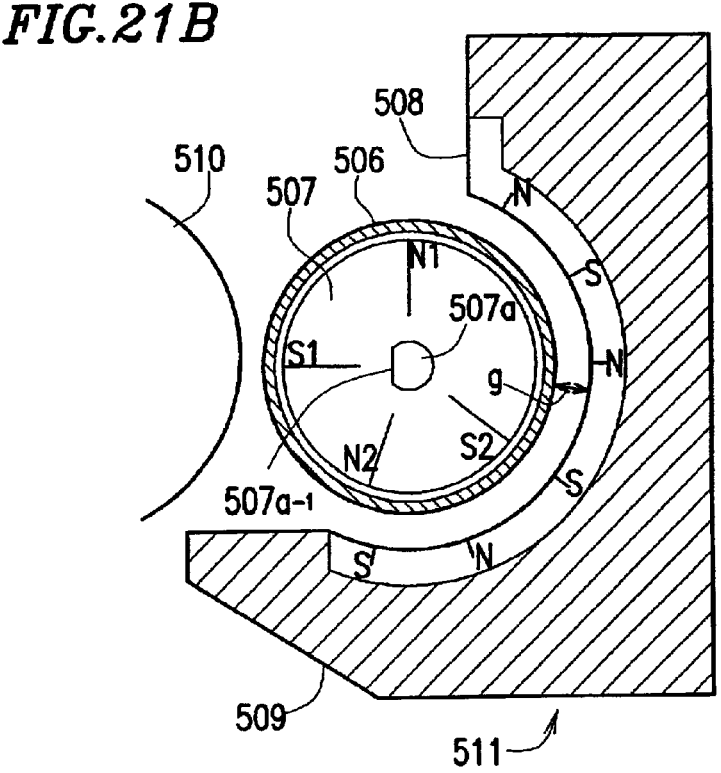

Furthermore, the inventive compound is also effective to form a bonded magnet for the magnetic roller illustrated in FIGS. 21A and 21B.

FIG. 21A is a cross-sectional view schematically illustrating the structure of an electrophotograph process cartridge 501. The cartridge 501 includes a photosensitive drum 510 driven in the direction indicated by the arrow A, a charging roller 502 for charging the drum 510, a developer 511, and a cleaner 512.

The developer 511 includes a developing container 509 in which toner 513 is stored. A developing sleeve 506 is disposed in a rotatable state inside the opening of the developing container 509 so as to face the photosensitive drum 510. The developer 511 further includes an elastic blade 514, which comes into contact with the developing sleeve 506, thereby regulating the thickness of the toner 513 that is being carried and transported by the developing sleeve 506.

FIG. 21B is a cross-sectional view schematically illustrating the configuration of the developer 511 included in the process cartridge 501.

The developing sleeve 506 is made of a non-magnetic material and secured in a rotatable state to the developing container 509 via a bearing. A magnetic roller 507 with a diameter of 8.5 mm, for example, has been inserted into the developing sleeve 506 with a diameter of 10 mm, for example. The shaft 507a of the magnetic roller 507 has a notch 507a-1, which engages with the developing container 509 to secure the magnetic roller 507 to the container 509. The magnetic roller 507 has a developing pole S1 in front of the photosensitive drum 510 and three more poles S2, N1 and N2 at other positions.

A magnet 508 is disposed so as to surround the developing sleeve 506 and forms a magnetic curtain in the gap g between the developing sleeve 506 and the magnet 508. The magnetic curtain retains the toner 513 in the gap g, thereby preventing the toner 513 from being leaked.

The magnetic roller 507 is made of the inventive compound, and exhibits excellent magnetic properties at least comparable to, or even better than, those of the conventional roller. The roller 507 also excels in mechanical properties and thermal resistance. Accordingly, the magnetic roller 507 and developing sleeve 506 can be of smaller sizes than the conventional ones, and yet exhibit improved performance. The magnetic roller made from the inventive compound is also applicable to a developer or developing cartridge for a photocopier or laser beam printer.

EXAMPLES

Example 1

For each of the samples Nos. 1 to 7 shown in the following Table 7, the respective materials B, Fe, Ti, Nd and Nb with purities of about 99.5% or more were weighed so that the sample had a total weight of about 600 g and then the mixture was put into a crucible of alumina. Thereafter, these alloyed materials were melted by an induction heating method within an argon (Ar) atmosphere at a pressure of about 70 kPa, thereby preparing a melt of the alloy. After the temperature of the melt had reached about 500° C., the melt was cast into a water-cooled copper mold to make a plate-like alloy.

The alloy thus obtained was pulverized into flakes. The pulverized alloy flakes with a weight of about 25 mg were melted. Then, the molten alloy was rapidly cooled and solidified at a cooling rate of about 20° C./min. The rapid solidification process was subjected to a differential thermal analysis (DTA) using a differential calorimeter within an Ar atmosphere. The results are shown in the following Table 7:

TABLE 7

| Sample No. | Composition of alloy (at %) | | | | | Solidification Temperature (° C.) | |
|---|---|---|---|---|---|---|---|
| | Nd | Fe | B | Ti | Nb | 1st | 2nd |
| 1 | 9.0 | Balance | 12 | 3 | 0.5 | 1185 | 1120 |
| 2 | 9.0 | Balance | 14 | 3 | 1.0 | 1174 | 1075 |
| 3 | 8.7 | Balance | 11 | 2 | 0.3 | 1196 | 1133 |
| 4 | 9.0 | Balance | 14 | 4 | 1.5 | 1160 | 1068 |
| 5 | 9.0 | Balance | 13 | 3 | 0.7 | 1175 | 1112 |
| 6 | 9.0 | Balance | 14 | 4 | — | 1240 | 1145 |
| 7 | 9.0 | Balance | 14 | 3 | — | 1231 | 1140 |

In Table 7, Nb, as well as Ti, was added to samples Nos. 1 to 5, while no Nb was added to samples Nos. 6 and 7.

On the rightmost columns of Table 7, temperatures characterizing the solidification processes of the molten alloy are described for these samples Nos. 1 to 7. The temperatures identified by "$1^{st}$" indicate the temperatures at which the melt was solidified for the first time while the melt was being quenched (i.e., liquidus temperatures). On the other hand, the temperatures identified by "$2^{nd}$" indicate the temperatures at which the melt was solidified for the second time while the melt was being quenched (i.e., freezing points that are lower than the liquidus temperatures). More specifically, peaks of heat generation were observed at these temperatures by the differential calorimeter.

Figure 8:
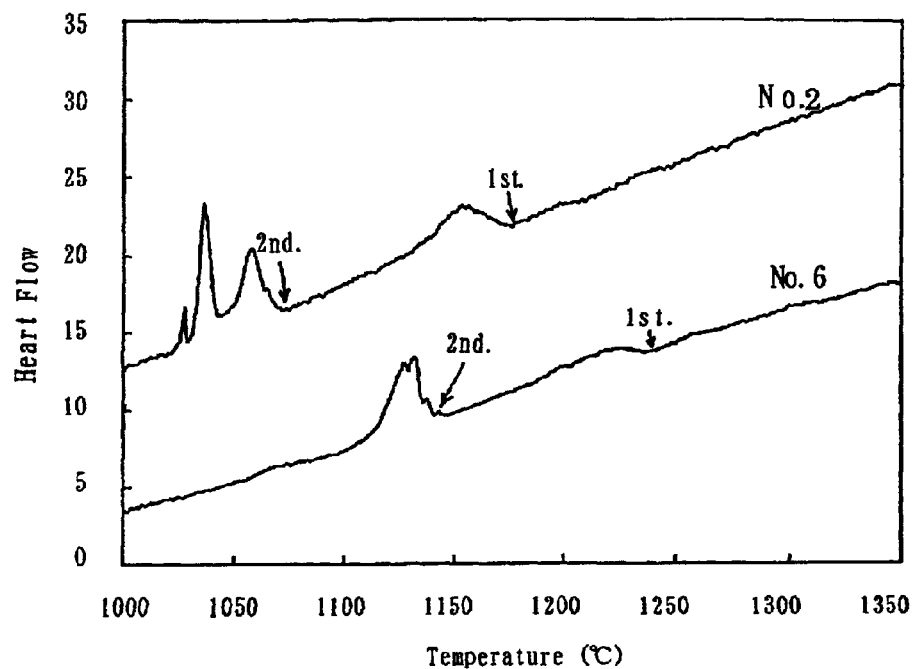
FIG. 8 is a graph illustrating the results of DTA carried out on samples Nos. 2 and 6.

FIG. 8 is a graph illustrating the results of the DTA carried out on sample No. 2 (to which Nb was added) and sample No. 6 (to which no Nb was added). As can be seen from FIG. 8, the liquidus temperature "$1^{st}$" of sample No. 2, i.e., the temperature indicating the first peak of heat generation during the cooling process, was lower than that of sample No. 6 by as much as about 60° C. or more.

This first peak of heat generation might have appeared due to the precipitation of a Ti—B compound phase (e.g., $TiB_2$ phase). In this example, Ti and B were added at higher mole fractions compared to the known composition. Accordingly, a Ti—B compound with a high melting point was easily formed and the precipitation temperature would be high. In an alloy with the known composition including no additive Ti (i.e., $Fe_3B/Nd_2Fe_{14}B$ system), the liquidus temperature of its melt was about 1200° C. or less. In the example of preferred embodiments of the present invention, not only Ti but also Nb was added. For this reason, the precipitation temperature of such a compound decreased and the liquidus temperature of the molten alloy also decreased.

If an alloy with the composition of sample No. 6 (representing a comparative example) is used, the strip casting process should preferably be carried out at a teeming temperature as high as about 1350° C. In contrast, if an alloy with the composition of sample No. 2 (representing an example of the present invention) is used, then the teeming temperature may be set at about 1250° C., for example. By lowering the teeming temperature in this manner, the excessive grain growth of the $R_2Fe_{14}B$ compound and $TiB_2$, which often precipitate at an early stage of the melt quenching process, is suppressible, thus improving the resultant magnet properties.

Example 2

For each of the samples Nos. 8 to 15 shown in the following Table 8, the respective materials B, Fe, Ti, Nd and C with purities of about 99.5% or more were weighed so that the sample had a total weight of about 600 g and then the mixture was put into a crucible of alumina. Thereafter, these alloyed materials were melted by an induction heating method within an argon (Ar) atmosphere at a pressure of about 70 kPa, thereby preparing a melt of the alloy. After the temperature of the melt had reached about 1500° C., the melt was cast into a water-cooled copper mold to make a plate-like alloy.

The alloy thus obtained was pulverized into flakes. The pulverized alloy flakes with a weight of about 25 mg were melted. Then, the molten alloy was rapidly cooled and solidified at a cooling rate of about 20° C./min. The rapid solidification process was subjected to a differential thermal analysis (DTA) using a differential calorimeter within an Ar atmosphere. The results are shown in the following Table 8:

TABLE 8

| Sample No. | Composition of alloy (at %) | | | | | | Solidification temperature (° C.) | |
|---|---|---|---|---|---|---|---|---|
| | Nd | Fe | B | C | Ti | M | 1st | 2nd |
| 8 | 9.0 | Balance | 12.6 | 1.4 | 4 | 0 | 1200 | 1012 |
| 9 | 9.0 | Balance | 11.2 | 2.8 | 4 | Cu0.4 | 1187 | 1009 |
| 10 | 9.0 | Balance | 9.9 | 1.1 | 3 | Nb0.5 | — | 989 |
| 11 | 9.0 | Balance | 11.7 | 1.3 | 3 | 0 | 1183 | 1002 |
| 12 | 9.0 | Balance | 12.6 | 1.4 | 5 | Si1 | 1210 | 1047 |
| 13 | 9.0 | Balance | 13.3 | 0.7 | 3 | Nb1 | 1168 | 1103 |
| 14 | 9.0 | Balance | 14 | 0 | 4 | 0 | 1240 | 1145 |
| 15 | 9.0 | Balance | 13 | 0 | 3 | 0 | 1225 | 1120 |

In Table 8, C, as well as Ti, was added to samples Nos. 8 to 13, while no C was added to samples Nos. 14 and 15.

In the rightmost columns of Table 8, temperatures characterizing the solidification processes of the molten alloy are described for these samples Nos. 8 to 15. The temperatures identified by "$1^{st}$" indicate the temperatures at which the melt was solidified for the first time while the melt was being quenched (i.e., liquidus temperatures). On the other hand, the temperatures identified by "$2^{nd}$" indicate the temperatures at which the melt was solidified for the second time while the melt was being quenched (i.e., freezing points that are lower than the liquidus temperatures). More specifically, peaks of heat generation were observed at these temperatures by the differential calorimeter.

Figure 9:
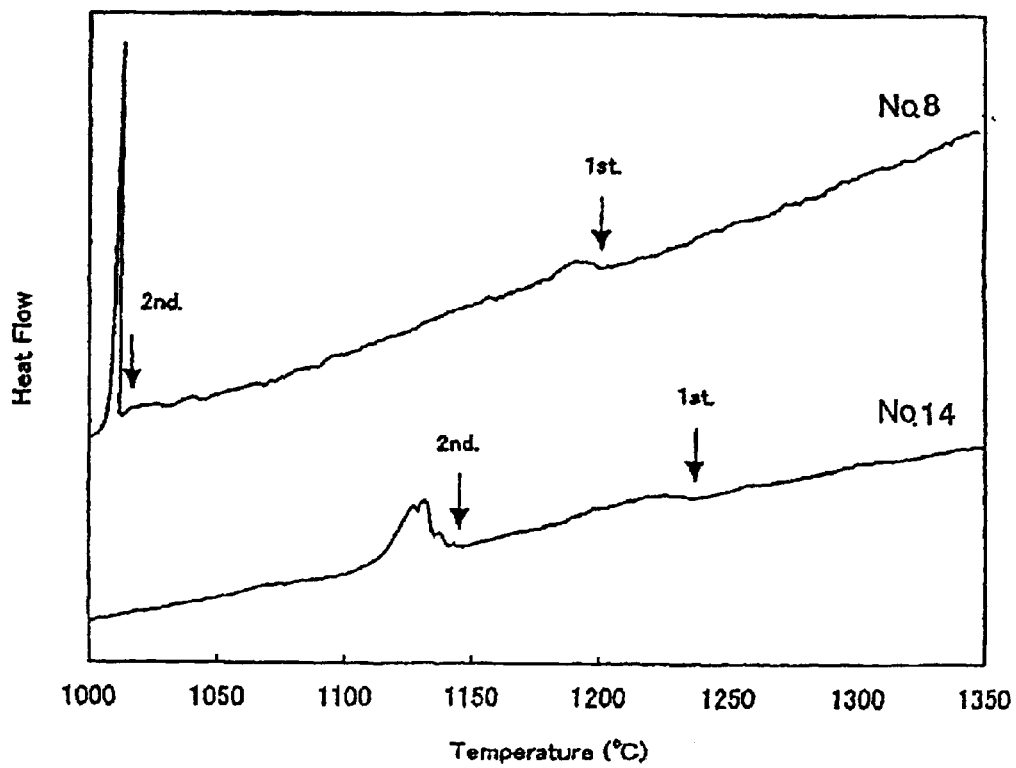
FIG. 9 is a graph illustrating the results of DTA carried out on samples Nos. 8 and 14.

FIG. 9 is a graph illustrating the results of the DTA carried out on sample No. 8 (to which C was added) and sample No. 14 (to which no C was added). As can be seen from FIG. 9, the liquidus temperature "$1^{st}$" of sample No. 8, i.e., the temperature indicating the first peak of heat generation during the cooling process, was lower than that of sample No. 14 by as much as about 40° C. or more.

This first peak of heat generation might have appeared due to the precipitation of a Ti—B compound phase (e.g., $TiB_2$ phase). In this example, Ti and B were added at higher mole fractions compared to the known composition. Accordingly, a Ti—B compound with a high melting point was easily formed and the precipitation temperature thereof would be high. In an alloy with the known composition including no additive Ti (i.e., $Fe_3B/Nd_2Fe_{14}B$ system), the liquidus temperature of its melt is about 1200° C. or less. In the example of preferred embodiments of the present invention, not only Ti but also C were added. Probably for this reason, the precipitation temperature of such a compound decreased and the liquidus temperature of the melt also decreased.

If an alloy with the composition of sample No. 14 (representing a comparative example) is used, the strip casting process should be carried out at a teeming temperature as high as about 1350° C. In contrast, if an alloy with the composition of sample No. 8 (representing an example of the present invention) is used, then the teeming temperature may be set at about 1300° C., for example. By lowering the teeming temperature in this manner, the excessive grain growth of the $R_2Fe_{14}B$ compound and $TiB_2$, which often precipitate at an early stage of the melt quenching process, is suppressible, thus improving the resultant magnet properties.

For each of the samples Nos. 8 to 15 shown in Table 8, the respective materials B, Fe, Ti, Nd and C with purities of about 99.5% or more were weighed so that the sample had a total weight of about 15 g and then the mixture was put into a crucible of quartz having an orifice with a diameter of about 0.8 mm at the bottom. Thereafter, these alloyed materials were melted by an induction heating method within an argon (Ar) atmosphere at a pressure of about 1.33 kPa to about 47.92 kPa, thereby preparing a melt of the alloy. After the temperature of the melt had reached approximately 1350° C., the surface of the melt was pressurized with an Ar gas, thereby ejecting the melt through the orifice onto the outer circumference of a chill roller, which was located at about 0.7 mm under the orifice. The chill roller was made of pure copper and was being rotated so as to have a surface velocity of approximately 15 m/sec. As a result of the contact with such a chill roller, the molten alloy was rapidly cooled and solidified. In this manner, a continuous thin strip of rapidly solidified alloy with a width of about 2 mm to about 3 mm and a thickness of about 20 to about 50 μm was obtained.

Figure 10:
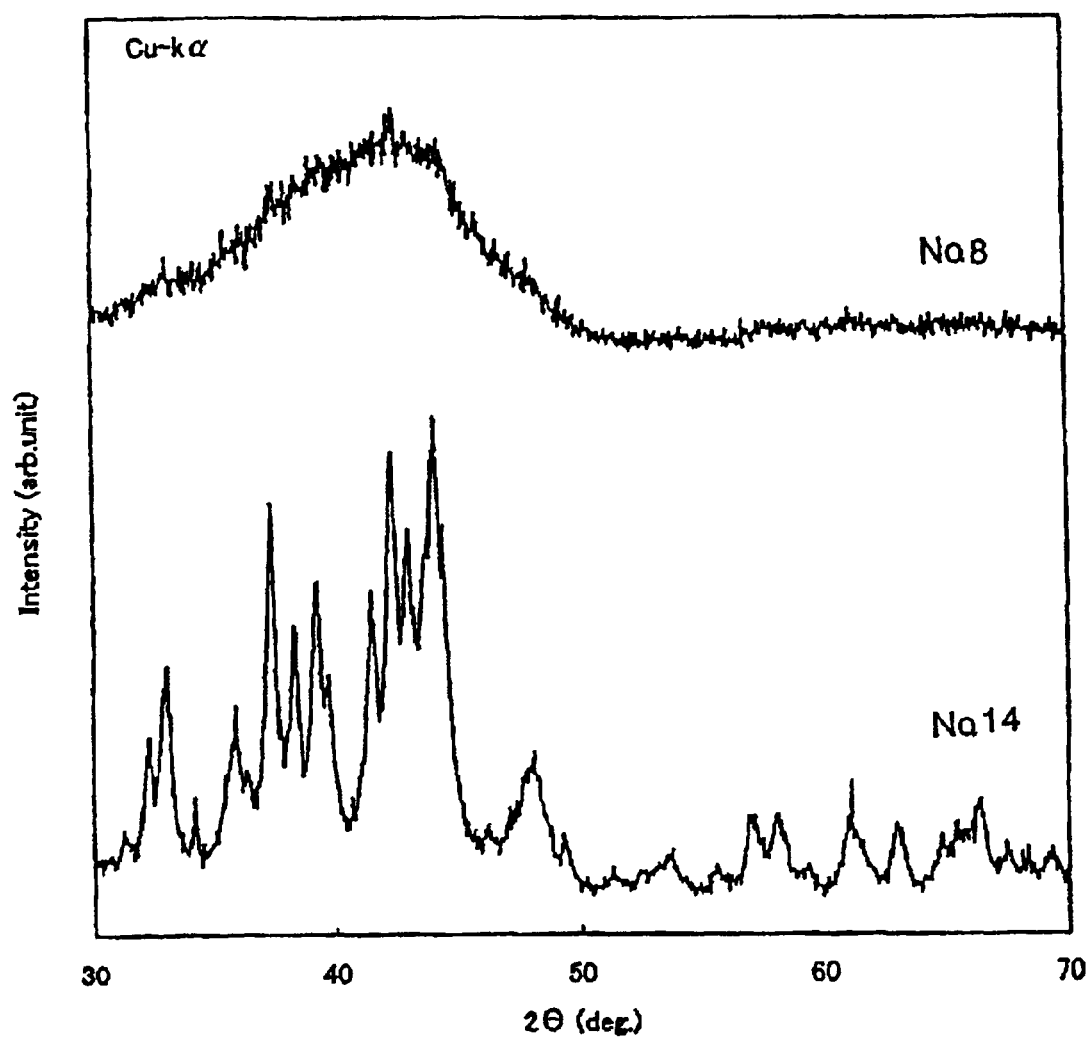
FIG. 10 is a graph illustrating the powder XRD patterns of the samples Nos. 8 and 14 yet to be heat-treated (i.e., in an as-cast state).

FIG. 10 is a graph illustrating the XRD patterns of samples Nos. 8 and 14. As can be seen from FIG. 10, most of sample No. 8 was amorphous, while a major portion of sample No. 14 was crystalline.

This thin-strip rapidly solidified alloy was heated to a temperature of about 600° C. to 800° C. within an Ar atmosphere, kept heated at the temperature for about 6 minutes to about 8 minutes and then cooled to room temperature. Thereafter, the magnetic properties of this thin-strip rapidly solidified alloy (with a length of about 3 mm to about 5 mm) were measured using a vibrating sample magnetometer (VSM). The results are shown in the following Table 9:

TABLE 9

| Sample No. | $B_r$ (T) | $H_{cJ}$ (kA/m) | $(BH)_{max}$ (kJ/m³) | Heat treatment Temperature (° C.) |
|---|---|---|---|---|
| 8 | 0.81 | 987 | 107 | 760 |
| 9 | 0.77 | 668 | 90.6 | 740 |
| 10 | 0.88 | 788 | 124 | 700 |
| 11 | 0.81 | 764 | 101 | 780 |
| 12 | 0.78 | 955 | 100 | 740 |
| 13 | 0.81 | 1080 | 107 | 600 |
| 14 | 0.82 | 884 | 111 | 720 |
| 15 | 0.81 | 758 | 97.7 | 760 |

Next, a material alloy with the same composition as that of sample No. 13 shown in Table 8 was prepared and subjected to a strip casting process using the caster shown in FIG. 3, thereby making a rapidly solidified alloy. Specifically, the respective materials B, Fe, Ti, Nd and C with purities of about 99.5% or more were weighed so that the material alloy had a total weight of about 10 kg and then the mixture was put into a melting vessel. Thereafter, these alloyed materials were melted by an induction heating method within an Ar atmosphere at a pressure of about 30 kPa, thereby preparing a melt of the alloy. After the temperature of the melt had reached approximately 1350° C., the melt was poured onto the shoot. The melt flowed over the shoot smoothly and was quenched by the chill roller. The chill roller had a surface velocity of about 12 m/sec.

The resultant rapidly solidified alloy (with an average thickness of about 80 μm) was heated to a temperature of about 740° C. within an Ar atmosphere, kept heated at the temperature for about 6 minutes to about 8 minutes and then cooled to room temperature. Thereafter, the magnetic properties of this rapidly solidified alloy were measured using a vibrating sample magnetometer (VSM).

As a result, the remanence $B_r$ of this alloy was about 0.79 T, the coercivity $H_{cJ}$ thereof was about 1090 kA/m and the maximum energy product $(BH)_{max}$ thereof was about 102 kJ/m³. Comparing these magnetic properties to those of sample No. 13 shown in Table 9, it can be seen that similar properties were obtained.

Next, the XRD and demagnetization curves were obtained for a sample in which the atomic ratio p of C to B+C was about 0.25 or less and for a sample in which the atomic ratio p was greater than about 0.25.

Figure 11:
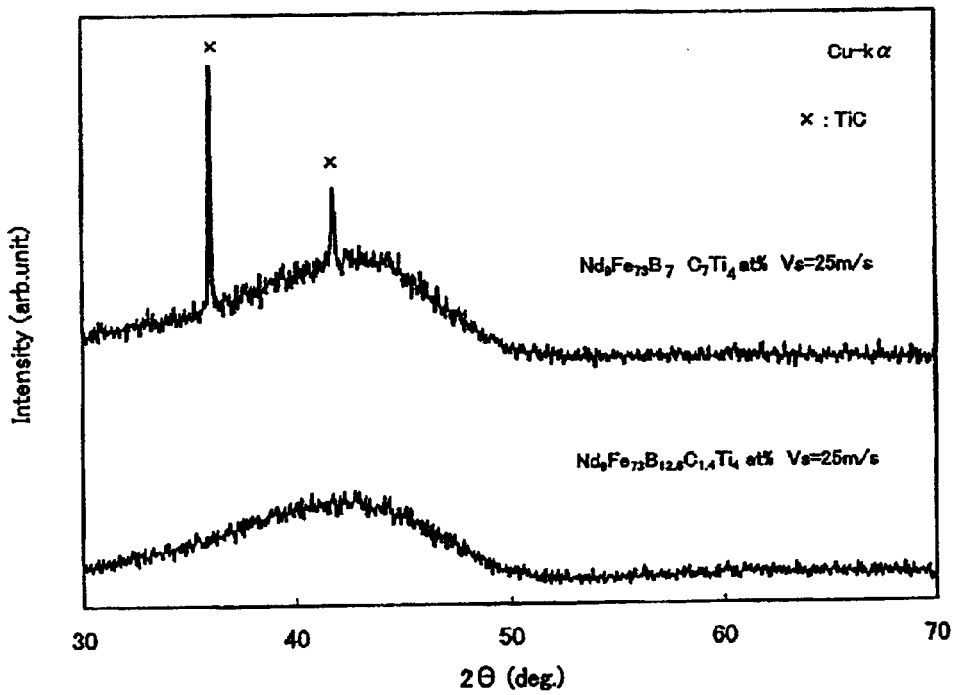
FIG. 11 is a graph illustrating the XRD patterns of $Nd_9Fe_{73}B_{12.6}C_{1.4}Ti_4$ (i.e., an example of the present invention where p=0.1) and $Nd_9Fe_{73}B_7C_7Ti_4$ (i.e., a comparative example where p=0.5) before the heat treatment.
Figure 12:
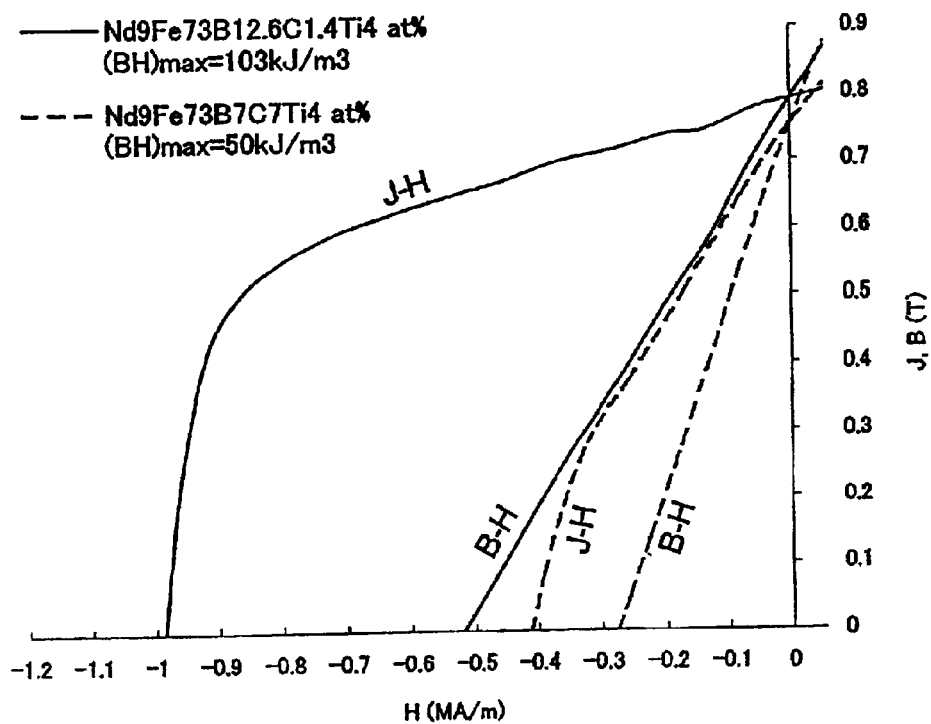
FIG. 12 is a graph illustrating the demagnetization curves of $Nd_9Fe_{73}B_{12.6}C_{1.4}Ti_4$ and $Nd_9Fe_{73}B_7C_7Ti_4$ representing the example of a preferred embodiment of the present invention and comparative example, respectively.

FIG. 11 illustrates the XRD patterns of $Nd_9Fe_{73}B_{12.6}C_{1.4}Ti_4$ (i.e., a sample representing an example of various preferred embodiments of the present invention where p=0.1) and $Nd_9Fe_{73}B_7C_7Ti_4$ (i.e., a sample representing a comparative example where p=0.5) before the heat treatment. These samples had mutually different compositions but were prepared as in the foregoing examples. FIG. 12 illustrates the demagnetization curves of $Nd_9Fe_{73}B_{12.6}C_{1.4}Ti_4$ and $Nd_9Fe_{73}B_7C_7Ti_4$ representing the example and comparative example, respectively.

Where the C ratio p exceeded about 0.25 and reached about 0.5, an outstanding diffraction peak of TiC phase was observed as shown in FIG. 11. As can be seen, if too much C is included, a lot of TiC phase precipitates in the rapidly solidified alloy. In that case, the mole fractions of the respective constituent phases will deviate from their desired ranges after the alloy has been heat-treated. As a result, the loop squareness of the demagnetization curve deteriorates as shown in FIG. 12. In contrast, where the C ratio p was about 0.25 or less, no such problem occurred.

Example 3

In this example, the strip caster shown in FIG. 3 was used.

First, the respective materials B, C, Fe, Nb, Ti and Nd with purities of about 99.5% or more were weighed so that the resultant alloy should have a composition of $Nd_9Fe_{73}B_{12.6}C_{1.4}Ti_3Nb_1$ (where subscripts are indicated in atomic percentages) and that the alloy had a total weight of about 5 kg. Next, the mixture of these metals was put into a crucible of alumina and then melted by an induction heating method within an argon (Ar) atmosphere at a pressure of about 35 kPa. The alloy was melted at approximately 1350° C.

After these materials were melted, the crucible was tilted to pour the melt onto a shoot made of a porous ceramic and thereby guide the melt onto the surface of a chill roller. The shoot had a surface temperature of about 600° C. that was maintained by a heater. The shoot was tilted to form an angle α of about 20 degrees with respect to the horizontal plane so that the melt could smoothly flow over the shoot toward the roller. Also, the shoot was located at such a position that the line connecting the far end of the shoot to the center of the chill roller formed an angle β of about 40 degrees with respect to the horizontal plane. It should be noted that the shoot used in this example had melt guides such as those shown in FIG. 4 for dividing the melt poured from the crucible into two melt flows and teeming these two flows onto the roller separately.

The chill roller was rotated at a surface velocity of about 14 m/sec. By adjusting the tilt angle of the crucible, each melt flow running down the shoot had a feeding rate controlled to be about 1.5 kg/min. In this example, a roller made of pure copper with a centerline roughness Ra of about 5 μm on its surface was used. The increase in roller temperature was minimized by cooling the inside of the roller with water.

The present inventors analyzed the structure of the resultant rapidly solidified alloy with Cu-Kα characteristic X-radiation. As a result, the present inventors identified a diffraction peak of $Nd_2Fe_{14}B$, and also confirmed that the alloy had a rapidly solidified alloy structure in which not only the $Nd_2Fe_{14}B$ phase but also $Fe_{23}B_6$ and α-Fe phases coexisted.

Figure 13:
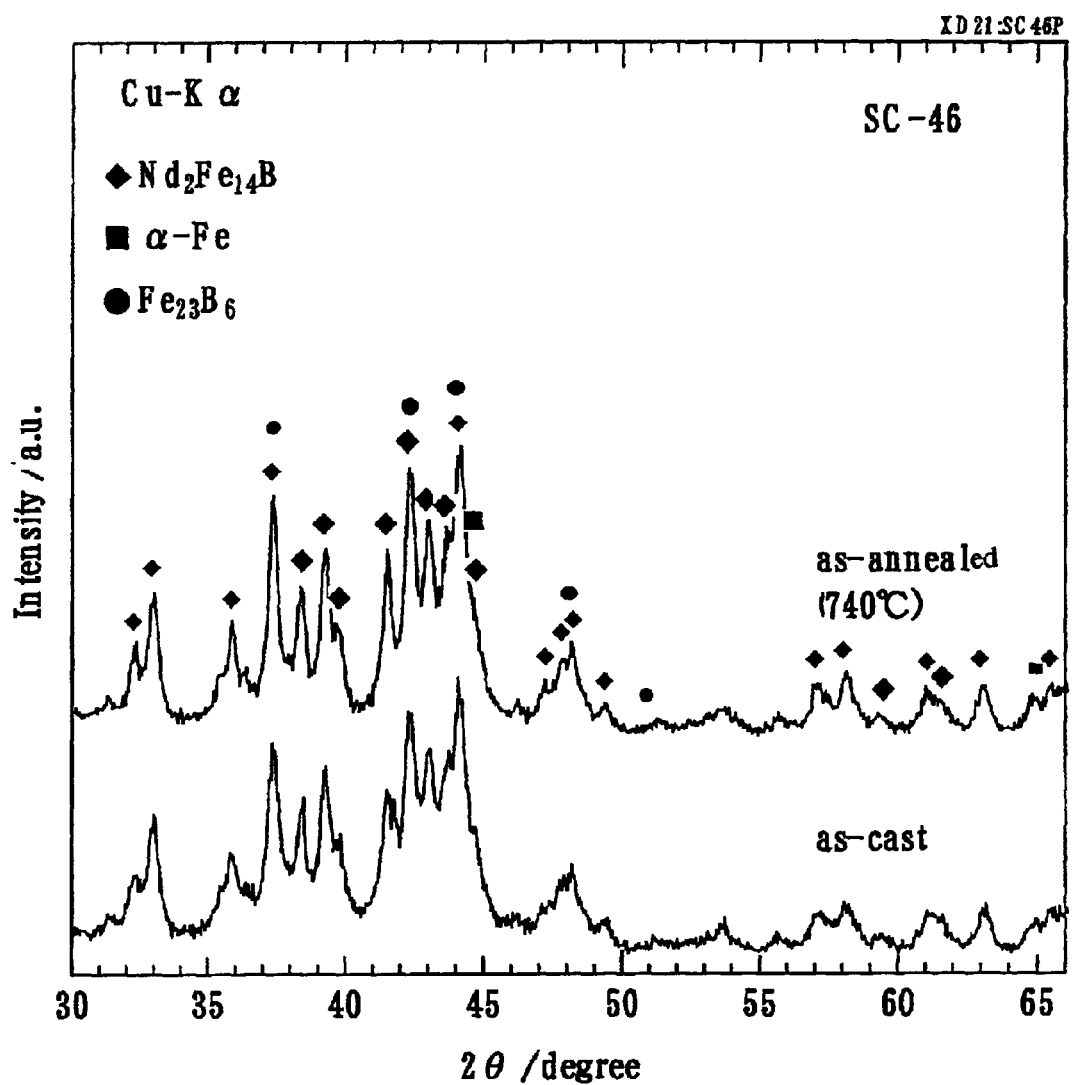
FIG. 13 is a graph illustrating the powder XRD patterns of "as-cast" rapidly solidified alloy and "as-annealed (or heat-treated)" alloy for an example of a preferred embodiment of the present invention.
Figure 14:
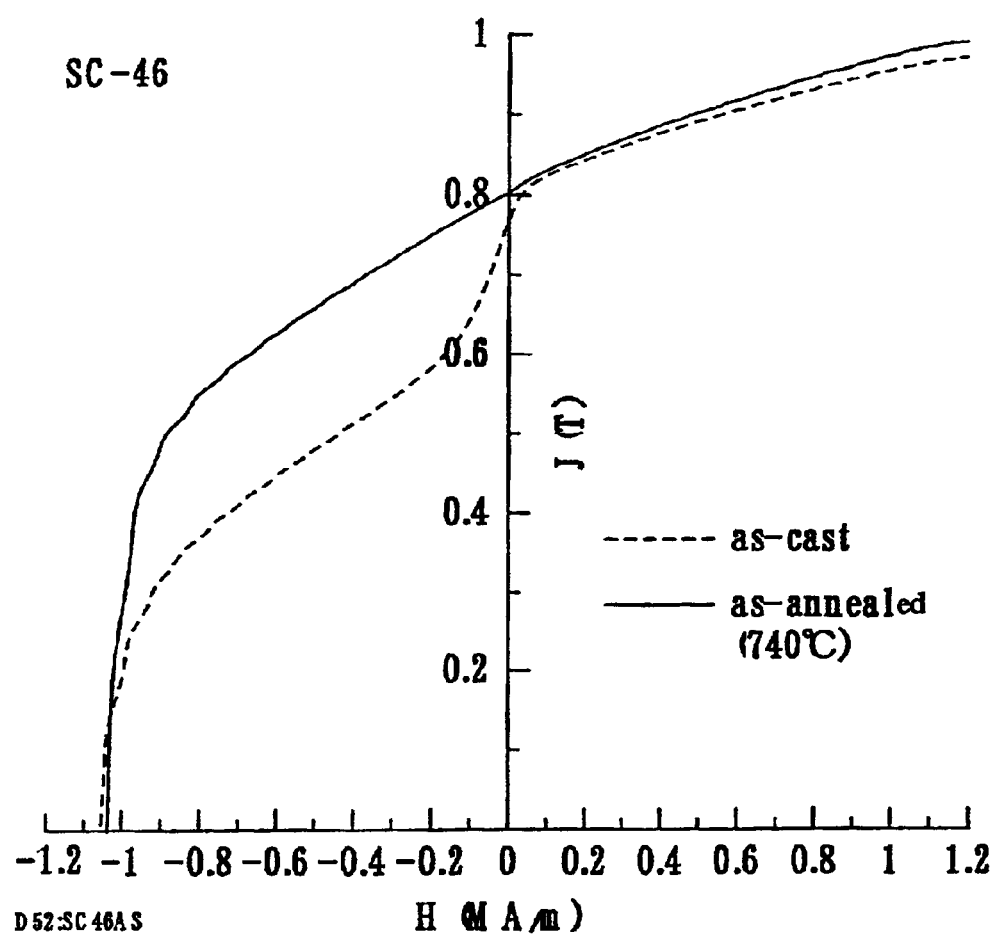
FIG. 14 is a graph illustrating the demagnetization curves of "as-cast" rapidly solidified alloy and "as-annealed (or heat-treated)" alloy as measured with a vibrating sample magnetometer for an example of a preferred embodiment of the present invention.

FIG. 13 illustrates the powder XRD pattern of the rapidly solidified alloy thus obtained. FIG. 14 illustrates the demagnetization curve of the rapidly solidified alloy as measured with a vibrating sample magnetometer. In FIGS. 13 and 14, the curves identified by "as-cast" are associated with the rapidly solidified alloy.

Next, the rapidly solidified alloy was pulverized using a power mill. Then, the powder of the rapidly solidified alloy was loaded into a hoop-belt-type continuous heat treatment furnace, in which an argon atmosphere was created and the in-furnace temperature was kept at about 740° C., so as to be heat-treated. In this case, the powder feeding rate was kept at about 30 g/min.

The powder XRD pattern and demagnetization curve of the heat-treated alloy are also shown in FIGS. 13 and 14, respectively. In FIGS. 13 and 14, the data of the heat-treated alloy are represented by the "as-annealed" curves. The magnetic properties of the heat-treated alloy are shown in the following Table 10:

TABLE 10

| | Magnetic properties | | |
|---|---|---|---|
| | $B_r$ (T) | $H_{cJ}$ (kA/m) | $(BH)_{max}$ (kJ/m³) |
| Example 3 | 0.80 | 1027.8 | 105.61 |

As can be seen from FIG. 14 and Table 10, the iron-based permanent magnet of this example exhibited good magnetic properties.

Next, the heat-treated microcrystalline metal structure was analyzed with a transmission electron microscope (TEM). As a result, it was determined that crystal grains with an average grain size of about 40 nm and fine crystal grains with an average grain size of about 10 nm coexisted in the heat-treated structure. The latter crystal grains existed around the grain boundaries of the former crystal grains. The metal structure was further analyzed using a high-resolution transmission electron microscope (HRTEM). Consequently, the present inventors confirmed that the crystal grains with the average grain size of about 40 nm were $Nd_2Fe_{14}B$ and that an iron-based boride like $Fe_{23}B_6$ or $Fe_3B$ existed around the grain boundaries of $Nd_2Fe_{14}B$.

Example 4

In this example, the strip caster shown in FIG. 3 was also used.

First, the respective materials B, C, Fe, Nb, Ti and Nd with purities of about 99.5% or more were weighed so that the resultant alloy should have a composition of $Nd_9Fe_{73}B_{12.6}C_{1.4}Ti_3Nb_1$ (where subscripts are indicated in atomic percentages) and that the alloy had a total weight of about 5 kg. Next, the mixture of these metals was put into a crucible of alumina and then melted by an induction heating method within an argon (Ar) atmosphere at a pressure of about 35 kPa. The alloy was melted at approximately 1350° C.

After these materials were melted, the crucible was tilted to pour the melt onto a shoot made of a porous ceramic and thereby guide the melt onto the surface of a chill roller. The shoot had a surface temperature maintained at about 600° C. by a heater. The shoot was tilted to form an angle α of about 20 degrees with respect to the horizontal plane so that the melt could smoothly flow over the shoot toward the roller. Also, the shoot was located at such a position that the line connecting the far end of the shoot to the center of the chill roller formed an angle of about 40 degrees with respect to the horizontal plane. The shoot shown in FIG. 4 was also used in this example.

In this example, the chill roller was rotated at various surface velocities shown in the following Table 11. By adjusting the tilt angle of the crucible, each melt flow running down the shoot had its feeding rate controlled as shown in the following Table 11. Supposing the width of each melt flow was about 10 mm, the present inventors tested the effects of the roller surface velocity and the melt feeding rate on the rapid solidification process.

In this example, a roller made of pure copper with a centerline roughness Ra of about 5 μm on its surface was used as in the third example. The increase in roller temperature was minimized by cooling the inside of the roller with water.

TABLE 11

| Roller surface | Feeding rate of each melt flow (kg/min) | | | | | | | | | |
|---|---|---|---|---|---|---|---|---|---|---|
| Velocity Vs (m/s) | 0.5 | 0.7 | 1.0 | 1.3 | 1.5 | 2.0 | 2.5 | 3.0 | 3.5 | 4.0 |
| 10 | x | Δ | o | o | o | o | Δ | Δ | Δ | Δ |
| 12 | x | o | o | o | o | o | Δ | Δ | x | x |
| 14 | x | o | o | o | o | o | Δ | x | x | x |
| 16 | x | Δ | o | o | o | o | Δ | x | x | x |
| 18 | x | Δ | o | o | o | o | x | x | x | x |
| 20 | x | Δ | o | o | o | Δ | x | x | x | x |
| 22 | x | x | o | o | Δ | Δ | x | x | x | x |
| 24 | x | x | Δ | Δ | x | x | x | x | x | x |
| 26 | x | x | Δ | x | x | x | x | x | x | x |

In Table 11, the open circle o represents a situation where the rapidly solidified alloy could be made constantly. The cross x represents a situation where the melt splashed frequently and the rapidly solidified alloy with the desired structure could not be made constantly. The open triangle Δ represents a situation where the rapidly solidified alloy could often be made constantly but the melt still splashed intermittently.

As can be seen from Table 11, where the roller surface velocity was between about 10 m/sec and about 18 m/sec, the rapidly solidified alloy could be made constantly at a melt flow feeding rate of about 1.0 kg/min to about 2.0 kg/min. Also, the higher the roller surface velocity, the thinner the rapidly solidified alloy gets and the more often the melt splashes.

The feeding rate of each melt flow does not affect the thickness of the resultant rapidly solidified alloy so much but does change the width of the alloy considerably. Generally speaking, the higher the melt feeding rate, the wider the resultant rapidly solidified alloy tends to be.

The thickness of the thin-strip rapidly solidified alloy changes with the roller surface velocity. That is to say, the higher the roller surface velocity, the thinner the resultant thin-strip rapidly solidified alloy gets. For example, where the roller rotates at a surface velocity of about 10 m/sec, the thin-strip rapidly solidified alloy has an average thickness of about 100 $\mu$m. On the other hand, where the roller rotates at a surface velocity of about 22 m/sec, the thin-strip rapidly solidified alloy has an average thickness of about 45 $\mu$m to about 80 $\mu$m.

As described above, the thicker the thin-strip rapidly solidified alloy (e.g., where the alloy has a thickness of more than 80 $\mu$m), the easier it is to obtain powder particles of a quasi-isometric shape by pulverizing the rapidly solidified alloy. A bonded magnet with excellent magnet properties can be obtained from a powder including a great number of particles with an aspect ratio almost equal to one.

The present inventors analyzed the structure of a rapidly solidified alloy, which was made at a roller surface velocity of about 14 m/sec with each melt flow supplied at a feeding rate of about 1.3 kg/min, using Cu-K$\alpha$ characteristic X-radiation. As a result, the present inventors identified a diffraction peak of Nd$_2$Fe$_{14}$B, and confirmed that the alloy had a rapidly solidified alloy structure in which not only the Nd$_2$Fe$_{14}$B phase but also Fe$_{23}$B$_6$ and $\alpha$-Fe phases coexisted.

According to various preferred embodiments of the present invention, a melt of a rare earth alloy, including an additive Ti, is rapidly cooled and solidified by a strip casting process, thereby mass-producing a material alloy for an iron-based rare earth magnet that exhibits excellent magnetic properties, including high coercivity and high magnetization, while reducing the minimum required amount of a rare earth element to be included in the magnet.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A rapidly solidified alloy having a composition represented by the general formula: (Fe$_{1-m}$T$_m$)$_{100-x-y-z-n}$Q$_x$R$_y$Ti$_z$M$_n$, where T is at least one element selected from the group consisting of Co and Ni; Q is at least one element selected from the group consisting of B and C; R is a rare earth element; and M is at least one element selected from the group consisting of Al, Si, V, Cr, Mn, Cu, Zn, Ga, Zr, Nb, Mo, Hf, Ta, W, Pt, Pb, Au and Ag, the mole fractions x, y, z, m and n satisfying the inequalities of:

10 at %<x≦20 at %;

6 at %≦y<10 at %;

0.5 at %≦z≦6 at %;

0≦m≦0.5; and 0 at %≦n≦5 at %, respectively, wherein the alloy has a thickness of between about 50 $\mu$m and about 200 $\mu$m, and wherein in the alloy, a crystal structure is located on each of two surfaces thereof that cross a thickness direction approximately at right angles.

2. The alloy of claim 1, wherein the crystal structure comprises:

a ferromagnetic boride phase with an average crystal grain size of between about 1 nm and about 50 nm; and an R$_2$Fe$_{14}$B phase with an average crystal grain size of between about 20 nm and about 200 nm.

3. The alloy of claim 1, wherein an amorphous portion is interposed between the crystal structures on the two surfaces.

4. The alloy of claim 3, wherein a thickness of the alloy is about 80 $\mu$m or more.

5. A rapidly solidified alloy having a composition represented by the general formula: (Fe$_{1-m}$T$_m$)$_{100-x-y-z-n}$Q$_x$R$_y$Ti$_z$M$_n$, where T is at least one element selected from the group consisting of Co and Ni; Q is at least one element selected from the group consisting of B and C; R is a rare earth element; and M is at least one element selected from the group consisting of Al, Si, V, Cr, Mn, Cu, Zn, Ga, Zr, Nb, Mo, Hf, Ta, W, Pt, Pb, Au and Ag, the mole fractions x, y, z, m and n satisfying the inequalities of:

10 at %<x≦20 at %;

6 at %≦y<10 at %;

0.5 at %≦z≦6 at %;

0≦m≦0.5; and 0 at %≦n≦5 at %, respectively, wherein the alloy has a thickness of between about 60 $\mu$m and about 150 $\mu$m, and wherein the alloy has a recoil permeability of between about 1.1 and about 2.

6. A magnet powder having a composition represented by the general formula: (Fe$_{1-m}$T$_m$)$_{100-x-y-z-n}$Q$_x$R$_y$Ti$_z$M$_n$, where T is at least one element selected from the group consisting of Co and Ni; Q is at least one element selected from the group consisting of B and C; R is a rare earth element; and M is at least one element selected from the group consisting of Al, Si, V, Cr, Mn, Cu, Zn, Ga, Zr, Nb, Mo, Hf, Ta, W, Pt, Pb, Au and Ag, the mole fractions x, y, z, m and n satisfying the inequalities of:

10 at %<x≦20 at %;

6 at %≦y<10 at %;

0.5 at %≦z≦6 at %;

0≦m≦0.5; and 0 at %≦n≦5 at %, respectively, wherein the powder has a mean particle size of between about 60 $\mu$m and about 110 $\mu$m, and wherein a ratio of a major-axis dimension of the powder to a minor-axis dimension thereof is between about 0.3 and about 1, and wherein the powder has a coercivity H$_{cJ}$ of about 600 kA/m or more.

* * * * *